US012652483B2

(12) United States Patent
Qi et al.

(10) Patent No.: US 12,652,483 B2
(45) Date of Patent: Jun. 9, 2026

(54) EARPHONES

(71) Applicant: SHENZHEN SHOKZ CO., LTD., Shenzhen (CN)

(72) Inventors: Xin Qi, Shenzhen (CN); Lei Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 298 days.

(21) Appl. No.: 18/365,211

(22) Filed: Aug. 3, 2023

(65) Prior Publication Data

US 2024/0323578 A1 Sep. 26, 2024

Related U.S. Application Data

(63) Continuation of application No. PCT/CN2023/083553, filed on Mar. 24, 2023.

(51) Int. Cl.
*H04R 1/10* (2006.01)
*H04R 1/32* (2006.01)

(52) U.S. Cl.
CPC ........... *H04R 1/1008* (2013.01); *H04R 1/323* (2013.01); *H04R 2460/09* (2013.01); *H04R 2460/11* (2013.01)

(58) Field of Classification Search
CPC .. H04R 1/1008; H04R 1/323; H04R 2460/09; H04R 2460/11; H04R 1/2826; H04R 1/347; H04R 1/105; H04R 1/1016
See application file for complete search history.

(56) References Cited

U.S. PATENT DOCUMENTS

2013/0343593 A1* 12/2013 Howes ..................... H04R 1/10 381/380
2021/0067857 A1* 3/2021 Struzik .................. H04R 1/345
2021/0112329 A1 4/2021 Zhang et al.

(Continued)

FOREIGN PATENT DOCUMENTS

CN 114286243 A 4/2022
CN 217643682 U 10/2022

(Continued)

OTHER PUBLICATIONS

The Extended European Search Report in European Application No. 23929034.9 mailed on Jul. 29, 2025, 10 pages.

*Primary Examiner* — Carolyn R Edwards
(74) *Attorney, Agent, or Firm* — METIS IP LLC

(57) ABSTRACT

The present disclosure discloses an earphone including a sound production component and a suspension structure. A first sound guiding hole and a second sound guiding hole are disposed on the sound production component, wherein the first sound guiding hole is configured to guide a first sound transmitted to an inside of an ear canal of a user; the second sound guiding hole is configured to communicate an inside of the sound production component with an outside of the sound production component and guide a second sound transmitted to a spatial position outside the sound production component. The suspension structure is configured to place the sound production component on an ear of the user and provide an opening between the sound production component and an opening of the ear canal of the user for acoustic communication with the spatial position outside the sound production component.

20 Claims, 26 Drawing Sheets

(56) References Cited

U.S. PATENT DOCUMENTS

| | | | | |
|---|---|---|---|---|
| 2021/0168495 | A1* | 6/2021 | Zhang | H04R 1/028 |
| 2024/0064477 | A1* | 2/2024 | Sunohara | G10K 11/17854 |
| 2024/0147139 | A1* | 5/2024 | Chen | H04R 1/24 |
| 2024/0406618 | A1 | 12/2024 | Wang et al. | |

FOREIGN PATENT DOCUMENTS

| | | | |
|---|---|---|---|
| CN | 115550783 | A | 12/2022 |
| EP | 4009665 | A1 | 6/2022 |
| KR | 20230007534 | A | 1/2023 |

* cited by examiner

EARPHONES

CROSS-REFERENCE TO RELATED APPLICATION

This application is a continuation of International Application No. PCT/CN2023/083553, filed on Mar. 24, 2023, the entire contents of which are hereby incorporated herein by reference.

TECHNICAL FIELD

The present application relates to the technical field of acoustics, and in particular, to earphones.

BACKGROUND

With the development of acoustic output technology, earphones have been widely used in people's daily life, which can be used in conjunction with electronic devices such as mobile phones and computers to provide users with an auditory feast. With a wearing manner of extending into an ear canal, an in-ear earphone can better seal the ear canal and isolate the ear canal from an external environment, thereby increasing a listening volume of the earphone and reducing the interference of environmental noise on listening. Usually, the in-ear earphone transmits sound to the ear canal through a sound guiding hole disposed in a front cavity. At the same time, to reduce the sound leakage, the in-ear earphone may adopt a structure with a closed rear cavity or a sound guiding hole with a relatively large acoustic resistance may be disposed in the rear cavity to reduce the sound radiating from the rear cavity to the environment. In this case, a diaphragm may be subject to a relatively large resistance in the low-frequency and large-amplitude process, which may affect a low-frequency output performance of the in-ear earphone, thereby reducing the listening effect of the earphone and the comfort of the user.

Therefore, it is desirable to provide an earphone that may improve the output performance and listening effect of the earphone.

SUMMARY

Some embodiments of the present disclosure provide an earphone. The earphone may include a sound production component, a first sound guiding hole and a second sound guiding hole may be disposed on the sound production component, wherein the first sound guiding hole may be configured to guide a first sound transmitted to an inside of an ear canal of a user; and the second sound guiding hole may be configured to communicate an inside of the sound production component with an outside of the sound production component and guide a second sound transmitted to a spatial position outside the sound production component, wherein the first sound guiding hole may be located closer to the inside of the ear canal than the second sound guiding hole; and a suspension structure configured to place the sound production component on an ear of the user and provide an opening between the sound production component and an opening of the ear canal of the user for acoustic communication with the spatial position outside the sound production component.

In some embodiments, the first sound guided by the first sound guiding hole may be guided to the spatial position through the opening between the sound production component and the opening of the ear canal of the user to interfere with the second sound to reduce an amplitude of the second sound.

In some embodiments, when the earphone may be in a wearing state, the sound production component may cooperate with a concha cavity of the ear to form a cavity having the opening between the sound production component and the opening of the ear canal of the user.

In some embodiments, when the earphone is in the wearing state, at least a portion of the sound production component may extend into the concha cavity, and a sidewall of the sound production component on which the first sound guiding hole may be disposed and the concha cavity enclose the cavity.

In some embodiments, when the earphone is in the wearing state, a centroid of a projection of the sound production component on a sagittal plane may be located within a projection region of an edge of the concha cavity on the sagittal plane.

In some embodiments, a distance between a centroid of a projection of the sound production component on a sagittal plane and a projection of an edge of the concha cavity on the sagittal plane may be within a range of 4 mm-25 mm.

In some embodiments, a distance between a free end of a projection of the sound production component on a sagittal plane and a projection of an edge of the concha cavity on the sagittal plane may be smaller than or equal to 13 mm.

In some embodiments, a ratio of a distance between a centroid of a projection of the sound production component on a sagittal plane and a highest point of a projection of an auricle of the user on the sagittal plane in a vertical axis direction to a height of the projection of the auricle on the sagittal plane in the vertical axis direction may be 0.35-0.6.

In some embodiments, a ratio of a distance between the centroid of the projection of the sound production component on the sagittal plane and an end point of the projection of the auricle on the sagittal plane in a sagittal axis direction to a width of the projection of the auricle on the sagittal plane may be 0.4-0.65.

In some embodiments, an overlap ratio between an area of a projection of the sound production component on a sagittal plane and an area of a projection of the concha cavity on the sagittal plane may be greater than or equal to ⅓.

In some embodiments, the area of the projection of the sound production component on the sagittal plane may be within a range of 202 $mm^2$-560 $mm^2$.

In some embodiments, when the earphone is in the wearing state, an inclination angle of a projection of an upper side or a lower side of the sound production component on a sagittal plane relative to a horizontal direction may be within a range of 10°-28°.

In some embodiments, when the earphone is in the wearing state, a distance between a midpoint of a projection of an upper side of the sound production component on a sagittal plane and a projection of a vertex of the suspension structure on the sagittal plane may be within a range of 17 mm-36 mm.

In some embodiments, a distance between a midpoint of a projection of a lower side of the sound production component on the sagittal plane and the projection of the vertex of the suspension structure on the sagittal plane may be within a range of 28 mm-52 mm.

In some embodiments, when the earphone is in a wearing state, the sound production component includes a body and a baffle extending toward the opening of the ear canal of the user, and the baffle and the ear enclose a cavity having the opening between the sound production component and the opening of the ear canal of the user.

In some embodiments, the first sound guiding hole may be located inside the cavity, and the second sound guiding hole may be located outside the cavity.

In some embodiments, the baffle may be connected to a side of the body away from a face of the user, and a thickness of the baffle may be smaller than a thickness of the body.

In some embodiments, within any one of 3.5 kHz-4.5 kHz, 2.5 kHz-3.5 kHz, and 1.5 kHz-2.5 kHz, a ratio of a sound pressure at the first sound guiding hole to a sound pressure at the second sound guiding hole may be within a range of 0.7-1.5.

In some embodiments, a difference between an acoustic resistance at the first sound guiding hole and an acoustic resistance at the second sound guiding hole may be smaller than 2 MKS rayls.

In some embodiments, an acoustic resistance mesh may be disposed at the first sound guiding hole or the second sound guiding hole.

In some embodiments, the acoustic resistance mesh includes a gauze mesh or a steel mesh.

In some embodiments, a mesh count of the acoustic resistance mesh may be within a range of 60-100.

In some embodiments, the sound production component may include: a transducer including a diaphragm configured to produce sound in response to an excitation signal; and a housing, the housing forming an accommodation cavity for accommodating the transducer, wherein the diaphragm divides the accommodation cavity into a front cavity and a rear cavity corresponding to a front side and a rear side of the diaphragm, respectively, the front cavity may be in acoustic communication with the first sound guiding hole, and the rear cavity may be in acoustic communication with the second sound guiding hole.

In some embodiments, an acoustic structure of the front cavity or an acoustic structure of the rear cavity may be configured such that a phase difference between the first sound and the second sound may be smaller than 180°.

In some embodiments, at 1000 Hz, the phase difference between the first sound and the second sound may be 125°-178°.

In some embodiments, at 2000 Hz, the phase difference between the first sound and the second sound may be 170°-175°.

In some embodiments, within 1000 Hz-2000 Hz, the phase difference between the first sound and the second sound may be negatively correlated with a value of a frequency.

In some embodiments, the first sound transmitted in the front cavity has a first sound path, the second sound transmitted in the rear cavity has a second sound path, and there may be a sound path difference between the first sound path and the second sound path.

In some embodiments, the acoustic structure may be disposed in the front cavity or the rear cavity, and the acoustic structure includes a baffle.

In some embodiments, the front cavity or the rear cavity may be provided with at least one of an acoustic gauze mesh or an acoustic porous material.

In some embodiments, the front cavity or the rear cavity may be provided with an expansion acoustic structure, and the expansion acoustic structure changes cross-sectional areas of the front cavity or the rear cavity at different positions on a sound transmission path.

In some embodiments, the second sound guiding hole may be configured to increase a sound pressure of the first sound at a portion of low frequencies.

In some embodiments, within a range of 100 Hz-1000 Hz, the second sound guiding hole increases the sound pressure of the first sound.

In some embodiments, the second sound guiding hole increases the sound pressure of the first sound at a portion of low frequencies by 0 dB-60 dB.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
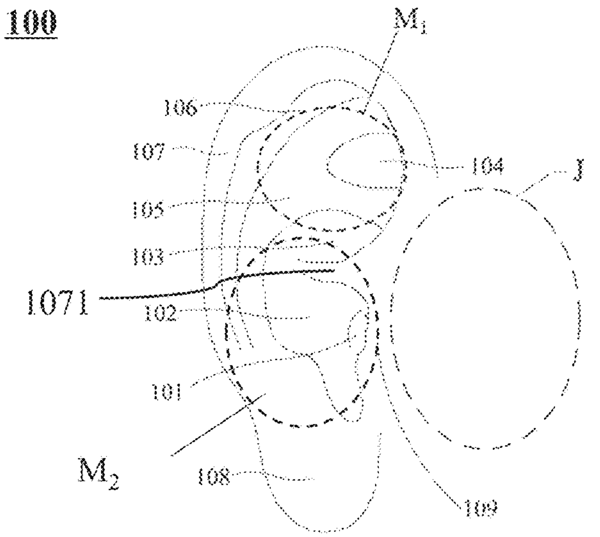
FIG. 1 is a schematic diagram illustrating an exemplary ear according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

An in-ear earphone may be extended into an ear canal of a user in a wearing state, and sound transmitted to an inside of the ear canal may be guided through a sound guiding hole disposed on a housing of the earphone. For example, the in-ear earphone may include a diaphragm configured to produce sound in response to an excitation signal. One or more first sound guiding holes may be disposed on a sidewall of the housing extending into the ear canal. The one or more first sound guiding hole may be in acoustic communication with a front cavity on a front side of the diaphragm, and the sound may be guided to the inside of the ear canal through the one or more first sound guiding holes. The in-ear earphone may better seal the ear canal in the wearing state, which may reduce the interference of environmental noise on listening and improve the listening effect of the earphone. In the in-ear earphone, a rear cavity located behind the diaphragm may usually adopt a closed structure or a sound guiding hole with a relatively large acoustic resistance, which may result in a relatively large resistance to the diaphragm during vibration, thereby affecting the output performance of the in-ear earphone. For example, in the low-frequency and large-amplitude process, because air cannot freely enter and exit the rear cavity, the diaphragm may encounter a relatively large resistance when vibrating at a low frequency and a large amplitude such that a sound pressure amplitude of the sound produced by vibration of the diaphragm may be relatively small, which may affect the low-frequency output performance of the in-ear earphone.

In some embodiments, a sound guiding hole with a suitable acoustic resistance may be disposed on the housing corresponding to the rear cavity. The sound guiding hole may be configured as a pressure relief hole in the rear cavity to balance a pressure in the rear cavity such that the air may freely enter and exit the rear cavity, thereby reducing the resistance encountered by the diaphragm when the diaphragm vibrates at the low frequency and the large amplitude. By disposing the sound guiding hole with a suitable acoustic resistance, the diaphragm may fully vibrate at the low frequency and the large amplitude, thereby improving a sound pressure of the sound generated by the vibration of the diaphragm (e.g., a first sound generated by the front side of the diaphragm) and improving the low-frequency output performance of the in-ear earphone.

The sound transmitted from the sound guiding hole of the rear cavity (also referred to as a second sound) may be transmitted to a spatial position (also referred to as a far field) away from the ear canal of the user, thereby forming a sound leakage. To reduce the sound leakage, in some embodiments, a structure and/or wearing position of the earphone may be configured such that an opening between a sound production component and an opening of the ear canal of the user for acoustic communication with the spatial position outside the sound production component may be provided when the earphone mainly guides the sound into the inside of the ear canal. In such cases, the first sound guided from the first sound guiding hole may also be transmitted to the spatial position away from the ear canal of the user. Since the first sound guided from the first sound guiding hole and the second sound guided from the second sound guiding hole have opposite or approximately opposite phases, the first sound guided from the first sound guiding hole and the second sound guided from the second sound guiding hole may cancel each other at the spatial position, thereby reducing the sound leakage generated by the second sound guiding hole.

FIG. 1 is a schematic diagram illustrating an exemplary ear according to some embodiments of the present disclosure. As shown in FIG. 1, an ear 100 (also referred to as an auricle) may include an external ear canal 101, a concha cavity 102, a cymba conchae 103, a triangular fossa 104, an antihelix 105, a scapha 106, a helix 107, an earlobe 108, a tragus 109, and a crus of helix 1071. In some embodiments, one or more parts of the ear 100 may be used to support an acoustic device to achieve stable wearing of the acoustic device. In some embodiments, the external ear canal 101, the concha cavity 102, the cymba conchae 103, and the triangular fossa 104 may have a certain depth and volume in a three-dimensional space, which may be used to meet a wearing requirement of the acoustic device. For example, the acoustic device may be worn in the external ear canal 101. In some embodiments, the acoustic device may be worn through other components of the ear 100 than the external ear canal 101. For example, the acoustic device may be worn through components such as the cymba conchae 103, the triangular fossa 104, the antihelix 105, the scapha 106, the helix 107, or the like, or any combination thereof. In some embodiments, to improve the comfort and reliability of the acoustic device in the wearing state, components such as the earlobe 108 of a user may be further used. In some embodiments, the acoustic device may be configured to adapt to the ear 100 according to the construction of the ear 100 to enable a sound production component of the acoustic device to be worn at various positions of the ear. In some embodiments, a structure and/or wearing position of the acoustic device may also be designed so that an opening between the sound production component and an opening of the ear canal of the user for acoustic communication with a spatial position outside the sound production component may be provided when the acoustic device mainly guides the sound into the ear canal such that a first sound guided from the acoustic device (e.g., a front side of a diaphragm) may also be transmitted to a spatial position away from the ear canal of the user, thereby canceling a second sound guided from the acoustic device (e.g., a rear side of the diaphragm) in a far field to achieve the effect of reducing the sound leakage. For example, the structure and/or wearing position of the acoustic device may be designed such that at least a portion of the sound production component may cooperate with the opening of the ear canal to form a cavity having the opening between the sound production component and the opening of the ear canal of the user for acoustic communication with the spatial position outside the sound production component, and a first sound guiding hole corresponding to the front side of the diaphragm may be located inside the cavity such that the first sound may be mainly guided into an inside of the ear canal; the opening between the sound production component and the opening of the ear canal of the user may allow the first sound to transmit to the spatial position away from the ear canal of the user, thereby achieving the effect of reducing the sound leakage. In some embodiments, the acoustic device may include a suspension structure (e.g., an ear hook) and a sound production component. The sound production component may be physically connected to the suspension structure. The suspension structure may be adapted to a shape of the auricle to place the sound production component at a suitable position such that the sound-generating part may transmit the sound to the opening of the ear canal and may also achieve acoustic communication with the spatial position. For example, the whole or a portion of the structure of the sound production component may be placed on the front side (e.g., a region J enclosed by a dotted line in FIG. 1) of the tragus 109. As another example, the whole or a portion of the structure of the sound production component may be in contact with an upper portion (e.g., positions where one or more components such as the cymba conchae 103, the triangular fossa 104, the antihelix 105, the scapha 106, the helix 107, the crus of helix 1071 are located) of the external ear canal 101. As yet another example, the whole or a portion of the structure of the sound production component may be located in a cavity (e.g., a region $M_1$ including at least the cymba conchae 103 and the triangular fossa 104 and a region $M_2$ including at least the concha cavity 102 enclosed by the dotted lines in FIG. 1) formed by one or more components (e.g., the concha cavity 102, the cymba conchae 103, the triangular fossa 104) of the ear 100.

Different users may have individual differences, resulting in different shapes, sizes, and other dimensional differences in the ears. For ease of description and understanding, unless otherwise specified, the present disclosure mainly takes an ear model with a "standard" shape and size for reference and further describes how the acoustic devices in different embodiments are worn on the ear model. For example, a simulator (e.g., GRAS 45BC KEMAR) containing a head and (left and right) ears thereof may be made based on ANSI: S3.36, S3.25 and IEC: 60318-7 standards as a reference for wearing acoustic devices, so as to show a situation that most users normally wear the acoustic device. Merely by way of example, an ear as a reference may have the following relevant features: a dimension of a projection of the auricle on a sagittal plane in a vertical axis direction may be within a range of 49.5 mm-74.3 mm, and a dimension of a projection of the auricle on the sagittal plane in a sagittal axis direction may be within a range of 36.6 mm-55 mm. Therefore, in the present disclosure, descriptions such as "wearing by the user," "in a wearing state," and "in wearing" means that the acoustic device described in the present disclosure is worn on the ear of the simulator. Certainly, considering that different users have individual differences, structures, shapes, sizes, thicknesses, etc. of one or more components of the ear 100 may have certain differences. To meet the needs of the different users, the acoustic device may be designed in a differentiated manner. These differentiated designs may be expressed in the fact that feature parameters of one or more components (e.g., the sound production component, the ear hook below) of the acoustic device may have different ranges of values to adapt to different ears.

It should be noted that in the fields of medicine and anatomy, three basic planes including the sagittal plane, coronal plane, and horizontal plane and three basic axes of the sagittal axis, coronal axis, and vertical axis of a human body may be defined. The sagittal plane refers to a section perpendicular to the ground in an anterior-posterior direction of the body, which divides the human body into left and right parts. The coronal plane refers to a section perpendicular to the ground in a left-right direction of the body, which divides the human body into front and rear parts. The horizontal plane refers to a section parallel to the ground in an up-down direction perpendicular to the body, which divides the human body into upper and lower parts. Accordingly, the sagittal axis refers to an axis in the anterior-posterior direction of the body and perpendicular to the coronal plane, the coronal axis refers to an axis in the left-right direction of the body and perpendicular to the sagittal plane, and the vertical axis refers to an axis in the up-down direction of the body and perpendicular to the horizontal plane. Further, the "front side of the ear" described in the present disclosure is a concept relative to the "rear side of the ear." The former refers to a side of the ear away from the head, and the latter refers to a side of the ear facing the head. A schematic diagram illustrating a front contour of the ear as shown in FIG. 1 may be obtained by observing the ear of the simulator in the coronal axis direction of the human body.

Figure 2:
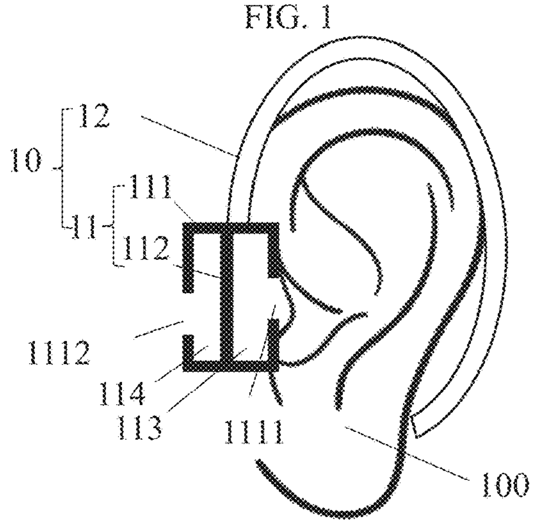
FIG. 2 is a structural diagram illustrating an exemplary earphone according to some embodiments of the present disclosure.
Figure 3:
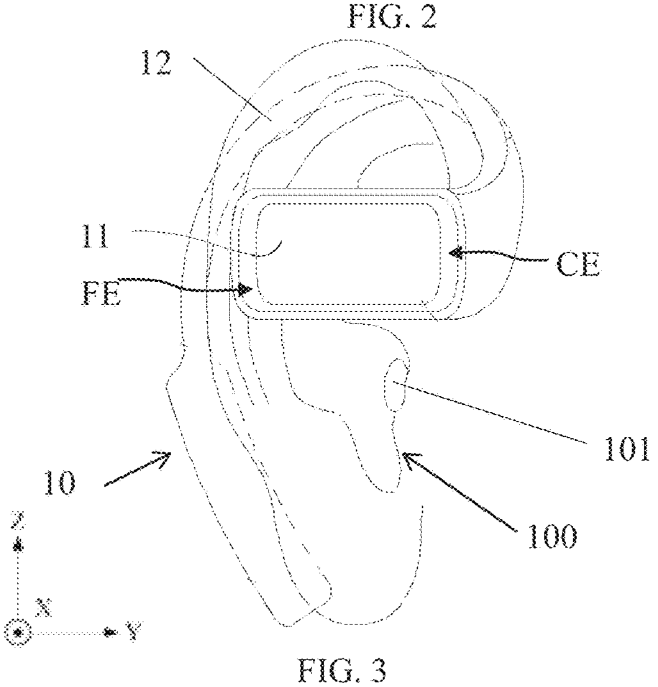
FIG. 3 is a schematic diagram illustrating an exemplary wearing state of an earphone according to some embodiments of the present disclosure.
Figure 4:
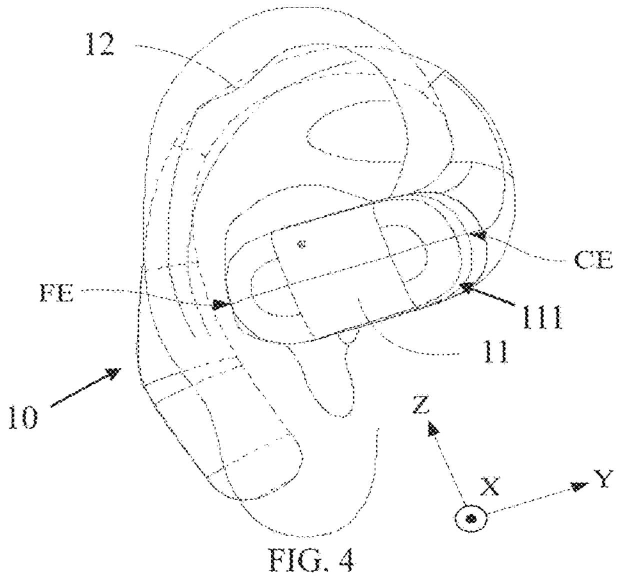
FIG. 4 is a schematic diagram illustrating an exemplary wearing state of another earphone according to some embodiments of the present disclosure.

FIG. 2 is a structural diagram illustrating an exemplary earphone according to some embodiments of the present disclosure, FIG. 3 is a schematic diagram illustrating an exemplary wearing state of an earphone according to some embodiments of the present disclosure, and FIG. 4 is a schematic diagram illustrating an exemplary wearing state of another earphone according to some embodiments of the present disclosure. As shown in FIGS. 2-4, the earphone 10 may include a sound production component 11 and a suspension structure 12. In some embodiments, the sound production component 11 of the earphone 10 may be worn on a body (e.g., a head, neck, or upper torso of the human body) of a user through the suspension structure 12.

In some embodiments, the earphone 10 may be combined with a product such as glasses, a headset, a head-mounted display device, or an AR/VR helmet. In this case, the sound production component 11 may be suspended or clamped near the ear 100 of the user. In some embodiments, the sound production component 11 may have a shape (e.g., circular, elliptical, polygonal (regular or irregular), U-shaped, V-shaped, semicircular) adapted to the ear 100 such that the sound production component 11 may be directly hung on the ear 100 of the user. In some embodiments, the sound production component 11 may have a long-axis direction Y and a short-axis (or width) direction Z perpendicular to a thickness direction X and orthogonal to each other. The long-axis direction Y may be defined as a direction (e.g., when a projection shape is a rectangle or an approximate rectangle, the long-axis direction may be a length direction of the rectangle or the approximate rectangle) with a maximum extension size in a shape of a two-dimensional projection plane (e.g., a projection of the sound production component 11 on a plane where an outer surface of the sound production component is located, or a projection of the sound production component on the sagittal plane) of the sound production component 11. The short-axis direction Z may be defined as a direction (e.g., when a projected shape is a rectangular or an approximately rectangular, the short-axis direction may be a width direction of the rectangle or the approximately rectangular) in the shape of the two-dimensional projection plane of the sound production component 11 perpendicular to the long-axis direction Y. The thickness direction X may be defined as a direction perpendicular to the two-dimensional projection plane e.g., which may be consistent with the coronal axis direction, both pointing to the left-right direction of the body. In some embodiments, when the sound production component 11 is in a horizontal state in the wearing state, the long-axis direction Y may be consistent with the sagittal axis direction, both pointing to the anterior-posterior direction of the body, and the short-axis direction Z may be consistent with the vertical axis direction, both pointing to the up-down direction of the body, as shown in FIG. 3. In some other embodiments, when the sound production component 11 is in a tilted state in the wearing state, the long-axis direction Y and the short-axis direction Z may still be parallel or approximately parallel to the sagittal plane. A certain included angle may be formed between the long-axis direction Y and the sagittal axis direction, i.e., the long-axis direction Y may also be tilted accordingly. A certain included angle may be formed between the short-axis direction Z and the vertical axis direction, i.e., the short-axis direction Z may also be tilted, as shown in FIG. 4.

In some embodiments, when the user wears the earphone 10, the sound production component 11 may be located above, below, in front of the ear 100 (e.g., in front of the tragus) or inside the auricle (e.g., in the concha cavity) of the user.

In some embodiments, the earphone 10 may include, but is not limited to, an air conduction earphone, a bone air conduction earphone, etc. In some embodiments, when the earphone 10 is in the wearing state, the external ear canal 101 of the user may not be blocked, as shown in FIG. 3 and FIG. 4. In some embodiments, a projection of the earphone 10 on a plane of the ear of the user may partially or completely cover but not block the external ear canal 101 of the user, as shown in FIG. 4. In some embodiments, the projection of the earphone 10 on the plane of the ear of the user may not cover the external ear canal 101 of the user, as shown in FIG. 3.

In some embodiments, when the earphone 10 is in the wearing state, a first portion of the suspension structure 12 may be hung between the auricle and the head of the user, and a second portion may extend to a side of the auricle away from the head and connect to the sound production component 11 such that the sound production component 11 may be placed near the ear canal without blocking the ear canal. In some embodiments, the suspension structure 12 may include an arc structure adapted to the auricle of the user such that the suspension structure 12 may be suspended on the upper auricle of the user. In some embodiments, the suspension structure 12 may also include a clamping structure adapted to the auricle of the user such that the suspension structure 12 may be clamped at the auricle of the user. In some embodiments, the suspension structure 12 may include, but is not limited to, a hook structure, an elastic band, etc. such that the earphone 10 may be better placed on the user's body, which may prevent the earphone 10 from falling during use.

In some embodiments, to improve the stability of the earphone 10 in the wearing state, the earphone 10 may adopt any one or a combination of the following modes. First, at least a portion of the suspension structure 12 may be configured as a profiling structure that fits at least one of a rear side of the ear and the head to increase a contact area between the suspension structure 12 and the ear and/or the head, thereby increasing a resistance preventing the earphone 10 from falling off from the ear. Second, at least a portion of the suspension structure 12 may be configured as an elastic structure such that the suspension structure 12 may have a certain amount of deformation in the wearing state, so as to increase a positive pressure of the suspension structure 12 on the ear and/or head, thereby increasing the resistance preventing the earphone 10 from falling off from the ear. Third, at least a portion of the suspension structure 12 may be configured to lean against the head in the wearing state, so as to form a reaction force that presses the ear and make the sound production component 11 press against the front side of the ear, thereby increasing the resistance preventing the earphone 10 from falling off from the ear. Fourth, the sound production component 11 and the suspension structure 12 may be configured to clamp a physiological part such as a region where the antihelix is located and a region where the concha cavity is located from front and rear sides of the ear in the wearing state, thereby increasing the resistance preventing the earphone 10 from falling off from the ear. Fifth, the sound production component 11 or an auxiliary structure connected thereto may be configured to at least partially extend into a physiological part such as the concha cavity, the cymba conchae, the triangular fossa, and the scaph, thereby increasing the resistance preventing the earphone 10 from falling off from the ear.

In some embodiments, the sound production component 11 may be worn on the body of the user for generating sound transmitted to the ear 100 of the user. As shown in FIG. 3 and FIG. 4, in some embodiments, the sound production component 11 may have a connection end CE connected to the suspension structure 12 and a free end FE not connected to the suspension structure 12. In some embodiments, as shown in FIG. 4, in the wearing state, at least a portion of the free end FE of the sound production component 11 may extend into the concha cavity. When observed in the coronal axis direction of the human body, the connecting end CE may be closer to a top of the head than the free end FE (as shown in FIG. 4) such that the free end FE may extend into the concha cavity. In some embodiments, as shown in FIG. 3, in the wearing state, the free end FE of the sound production component 11 may not extend into the concha cavity. In the wearing state, when observed in the coronal axis direction of the human body, a distance between the connecting end CE and the top of the head may be similar to a distance between the free end FE and the top of the head, for example, a line connecting the connection end CE and the free end FE may be parallel to the horizontal plane (as shown in FIG. 3). In some embodiments, in the wearing state, the free end FE of the sound production component 11 may not extend into the concha cavity, and when observed in the coronal axis direction of the human body, the connection end CE may be farther away from the top of the head than the free end FE, which may avoid the sound production component 11 from blocking the external ear canal and the concha cavity of the user.

In some embodiments, the sound production component 11 and the suspension structure 12 may be configured to clamp the ear region from the front and rear sides of the ear region corresponding to the concha cavity, thereby increasing the resistance preventing the earphone 10 from falling off from the ear, and further improving the stability of the earphone 10 in the wearing state. For example, the free end FE may be pressed in the concha cavity in the thickness direction X. As another example, the free end FE may abut against the concha cavity in the long-axis direction Y and the short-axis direction Z. It should be noted that, in the wearing state, in addition to extending into the concha cavity, the free end FE of the sound production component 11 may also be projected orthogonally onto the antihelix, or may be projected orthogonally on the left and right sides of the head and on the front side of the ear in the sagittal axis of the human body. In other words, the suspension structure 12 may support the sound production component 11 to be placed at a wearing position such as the concha cavity, the antihelix, and the front side of the ear.

In some embodiments, one or more sound guiding holes may be disposed on the sound production component 11 and configured to guide a sound transmitted to the ear canal of the user. For example, as shown in FIG. 2, the sound production component 11 may include a transducer 112. The transducer 112 may include a diaphragm configured to produce sound in response to an excitation signal. In some embodiments, the sound production component 11 may further include a housing 111. The housing 111 may form an accommodation cavity for accommodating the transducer 112 (or the diaphragm). The diaphragm may divide the accommodation cavity into a front cavity 113 and a rear cavity 114 corresponding to a front side and a rear side of the diaphragm, respectively. In some embodiments, a first sound guiding hole 1111 may be disposed on the housing 111. The first sound guiding hole 1111 may be in acoustic communication with the front cavity 113 corresponding to the front side of the diaphragm, so as to guide a sound (or referred to as a first sound) generated by the front side of the diaphragm. In some embodiments, in the wearing state, the earphone 10 may be located near the auricle of the user, and the first sound guiding hole 1111 may be close to the ear canal such that the first sound transmitted from the first sound guiding hole 1111 may be transmitted toward an inside of the ear canal of the user. For example, for the earphone 10 shown in FIG. 3, a projection of the earphone 10 on the plane of the ear of the user may not cover the external ear canal 101 of the user, and the first sound guiding hole 1111 may be disposed on a lower side of the sound production component 11 in the short-axis direction Z, and the lower side may be closer to the ear canal of the user such that the first sound transmitted from the first sound guiding hole 1111 may be transmitted toward the inside of the ear canal of the user. As another example, in the earphone 10 shown in FIG. 4, the projection of the earphone 10 on the plane of the ear of the user may partially or completely cover but not block the external ear canal 101 of the user, and the first sound guiding hole 1111 may be disposed on the housing 111 toward an inner side of the auricle such that the first sound transmitted from the first sound guiding hole 1111 may be transmitted toward the inside of the ear canal of the user.

Figure 5:
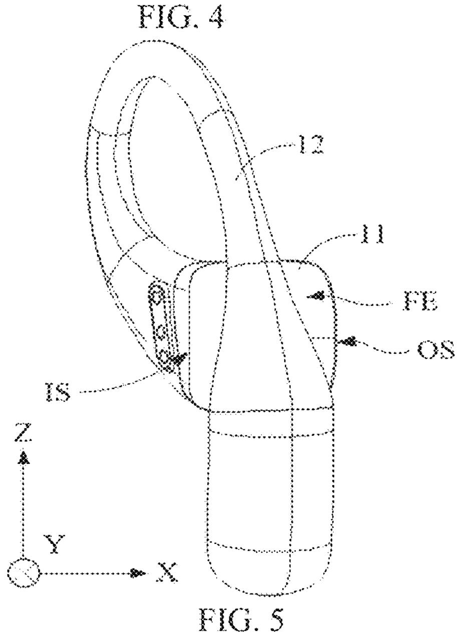
FIG. 5 is a schematic diagram illustrating another exemplary outer contour of an earphone shown in FIG. 4.

The earphone 10 shown in FIG. 4 is taken as an example for illustration. FIG. 5 is a schematic diagram illustrating another exemplary outer contour of an earphone shown in FIG. 4, and FIG. 6 is a schematic diagram illustrating another exemplary outer contour of the earphone shown in FIG. 4.

Figure 6:
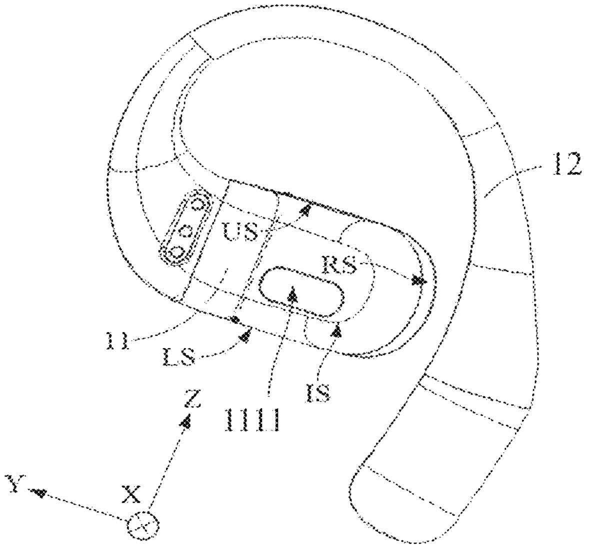
FIG. 6 is a schematic diagram illustrating another exemplary outer contour of the earphone shown in FIG. 4.
Figure 7A:
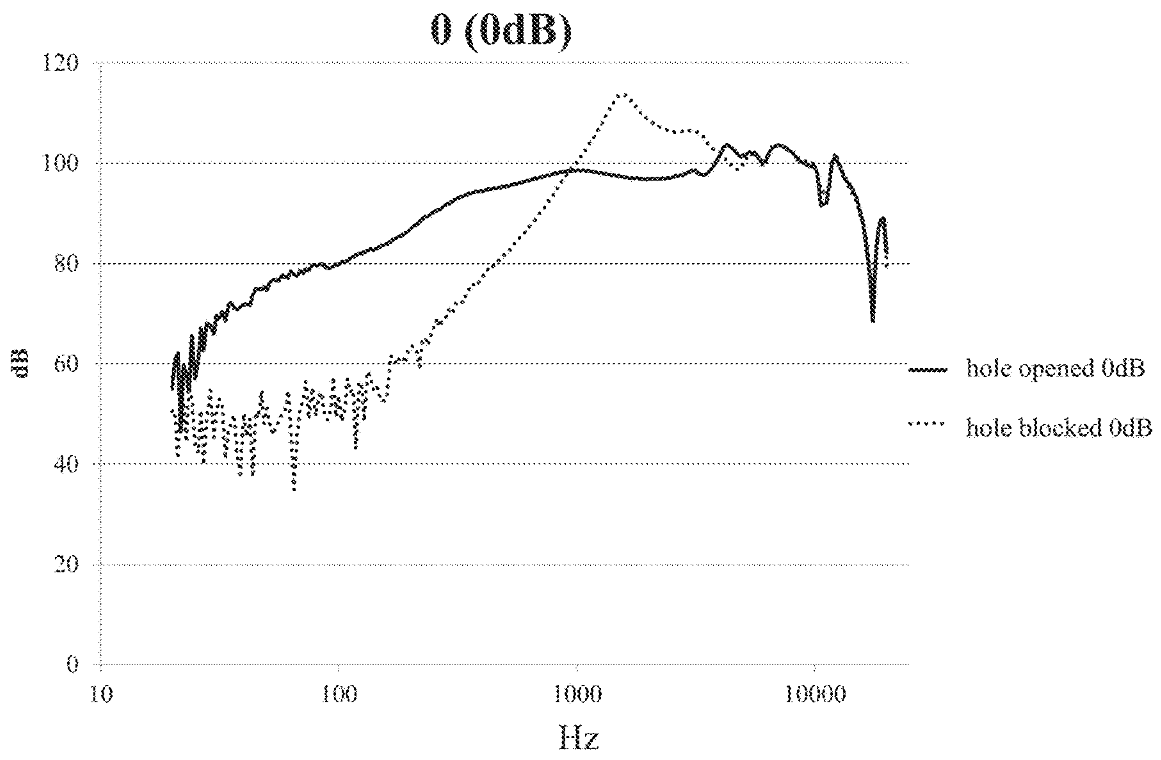
FIGS. 7A-7G are graphs illustrating frequency response curves of a first sound when a second sound guiding hole is blocked or not blocked according to some embodiments of the present disclosure.
Figure 7B:
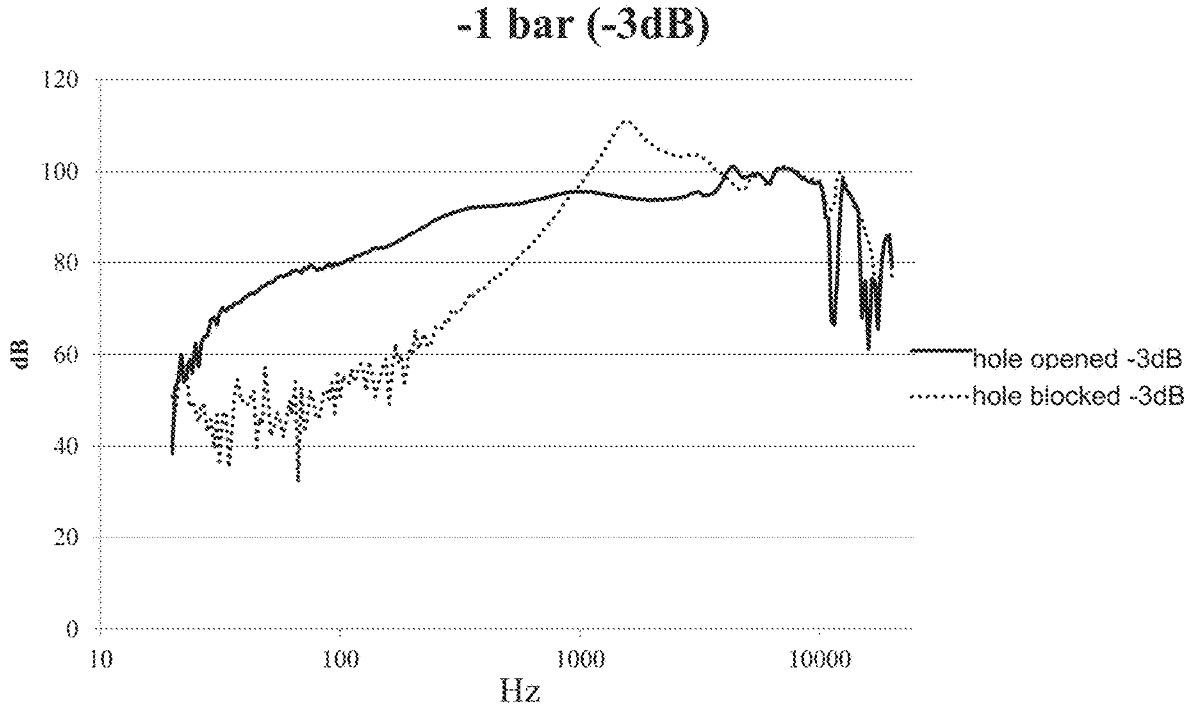
Figure 7C:
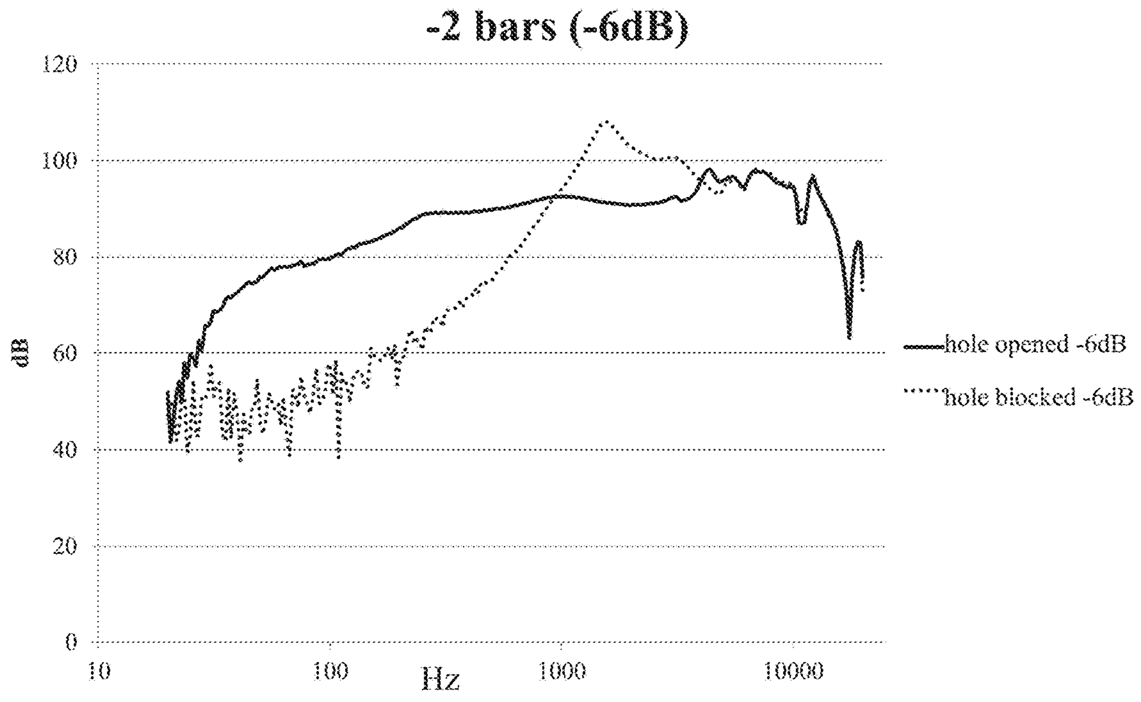
Figure 7D:
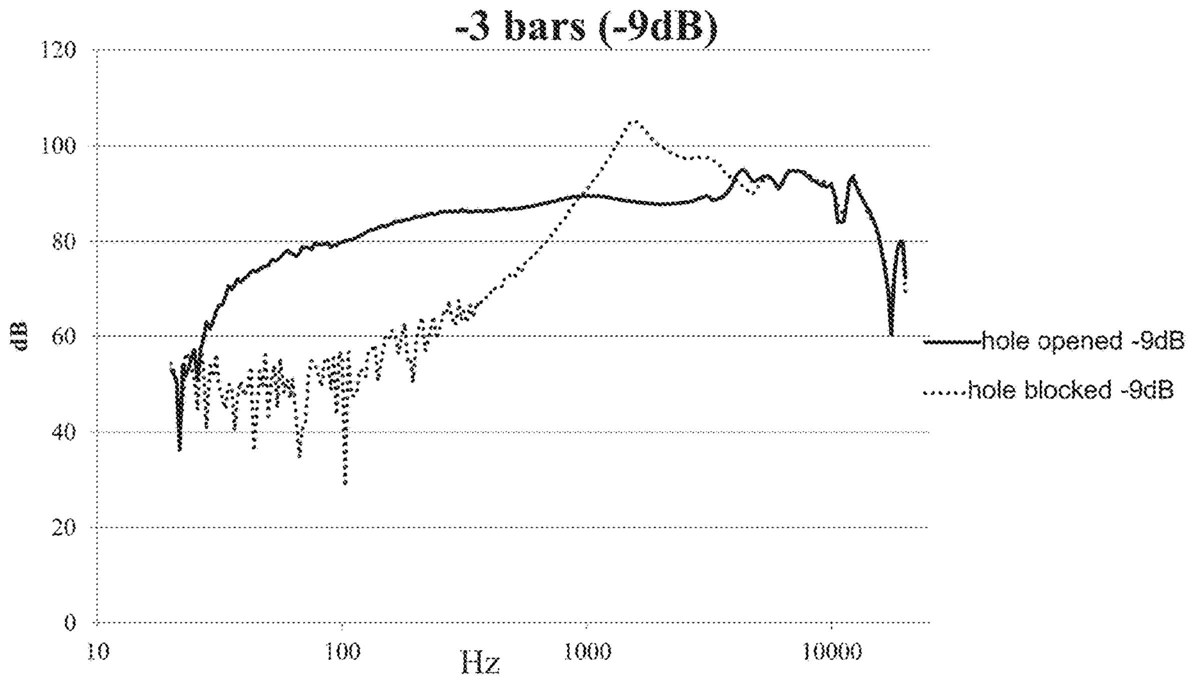
Figure 7E:
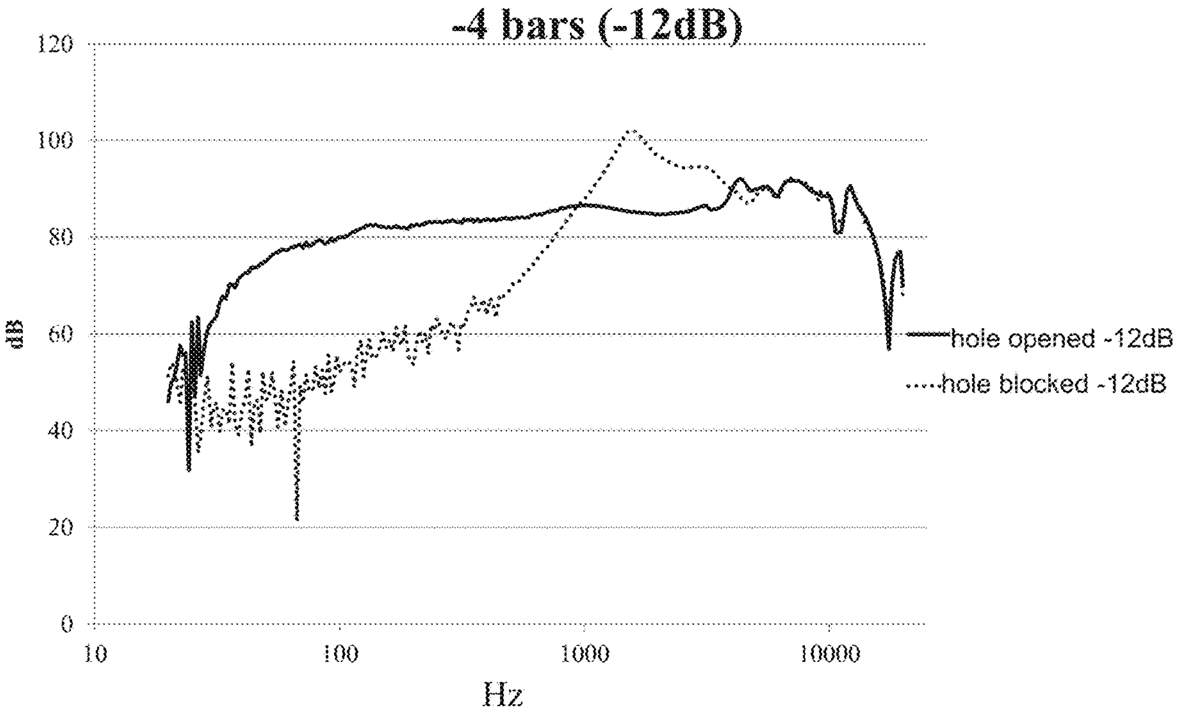
Figure 7F:
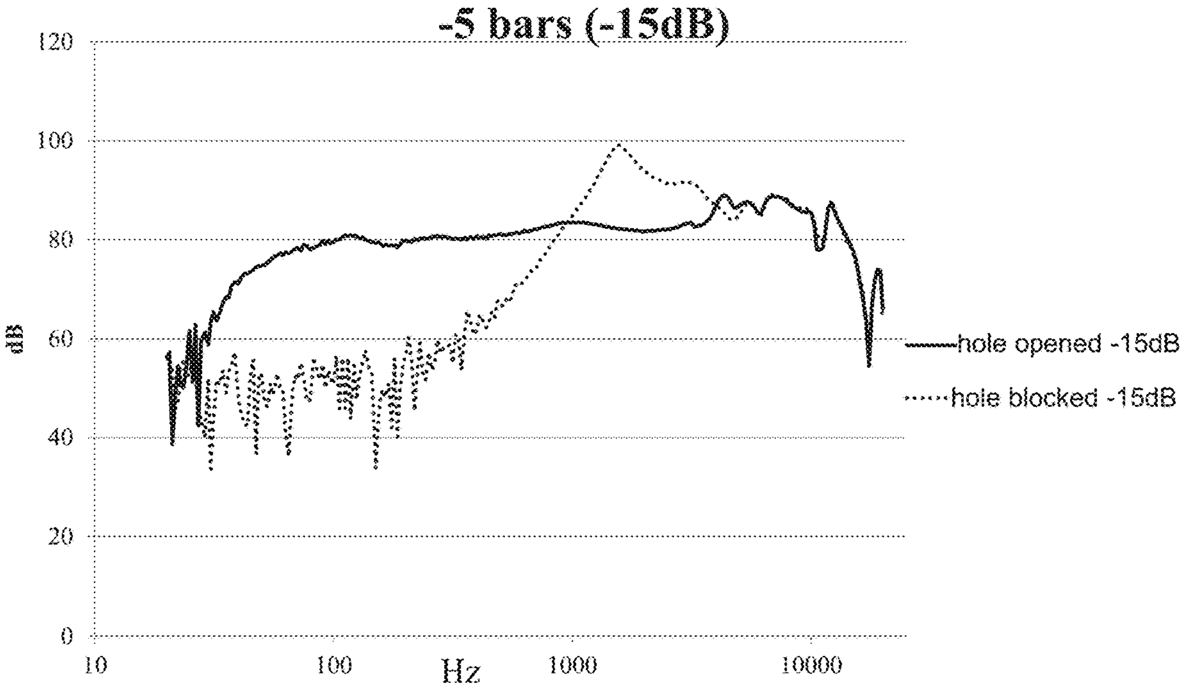
Figure 7G:
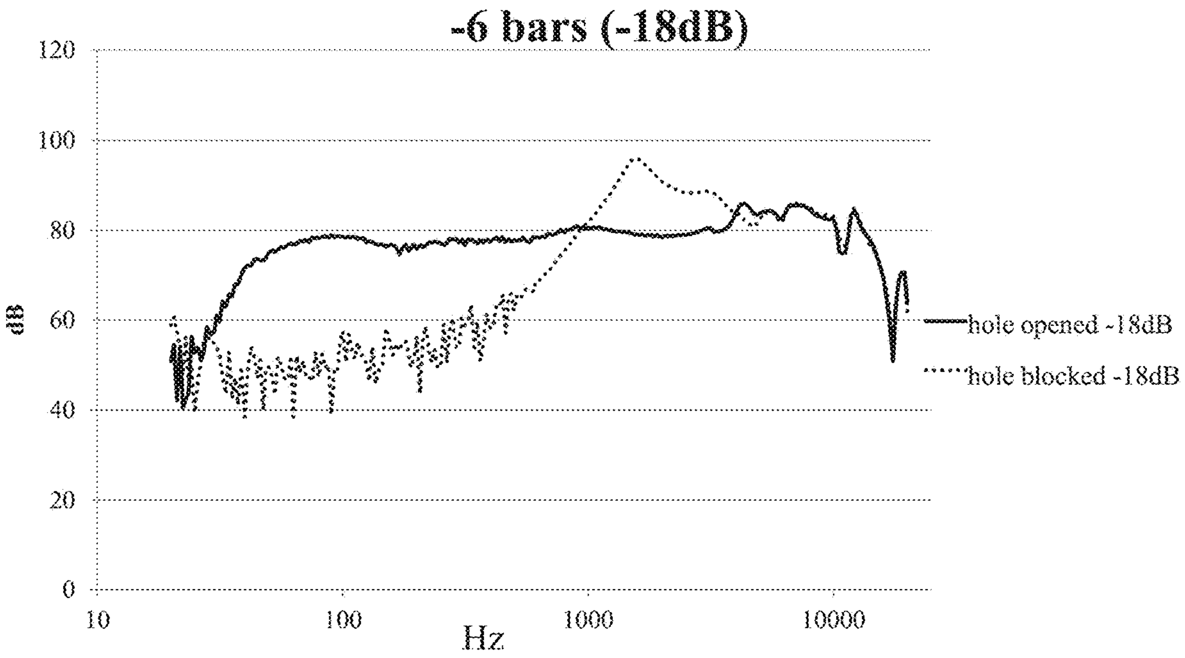

As shown in FIGS. 5 and 6, in some embodiments, the sound production component 11 may include an inner side surface IS towards the ear and an outer side surface OS away from the ear in a thickness direction X in a wearing state, and a connection surface connecting the inner side surface IS and the outer side surface OS. In the wearing state, observed in the coronal axis direction (i.e., the thickness direction X), the sound production component 11 may have a shape such as a circle, an oval, a square with rounded corners, a rectangle with rounded corners, etc. When the sound production component 11 has the shape such as the circle, the oval, the connection surface refers to an arc-shaped side of the sound production component 11. When the sound production component 11 has the shape such as the square with rounded corners or the rectangle with rounded corners, the connection surface may include a lower side surface LS, an upper side surface US, and a rear side surface RS below. Therefore, for the convenience of description, in this embodiment, the sound production component 11 having the rectangle with rounded corners is taken as an example for exemplary illustration. In some embodiments, the sound production component 11 may include the upper side surface US and the lower side surface LS disposed in the short-axis direction Z, and a rear side surface RS connecting the upper side surface US and the lower side surface LS. The upper side surface US may be located at one end of the short-axis direction Z toward the top of the head in the wearing state, the rear side surface RS may be located at one end of the long-axis direction Y toward the rear of the head in the wearing state, and the free end FE may be located on the rear side surface RS. In some embodiments, a positive direction of the long-axis direction Y may point to the free end FE, a positive direction of the short-axis direction Z may point to the upper side surface US, and a positive direction of the thickness direction X may point to the outer side surface OS. In some embodiments, the first sound guiding hole 1111 may be disposed on the inner surface IS of the housing 111 toward the ear in the wearing state, and a sound wave generated by the transducer 112 may be transmitted through the first sound guiding hole 1111 such that the sound wave may be transmitted into the external ear canal 101. It should be noted that the first sound guiding hole 1111 may also be disposed on the lower side surface LS of the housing 111 or may be disposed at a corner between the inner side surface IS and the lower side surface LS.

In some embodiments, when the sound production component 11 has a closed rear cavity 114 (e.g., a second sound guiding hole 1112 is not disposed on the housing 111), the resistance of the diaphragm during vibration may be relatively large, which may affect output performance of the sound production component 11. For example, in the low-frequency and large-amplitude process, since air cannot freely enter or exit the rear cavity 114, the diaphragm may encounter a relatively large resistance when vibrating at a low frequency and a large amplitude, which may affect the low-frequency output performance of the sound production component 11. In some embodiments, the second sound guiding hole 1112 may be disposed on the housing 111. The second sound guiding hole 1112 may be in acoustic communication with the rear cavity 114 corresponding to the rear side of the diaphragm such that a sound (or referred to as a second sound) generated by a rear side of the diaphragm may be guided out. In some embodiments, the second sound guiding hole 1112 may be configured to communicate an inside (e.g., the rear cavity 114) of the sound production component 11 with an outside of the second sound guiding hole 1112, and the air may freely enter and exit the rear cavity 114 to balancing a pressure in the rear cavity 114 such that the diaphragm may fully vibrate at the low frequency and the large amplitude, which may increase a sound pressure of the sound (or first sound) at a portion of low frequencies generated by a front side of the diaphragm, thereby improving the low-frequency output performance of the sound production component 11.

In some embodiments, a parameter of the second sound guiding hole 1112 may be configured such that in a preset frequency range, the second sound guiding hole 1112 may increase the sound pressure of the sound (or the first sound) at a portion of low frequencies generated by the front side of the diaphragm, which may improve the low-frequency output performance of the sound production component 11. In some embodiments, to enable the second sound guiding hole 1112 to increase the sound pressure of the first sound at a portion of low frequencies in the preset frequency range, a size of an effective area of the second sound guiding hole 1112 may be adapted to a size of the diaphragm of the sound production component 11. For example, the larger the area of the diaphragm, the larger the effective area of the second sound guiding hole 1112 to be disposed. The area of the diaphragm refers to an area of a projection of the diaphragm on a plane perpendicular to a vibration direction of the diaphragm. In some embodiments, an acoustic resistance mesh may be disposed at the second sound guiding hole 1112, and the effective area of the second sound guiding hole 1112 may be related to an opening area of the second sound guiding hole 1112 and/or a mesh count of the acoustic resistance mesh. Therefore, in some embodiments, when the area or an area range of the diaphragm is determined, the opening area of the second sound guiding hole 1112 and/or the mesh count of the acoustic resistance mesh may be configured such that the second sound guiding hole 1112 may increase the sound pressure of the first sound at a portion of low frequencies within the preset frequency range. Alternatively, a ratio of the opening area of the second sound guiding hole 1112 to the area of the diaphragm and/or the mesh count of the acoustic resistance mesh may be configured such that the second sound guiding hole 1112 may increase the sound pressure of the first sound at a portion of the low frequency within the preset frequency range. For example, the ratio of the opening area of the second sound guiding hole 1112 to the area of the diaphragm may be within a range of 0.1-0.4, and the mesh count of the acoustic resistance mesh may be within a range of 50-120, such that there may be a plurality of frequency values within a range of 100 Hz-1000 Hz, the second sound guiding hole 1112 may increase the sound pressure of the first sound corresponding to each frequency value of the plurality of frequency values, and at each frequency value, the second sound guiding hole 1112 may increase the sound pressure of the first sound by 0 dB-60 dB. As another example, the ratio of the opening area of the second sound guiding hole 1112 to the area of the diaphragm may be within a range of 0.12-0.35, and the mesh count of the acoustic resistance mesh may be within a range of 60-100 such that there may be a plurality of frequency values within a range of 150 Hz-800 Hz, the second sound guiding hole 1112 may increase the sound pressure of the first sound corresponding to each frequency value of the plurality of frequency values, and at each frequency value, the second sound guiding hole 1112 may increase the sound pressure of the first sound by 5 dB-60 dB. As another example, the ratio of the opening area of the second sound guiding hole 1112 to the area of the diaphragm may be within a range of 0.15-0.3, and the mesh count of the acoustic resistance mesh may be within a range of 70-90 such that there may be a plurality of frequency values within a range of 200 Hz-500 Hz, the second sound guiding hole 1112 may increase the sound pressure of the first sound corresponding to each frequency value of the plurality of frequency values, and at each frequency value, the second sound guiding hole 1112 may increase the sound pressure of the first sound by 20 dB-60 dB. As another example, the ratio of the opening area of the second sound guiding hole 1112 to the area of the diaphragm may be within a range of 0.15-0.3, and the mesh count of the acoustic resistance mesh may be within a range of 70-90 such that at about 300 Hz, the sound guiding hole 1112 may increase the sound pressure of the first sound by about 25 dB. As another example, the ratio of the opening area of the second sound guiding hole 1112 to the area of the diaphragm may be within a range of 0.15-0.3, and the mesh count of the acoustic resistance mesh may be within a range of 70-90 such that at about 600 Hz, the sound guiding hole 1112 may increase the sound pressure of the first sound by about 11 dB. As another example, the ratio of the opening area of the second sound guiding hole 1112 to the area of the diaphragm may be within a range of 0.15-0.3, and the mesh count of the acoustic resistance mesh may be within a range of 70-90 such that at about 800 Hz, the sound guiding hole 1112 may increase the sound pressure of the first sound by about 5 dB. It should be noted that since a sidewall of the housing 111 has a certain thickness, the sound guiding holes disposed on the sidewall are holes with a certain depth. At this point, each acoustic hole may have an inner opening and an outer opening. For the convenience of description, in the present disclosure, the opening area of the second sound guiding hole 1112 refers to an area of the inner opening of the sound guiding hole. In addition, a count of the second sound guiding hole 1112 may be one or more. When there are a plurality of second sound guiding holes, the opening area of the second sound guiding hole 1112 refers to a total opening area of the plurality of second sound guiding holes 1112.

FIGS. 7A-7G are graphs illustrating frequency response curves of a first sound when a second sound guiding hole is blocked (i.e., the hole blocked) or not blocked (i.e., the hole opened) according to some embodiments of the present disclosure. FIGS. 7A-7G sequentially show the frequency response curves of the first sound when the second sound guiding hole 1112 is blocked or not blocked at given test signals of different amplitudes (e.g., 0, −1 bar, −2 bars, −3 bars, −4 bars, −5 bars, −6 bars). As shown in FIGS. 7A-7G, 0 denotes that the amplitude of the test signal is 0 dBFs; −1 bars denotes that the amplitude of the test signal is −3 dBFs; −2 bars denotes that the amplitude of the test signal is −6 dBFs; −3 bars denotes that the amplitude of the test signal is −9 dBFs; −4 bars denotes that the amplitude of the test signal is −12 dBFs; −5 bars denotes that the amplitude of the test signal is −15 dBFs; and −6 bars denotes that the amplitude of the test signal is −18 dBFs. The 0 (0 dBFs) may represent a theoretical maximum volume of the test signal, and the volume corresponding to the 0 to −6 bars may decrease in turn. In some embodiments, to determine the influence of the second sound guiding hole 1112 on the first sound, sound pressures in the frequency response curves shown in FIGS. 7A-7G may be obtained by testing in the following manner: in a non-wearing state, a sound pressure at 1 mm-10 mm directly in front of the hole 1111 may be collected by a sound acquisition device in a case that the second sound guiding hole 1112 is blocked (e.g., the second sound guiding hole may be blocked with a material such as plasticine, adhesive tape, glue, or the like, or any combination thereof) and in a case that the second sound guiding hole 1112 is not blocked, respectively. The influence of the material blocking the second sound guiding hole 1112 on a vibration system of the sound production component 11 may be ignored. In addition, to reduce or avoid the influence of a sound wave transmitted from the second sound guiding hole 1112 on a sound wave transmitted from the first sound guiding hole 1111 when the second sound guiding hole 1112 is not blocked, a partition with a sufficient insulation effect on the sound wave may be disposed between the second sound guiding hole 1112 and the first sound guiding hole 1111 to separate the second sound guiding hole 1112 from the first sound guiding hole 1111. In some embodiments, a ratio of an opening area of the second sound guiding hole 1112 corresponding to FIGS. 7A-7G to an area of the diaphragm may be within a range of 0.1-0.4. A mesh count of an acoustic resistance mesh may be within a range of 60-100. Merely by way of example, the area of the diaphragm may be 140 $mm^2$-210 $mm^2$ (e.g., 176 $mm^2$), the opening area of the second sound guiding hole 1112 may be about 25 $mm^2$, and the mesh count of the acoustic resistance mesh disposed at the second sound guiding hole 1112 may be 80 mesh.

As shown in FIGS. 7A-7G, when test signals of different amplitudes are given and in a frequency smaller than 1000 Hz (e.g., in a range of 100 Hz-950 Hz), sound pressure amplitudes of the frequency response curves corresponding to the second sound guiding hole not blocked may be significantly greater than sound pressure amplitudes of the frequency response curves corresponding to the second sound guiding hole blocked. That is, the sound pressure of the first sound at a portion of low frequencies may be significantly increased by disposing the second sound guiding hole. In addition, at a portion of low frequencies, the lower the frequency, the greater the sound pressure of the first sound increased by the second sound guiding hole. For example, as shown in FIGS. 7A-7G, at around 800 Hz, the sound pressure increased by the second sound guiding hole may be about 5 dB; at around 500 Hz, the sound pressure increased by the second sound guiding hole may be about 15 dB; and at around 100 Hz, the sound pressure increased by the second sound guiding hole may be about 35 dB.

In some embodiments, in the wearing state, the first sound guiding hole 1111 may be located closer to an inside of an ear canal than the second sound guiding hole 1112. For example, for the earphone 10 shown in FIG. 3, the first sound guiding hole 1111 may be disposed on a lower side of the sound production component 11 in the short-axis direction Z, and the second sound guiding hole 1112 may be disposed on an upper side or other sides of the sound production component 11. The first sound guiding hole 1111 may be located closer to the inside of the ear canal than the second sound guiding hole 1112. As another example, in the earphone 10 shown in FIG. 4, the first sound guiding hole 1111 may be disposed on an inner side of the housing 111 towards an auricle, and the second sound guiding hole 1112 may be disposed on an outer side opposite to the inner side or other sides. The first sound guiding hole 1111 may be located closer to the inside of the ear canal than the second sound guiding hole 1112. In such cases, the first sound transmitted from the first sound guiding hole 1111 may be transmitted toward the inside of the ear canal of the user.

A second sound transmitted from the second sound guiding hole 1112 may be transmitted to a spatial position (also referred to as a far field) away from the ear canal of the user, thereby forming a sound leakage. In some embodiments, a structure and/or wearing position of the earphone 10 may be configured such that the first sound guided by the first sound guiding hole may be transmitted to the spatial position away from the ear canal of the user. Since the first sound guided from the first sound guiding hole 1111 and the second sound guided from the second sound guiding hole 1112 have opposite or approximately opposite phases, the first sound guided from the first sound guiding hole 1111 and the second sound transmitted from the second sound guiding hole may cancel each other at the spatial position, thereby reducing the sound leakage generated by the second sound guiding hole 1112. That is, the structure and/or wearing position of the earphone 10 may be configured such that the sound production component 11 may produce sounds with a phase difference through the first sound guiding hole 1111 and the second sound guiding hole 1112, respectively, and the sounds with the phase difference may interfere with each other in the far field to achieve a sound leakage reduction effect of a dual sound source. In this case, the second sound transmitted from the second sound guiding hole 1112 may also enter the ear canal and interfere with the first sound transmitted from the first sound guiding hole 1111 in the ear canal (also referred as to a near field). Therefore, the structure and/or wearing position of the earphone 10 may be configured so as to reduce the sound pressure of the second sound transmitted to the inside of the ear canal to reduce the interference cancellation between the second sound and the first sound in the near field, thereby improving the listening effect of the earphone 10.

In some embodiments, the suspension structure 12 may be configured such that the sound production component 11 may be placed on the ear 100 (e.g., the auricle, the concha cavity) of the user and the sound production component 11 may cooperate with the ear 100 to form a cavity (or referred to as a like-cavity structure). The like-cavity structure may communicate with the ear canal. The first sound guiding hole 1111 disposed on the housing 111 may be at least partially located inside the like-cavity structure, and the second sound guiding hole 1112 may be located outside the like-cavity structure. In such cases, in the wearing state, the sound wave generated by the diaphragm of the transducer 112 and transmitted through the first sound guiding hole 1111 may be limited by the like-cavity structure, i.e., the like-cavity structure may gather the sound wave such that the sound wave may be transmitted more into the ear canal, which may improve the volume and sound quality of the sound heard by the user in the near field, thereby improving the acoustic effect of the earphone 10. In some embodiments, in the wearing state, an opening between the sound production component 11 and an opening of the ear canal of the user for acoustic communication with the spatial position (e.g., far field) may be provided such that the like-cavity structure may be semi-open. In such cases, the first sound generated by the transducer 112 and transmitted through the first sound guiding hole 1111 may be transmitted to the spatial position outside the ear and the earphone 10 through the opening between the sound production component 11 and the ear canal of the user. In addition, the second sound transmitted through the second sound guiding hole 1112 on the housing 111 may form a leakage sound at the spatial position, and the first sound and the second sound may have the phase difference such that the first sound and the second sound may cancel at the spatial position, which may reduce the sound leakage of the earphone 10 (or the second sound guiding hole 1112) at the spatial position.

Figure 8:
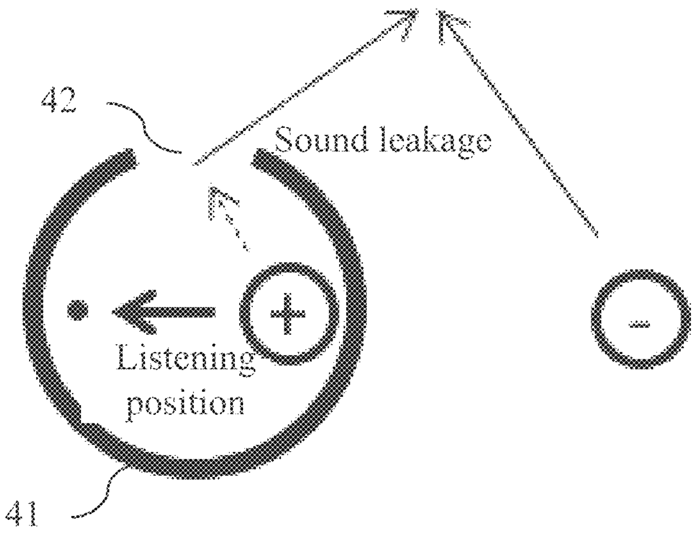
FIG. 8 is a schematic diagram illustrating an exemplary cavity structure disposed around one of dual sound sources according to some embodiments of the present disclosure.

FIG. 8 is a schematic diagram illustrating an exemplary cavity structure disposed around one of dual sound sources according to some embodiments of the present disclosure. As shown in FIG. 8, when a cavity structure 41 is disposed between the dual sound sources, one of the dual sound sources and a listening position may be disposed inside the cavity structure 41, and the other of the dual sound sources may be outside the cavity structure 41. In the present disclosure, the "cavity structure" may be understood as a semi-closed structure enclosed by a sidewall of the sound production component 11 and the concha cavity structure. The semi-closed structure may make the inside not completely sealed off from an external environment, but have a leaking structure 42 (e.g., an opening, a gap, a tube, etc.) in acoustic communication with the external environment. An exemplary leaking structure may include, but is not limited to, the opening, the gap, the tube, or the like, or any combination thereof.

In some embodiments, the cavity structure 41 may include a listening position and at least one sound source. The "include" here may refer to that at least one of the listening position or the sound source is located inside the cavity, or may refer to that at least one of the listening position or the sound source is located at an inner edge of the cavity. In some embodiments, the listening position may be equivalent to an opening of an ear canal or an acoustic reference point of an ear.

Figure 9A:
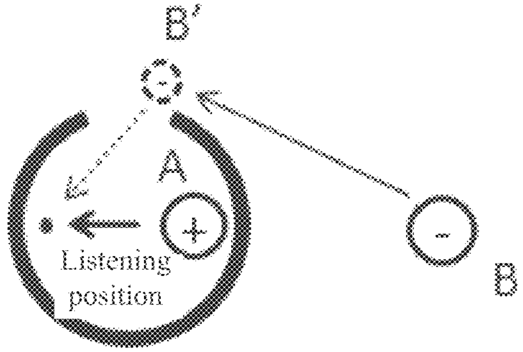
FIG. 9A is a schematic diagram illustrating a listening principle of a dual-sound-source structure with a cavity structure disposed around one of the dual sound sources according to some embodiments of the present disclosure.
Figure 9B:
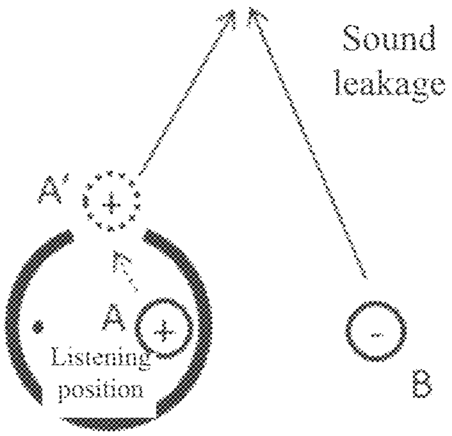
FIG. 9B is a schematic diagram illustrating a sound leakage principle of a dual-sound-source structure with a cavity structure disposed around one of dual sound sources according to some embodiments of the present disclosure.

FIG. 9A is a schematic diagram illustrating a listening principle of a dual-sound-source structure with a cavity structure disposed around one of the dual sound sources according to some embodiments of the present disclosure. FIG. 9B is a schematic diagram illustrating a sound leakage principle of a dual-sound-source structure with a cavity structure disposed around one of the sound sources according to some embodiments of the present disclosure.

For near-field listening sound, such as the dual sound sources with the cavity structure disposed around one of the dual sound sources shown in FIG. 9A, since one sound source A is surrounded by the cavity structure, most of a sound radiated from the sound source A may reach a listening position through direct radiation or reflection. In contrast, most of the sound radiated from the sound source may not reach the listening position without the cavity structure. Therefore, the cavity structure may significantly increase a sound volume reaching the listening position. Meanwhile, only a small portion of anti-phase sound radiated from an anti-phase sound source B outside the cavity structure may enter the cavity structure through the leaking structure of the cavity structure, which may be equivalent to generating a secondary sound source B' at the leaking structure, and an intensity of the secondary sound source B' may be significantly smaller than that of the sound source B and also be significantly smaller than that of the sound source A. A sound produced by the secondary sound source B' may have a weak cancellation effect on the sound source A in the cavity, which may significantly increase the listening volume at the listening position.

For sound leakage, as shown in FIG. 9B, the sound source A may radiate sound to the outside through the leaking structure of the cavity, which may be equivalent to generating the secondary sound source A' at the leaking structure. Since almost all the sound radiated by sound source A is output from the leaking structure, and a scale of the cavity structure is much smaller than a spatial scale for evaluating the sound leakage (a difference is at least one order of magnitude), an intensity of the secondary sound source A' may be considered equivalent to the intensity of the sound source A. For the external space, the sound cancellation effect produced by the secondary sound source A' and the sound source B in a far field may be equivalent to the sound cancellation effect produced by the sound source A and the sound source B in the far field. That is, a considerable sound leakage reduction effect may still be maintained under the cavity structure.

It should be understood that the leaking structure of one opening is only an example, and the leaking structure of the cavity structure may include one or more openings, which may also achieve a better listening index. The listening index refers to a reciprocal 1/α of a sound leakage index α. The sound leakage index α

$$\left(\alpha = \frac{|P_{far}|^2}{|P_{ear}|^2}\right)$$

may be related to a sound pressure $P_{ear}$ transmitted to an ear of a user by the earphone and a sound pressure $P_{far}$ transmitted to a spatial position. In some embodiments, the sound leakage index α may be used as an indicator to evaluate an ability to reduce sound leakage. The smaller the sound leakage index, the stronger the ability to reduce sound leakage.

Based on the principle illustrated in the embodiments, on the one hand, the second sound guiding hole 1112 may be configured to increase a sound pressure of a first sound at a portion of low frequencies transmitted to an inside of an ear canal of the user. On the other hand, the sound production component 11 in a wearing state may cooperate with the ear 100 to form a like-cavity structure, and the like-cavity structure may have an opening communicating with the spatial position, which may significantly increase the listening volume at the listening position while still maintaining the considerable sound leakage reduction effect. In some embodiments, to measure the sound leakage reduction effect of the first sound guided to the spatial position through the opening, a test may be carried out in the following manner: a spatial position 500 mm away from the sound production component (e.g., a diaphragm or a second sound guiding hole) is determined as a spatial position for measuring a sound leakage; the earphone 10 is placed on the ear of a tester or the ear model, a sound pressure measured by placing a microphone at the spatial position may be a sound pressure of the sound leakage after the first sound passes through the opening and interferes with the second sound at the spatial position; and under a same excitation signal, the first sound guiding hole is blocked to simulate a situation where there is no opening between the sound production component and the ear canal of the user, and the sound pressure measured by placing the microphone at the spatial position may be a sound pressure of the sound leakage formed by the second sound that does not interfere with the first sound at the spatial position.

In some embodiments, since the concha cavity has a certain volume and depth, when at least a portion of the sound production component 11 (e.g., a free end FE) extends into the concha cavity, there may be a certain distance between an inner side surface IS of the sound production component 11 on which the first sound guiding hole 1111 is disposed and the concha cavity. In other words, the sound production component 11 may cooperate with the concha cavity to form a cavity (or referred to as a like-cavity structure) in the wearing state, and the like-cavity structure may communicate with the external ear canal. At least portion of the first sound guiding hole 1111 on the housing 111 may be located inside the like-cavity structure, and the second sound guiding hole 1112 may be located outside the like-cavity structure. In such cases, in the wearing state, sound waves generated by the diaphragm of the transducer 112 and transmitted through the first sound guiding hole 1111 may be limited by the like-cavity structure, i.e., the like-cavity structure may gather the sound waves such that the sound waves may be transmitted more into the external ear canal, which may improve the volume and sound quality of the sound heard by the user in the near field, thereby improving the acoustic effect of the earphone 10. Further, when the suspension structure 12 wears the sound production component 11 on the ear of the user, since an overall contour of the concha cavity is an irregular structure similar to an arc, the sound production component 11 may not completely cover or fit the contour of the concha cavity, thus several gaps may be formed. The several gaps may be regarded as the opening provided between the sound production component 11 and the ear canal (e.g., an inner wall of the concha cavity) of the user in acoustic communicate with the spatial position (i.e., the far field). The opening may correspond to the leaking structure 42 described in FIG. 5 above such that the like-cavity structure may be semi-open. In such cases, the first sound generated by the transducer 112 and transmitted through the first sound guiding hole 1111 may be transmitted to the spatial position outside the ear and the earphone 10 through the opening between the sound production component 11 and the ear canal (e.g., a portion of the concha cavity not covered by the sound production component 11) of the user. In addition, the second sound transmitted through the second sound guiding hole 1112 on the housing 111 may form a sound leakage at the spatial position, and the first sound and the second sound may have a phase difference such that the first sound and the second sound may cancel each other at the spatial position, which may reduce the sound leakage of the earphone 10 (or the second sound guiding hole 1112) at the spatial position.

Figure 10A:
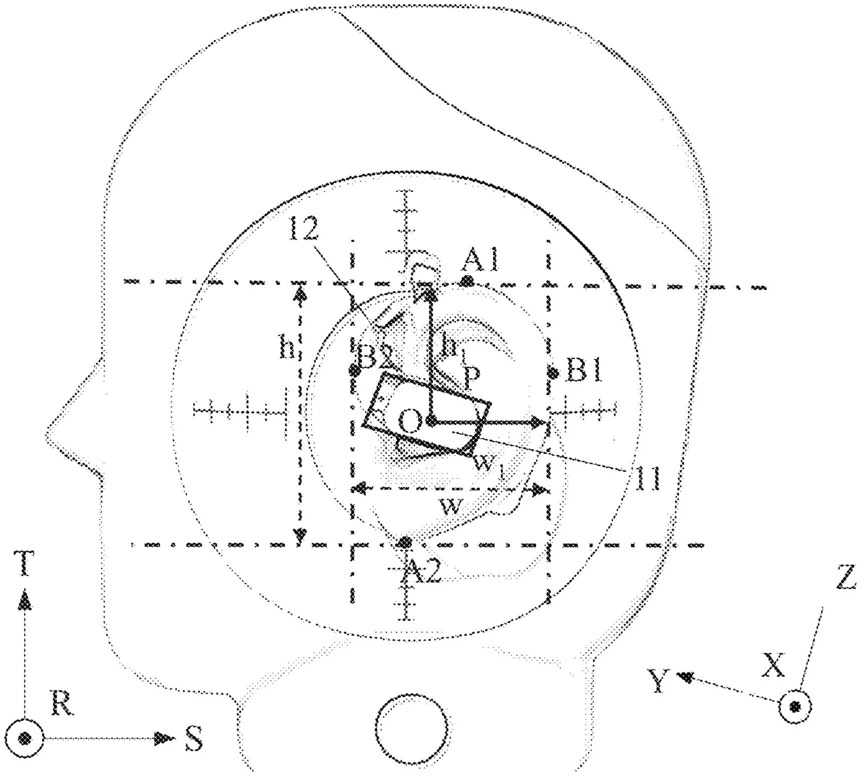
FIG. 10A and FIG. 10B are schematic diagrams illustrating exemplary wearing states of an earphone according to some embodiments of the present disclosure.
Figure 10B:
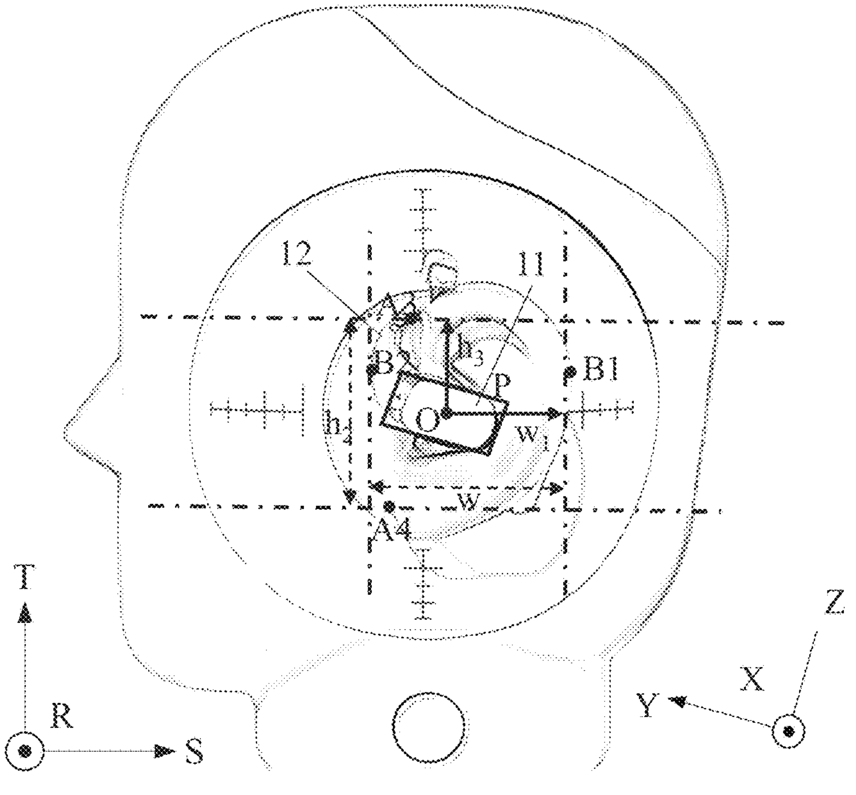

FIG. 10A and FIG. 10B are schematic diagrams illustrating exemplary wearing states of an earphone according to some embodiments of the present disclosure.

Referring to FIG. 4 and FIG. 10A, in some embodiments, when the user wears the earphone 10, the sound production component 11 may have a first projection on a sagittal plane (i.e., a plane formed by a T-axis and an S-axis in FIG. 10A) along a coronal axis direction R. A shape of the sound production component 11 may be a regular or irregular three-dimensional shape. Correspondingly, the first projection of the sound production component 11 on the sagittal plane may have a regular or irregular shape. For example, when the shape of the sound production component 11 is a cuboid, a quasi-cuboid, or a cylinder, the first projection of the sound production component 11 on the sagittal plane may have a rectangle or a quasi-rectangle shape (e.g., a racetrack shape). Considering that the first projection of the sound production component 11 on the sagittal plane may have the irregular shape, for the convenience of describing the first projection, a rectangular region shown by a solid line box P may be delineated around the projection (i.e., the first projection) of the sound production component 11 in FIG. 10A and FIG. 10B, and a centroid O of the rectangular region shown by the solid line box P may be approximately regarded as the centroid of the first projection. It should be noted that the above description of the first projection and the centroid thereof is only an example, and the shape of the first projection is related to the shape of the sound production component 11 or the wearing condition relative to the ear. An auricle may have a second projection on the sagittal plane along the coronal axis R. To make at least a portion of the sound production component 11 extend into the concha cavity when the earphone 10 is in the wearing state. In some embodiments, a ratio of a distance $h_1$ (also referred to as a first distance) between the centroid O of the first projection and a highest point of the second projection in a vertical axis direction (e.g., the T-axis direction in FIG. 10A) to a height h of the second projection in the vertical axis direction may be within a range of 0.25-0.6, and the ratio of a distance $w_1$ (also referred to as a second distance) between the centroid O of the first projection and an end point of the second projection in the sagittal axis direction (e.g., the S-axis direction shown in FIG. 10A) to a width w of the second projection in the sagittal axis direction may be within a range of 0.4-0.7. In some embodiments, the sound production component 11 and the suspension structure 12 may be two independent structures or an integrated structure. Merely by way of example, a process for determining the solid-line box P may be as follows: two farthest points of the sound production component 11 in the long-axis direction Y may be determined, and a first line segment and a second line segment parallel to the short-axis direction Z through these two farthest points may be determined, respectively; two farthest points of the sound production component 11 in the short-axis direction Z may be determined, a third line segment and a fourth line segment parallel to the long-axis direction Y through the two farthest points may be determined, respectively; and the rectangular region of the solid line box P shown in FIG. 10A and FIG. 10B may be obtained by a region formed by the line segments.

The highest point of the second projection may be understood as a point with a largest distance in the vertical axis direction relative to a projection of a certain point of a neck of the user on the sagittal plane among all projection points of the auricle, i.e., a projection of the highest point of the auricle (e.g., point A1 in FIG. 10A) on the sagittal plane may be the highest point of the second projection. A lowest point of the second projection may be understood as a point with a smallest distance in the vertical axis direction relative to the projection of a certain point of the neck of the user on the sagittal plane among all the projection points of the auricle, i.e., a projection of the lowest point of the auricle (e.g., point A2 in FIG. 10A) on the sagittal plane may be the lowest point of the second projection. A height of the second projection in the vertical axis direction may be a distance (height h shown in FIG. 10A) between the point with the largest distance and the point with the smallest distance in the vertical axis direction relative to the projection of the certain point of the neck of the user on the sagittal plane among all the projection points in the second projection, i.e., the distance between point A1 and point A2 in the vertical axis direction T. The end point of the second projection may be understood as a point with the largest distance in the sagittal axis direction relative to a projection of a nose tip of the user on the sagittal plane among all the projection points, i.e., the projection of the end point of the auricle (e.g., point B1 in FIG. 10A) on the sagittal plane may be the end point of the second projection. A front end point of the second projection may be understood as a point with the smallest distance in the sagittal axis direction relative to the projection of the tip nose of the user on the sagittal plane among all projection points, i.e., the projection of the front end point of the auricle (e.g., point B2 in FIG. 10A) on the sagittal plane may be the front end point of the second projection. The width of the second projection in the sagittal axis direction may be a difference (the width w shown in FIG. 10A) between the point with the largest distance and the point with the smallest point along the sagittal axis direction relative to the projection of the nose tip on the sagittal plane among all projection points in the second projection, i.e., the distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the present disclosure hereinafter.

In some embodiments, to make a whole or a portion of the sound production component 11 extend into the concha cavity, the ratio of the distance $h_1$ between the centroid O of the first projection and the highest point of the second projection in the vertical axis direction to the height h of the second projection in the vertical axis direction may be within a range of 0.35-0.6, and the ratio of the distance $w_1$ between the centroid O of the first projection and the end point of the second projection in the sagittal axis direction to the width w of the second projection in the sagittal axis direction may be within a range of 0.4-0.65. In some embodiments of the present disclosure, when the user wears the earphone, the ratio of the distance $h_1$ between the centroid O of the first projection and the highest point of the second projection in the vertical axis direction to the height h of the second projection in the vertical axis direction may be within a range of 0.35-0.6 and the ratio of the distance between the centroid of the first projection and the end point of the second projection in the sagittal axis direction to the width of the second projection in the sagittal axis direction may be controlled to be within a range of 0.4-0.65 such that at least a portion of the sound production component 11 may extend into the concha cavity and form an acoustic model shown in FIG. 8 with the concha cavity of the user, which may improve the listening volume of the earphone at the listening position (e.g., the ear canal), especially the listening volume at the medium and low frequency, while maintaining a good sound leakage reduction effect in the far field. When the portion or the whole of the sound production component 11 extends into the concha cavity, the first sound guiding hole 1111 may be closer to the inside of the ear canal, which further increases the listening volume inside the ear canal. In addition, the concha cavity may support and limit the sound production component 11 to a certain extent, thereby improving the stability of the earphone in the wearing state.

It should be noted that an area of the first projection of the sound production component 11 on the sagittal plane is generally much smaller than an area of a projection of the auricle on the sagittal plane such that the opening of the ear canal of the user may not be blocked when the user wears the earphone 10, and a load on the user when wearing the earphone may be reduced, which is convenient for the user to carry. In such cases, in the wearing state, when the ratio of the distance $h_1$ between the centroid O of the projection (the first projection) of the sound production component 11 on the sagittal plane and the projection of the highest point A1 of the auricle on the sagittal plane (the highest point of the second projection) in the vertical axis direction to the height h of the second projection in the vertical axis direction is too small or too large, a portion of the sound production component 11 may be located above the top of the auricle or at the earlobe of the user, the auricle may not sufficient support and limit the sound production component 11 such that the wearing is unstable and easy to fall off; on the other hand, the sound guiding hole on the sound production component 11 may be away from the opening of the ear canal, which may affect the listening volume at the opening of the ear canal of the user. To ensure the stability and comfort of the user wearing the earphone and improve a relatively good listening effect of the earphone without blocking the opening of the ear canal of the use, in some embodiments, the ratio of the distance $h_1$ between the centroid O of the first projection and the highest point A1 of the second projection in the vertical axis direction to the height h of the second projection in the vertical axis direction may be within a range of 0.35-0.6 such that when the portion or the whole structure of the sound production component extends into the concha cavity, the force exerted by the concha cavity on the sound production component 11 may support and limit the sound production component 11, thereby improving the wearing stability and comfort of the earphone. In addition, the sound production component 11 may also form the acoustic model shown in FIG. 8 with the concha cavity to improve the listening volume of the user at the listening position (e.g., the ear canal) and reduce the volume of the sound leakage in the far field. In some embodiments, the ratio of the distance $h_1$ between the centroid O of the first projection and the highest point A1 of the second projection in the vertical axis direction to the height h of the second projection in the vertical axis direction may be within a range of 0.35-0.55. In some embodiments, the ratio of the distance $h_1$ between the centroid O of the first projection and the highest point of the second projection in the vertical axis direction to the height h of the second projection in the vertical axis direction may be within a range of 0.4-0.5.

Similarly, when the ratio of the distance $w_1$ between the centroid O of the first projection and the end point of the second projection in the sagittal axis direction to the width w of the second projection in the sagittal axis direction is too large or too small, the portion or whole of the structure of the sound production component 11 may be located in a facial region on a front side of the ear, or extend out of an outer contour of the auricle, which may also cause the problem that the sound production component 11 cannot construct the acoustic model shown in FIG. 10 with the concha cavity and also lead to unstable wearing of the earphone 10. According to the earphone provided in the embodiments of the present disclosure, the ratio of the distance $w_1$ between the centroid O of the first projection and the end point of the second projection in the sagittal axis direction to the width w of the second projection in the sagittal axis direction may be within a range of 0.4-0.7, thereby improving the wearing stability and comfort of the earphone while ensuring the acoustic output effect of the sound production component. In some embodiments, the ratio of the distance $w_1$ between the centroid O of the first projection and the end point of the second projection in the sagittal axis direction to the width w of the second projection in the sagittal axis direction may be within a range of 0.45-0.68. In some embodiments, the ratio of the distance $w_1$ between the centroid O of the first projection and the end point of the second projection in the sagittal axis direction to the width w of the second projection in the sagittal axis direction may be within a range of 0.5-0.6.

For example, the height h of the second projection in the vertical axis direction may be 55 mm-65 mm. In the wearing state, if the distance $h_1$ between the centroid O of the first projection and the highest point of the second projection on the sagittal plane in the vertical axis direction is smaller than 15 mm or greater than 50 mm, the sound production component 11 may be located away from the concha cavity, which not only fails to construct the acoustic model shown in FIG. 8, but also has the problem of unstable wearing. Therefore, to ensure the acoustic output effect of the sound production component 11 and the wearing stability of the earphone 10, the distance $h_1$ between the centroid O of the first projection and the highest point of the second projection in the vertical axis direction may be within a range of 15 mm-50 mm. Similarly, in some embodiments, the width of the second projection in the sagittal axis direction may be within a range of 40 mm-55 mm. When the distance between the centroid O of the first projection on the sagittal plane and the end point of the second projection in the sagittal axis direction is greater than 45 mm or smaller than 15 mm, the sound production component 11 may be too far forward or too far backward relative to the ear of the user such that the sound production component 11 may not construct the acoustic model shown in FIG. 8 and the unstable wearing of the earphone 10 may be caused. Therefore, to ensure the acoustic output effect of the sound production component 11 and the wearing stability of the earphone 10, the distance between the centroid O of the first projection and the end point of the second projection in the sagittal axis direction may be within a range of 15 mm-45 mm.

Figure 11:
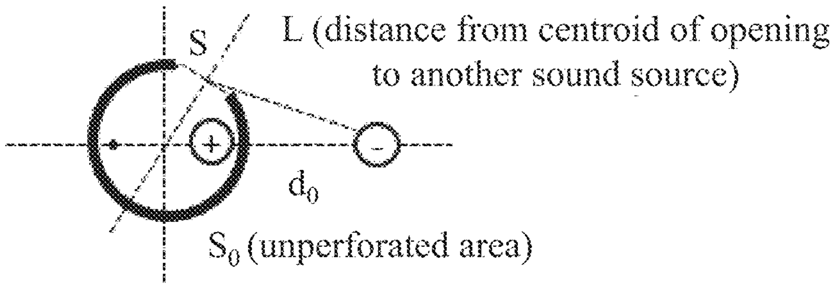
FIG. 11 is a schematic diagram illustrating a like-cavity structure according to some embodiments of the present disclosure.
Figure 12:
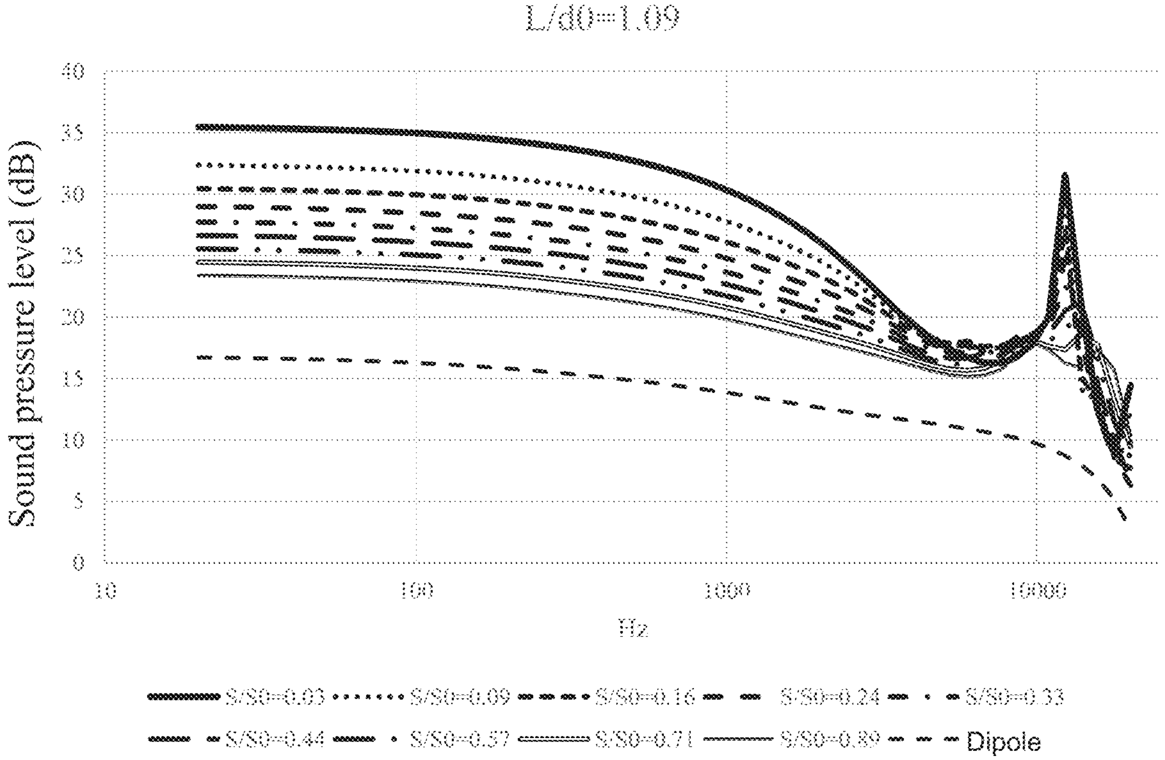
FIG. 12 is a graph illustrating listening index curves of like-cavity structures with leaking structures of different sizes according to some embodiments of the present disclosure.

FIG. 11 is a schematic diagram illustrating a like-cavity structure according to some embodiments of the present disclosure. FIG. 12 is a graph illustrating listening index curves of like-cavity structures with leaking structures of different sizes according to some embodiments of the present disclosure. As shown in FIG. 11, an opening area of the leaking structure on the like-cavity structure may be represented as S, and an area of the like-cavity structure directly affected by a contained sound source (e.g., "+" shown in FIG. 11) may be represented as $S_0$. The "direct affected" here means that the sound emitted by the contained sound source may directly acoustically act on a wall of the like-cavity structure without passing through the leaking structure. A distance between the dual sound sources is $d_0$, and a distance from a centroid of the opening of the leaking structure to another sound source (e.g., "–" shown in FIG. 11) is L. As shown in FIG. 12, $L/d_0=1.09$, the larger a relative opening $S/S_0$, the smaller the listening index. This is because the larger the relative opening, the more sound components that the contained sound source radiates directly outward, and the less sound reaching the listening position, causing the listening volume to decrease with the increase of the relative opening, which in turn leads to the decrease of the listening index. Accordingly, the larger the opening, the lower the listening volume at the listening position.

In some embodiments, considering that the relative position of the sound production component 11 and the ear canal (e.g., the concha cavity) of the user may affect a size of the gap formed between the sound production component 11 and the concha cavity, e.g., when the free end FE of the sound production component 11 abuts against the concha cavity, the size of the gap may be relatively small, and when the free end FE of the sound production component 11 does not abut against the cavity of the concha cavity, the size of the gap may be relatively large. The gap formed between the sound production component 11 and the concha cavity may be regarded as the leaking structure in the acoustic model in FIG. 8. The relative position of the sound production component 11 and the ear canal (e.g., the concha cavity) of the user may affect a count of leaking structures of the like-cavity structure formed by the sound production component 11 and the concha cavity of the user and the opening size of the leaking structure, and the opening size of the leaking structure may directly affect the listening quality. Specifically, the larger the opening of the leaking structure, the more sound components that the sound production component 11 radiates directly outward, the less sound reaches the listening position. To balance the listening volume of the sound production component 11 and the sound leakage reduction effect to ensure the acoustic output quality of the sound production component 11, the sound production component 11 may be fit as closely as possible to the concha cavity of the user. Correspondingly, the ratio of the distance $h_1$ between the centroid O of the first projection and the highest point of the second projection in the vertical axis direction to the height h of the second projection in the vertical axis direction may be within a range of 0.35-0.6, and the ratio of the distance $w_1$ between the centroid O of the projection and the end point of the second projection in the sagittal axis direction to the width w of the second projection in the sagittal axis direction may be within a range of 0.4-0.65. In some embodiments, to improve the wearing comfort of the earphone 10 while ensuring the acoustic output quality of the sound production component 11, the ratio of the distance $h_1$ between the centroid O of the first projection and the highest point of the second projection in the vertical axis direction to the height h of the second projection in the vertical axis direction may be within a range of 0.35-0.55, and the ratio of the distance $w_1$ between the centroid O of the first projection and the end point of the second projection in the sagittal axis direction to the width w of the second projection in the sagittal axis direction may be within a range of 0.45-0.68. In some embodiments, the ratio of the distance $h_1$ between the centroid O of the first projection and the highest point of the second projection in the vertical axis direction to the height h of the second projection in the vertical axis direction may be within a range of 0.35-0.5, and the ratio of the distance $w_1$ between the centroid O of the first projection and the end point of the second projection in the sagittal axis direction to the width w of the second projection in the sagittal axis direction may be within a range of 0.48-0.6.

In some embodiments, considering that there may be certain differences in the shape and size of the ears of different users, the ratio range may fluctuate within a certain range. For example, when an earlobe of the user is relatively long, the height h of the second projection in the vertical axis direction may be larger than that of the general situation. In such cases, when the user wears the open earphone 100, the ratio of the distance $h_1$ between the centroid O of the first projection and the highest point of the second projection in the vertical axis direction to the height h of the second projection in the vertical axis direction may be smaller, e.g., within a range of 0.2-0.55. Similarly, in some embodiments, when a helix of the user is bent forward, the width w of the second projection in the sagittal axis direction may be smaller than that of the general situation, and the distance $w_1$ between the centroid O of the first projection and the end point of the second projection in the sagittal axis direction may also be relatively small. In such cases, when the user wears the earphone 10, the ratio of the distance $w_1$ between the centroid O of the first projection and the end point of the second projection in the sagittal axis direction to the width w of the second projection in the sagittal axis direction may be larger, e.g., within a range of 0.4-0.75.

The ears of different users are different. For example, some users have relatively long earlobes. In such cases, it may be inappropriate to define the earphone 10 using the ratio of the distance between the centroid O of the first projection and the highest point of the second projection to the height of the second projection on the vertical axis, as shown in FIG. 10B, a highest point A3 and a lowest point A4 of a connection region between the auricle of the user and the head of the user are used for illustration. The highest point of the connection region between the auricle and the head may be understood as a position where the projection of the connection region of the auricle and the head on the sagittal plane has a largest distance from a projection of a specific point of the neck on the sagittal plane. The lowest point of the connection part between the auricle and the head may be understood as a position where the projection of the connection region of the auricle and the head on the sagittal plane has a smallest distance from a projection of a specific point of the neck on the sagittal plane. To balance the listening volume and the sound leakage reduction effect of the sound production component 11 to ensure the acoustic output quality of the sound production component 11, the sound production component 11 may be fit as closely as possible to the concha cavity of the user. Correspondingly, a ratio of a distance $h_3$ between the centroid O of the first projection and the highest point of the projection of the connection region between the auricle and the head on the sagittal plane in the vertical axis direction to a height $h_2$ between the highest point and the lowest point of the projection of the connection region between the auricle and the head on the sagittal plane in the vertical axis direction may be within a range of 0.4-0.65. And the ratio of the distance $w_1$ between the centroid O of the first projection and the end point of the second projection in the sagittal axis direction to the width w of the second projection in the sagittal axis direction may be within a range of 0.4-0.65. In some embodiments, to improve the wearing comfort of the earphone 10 while ensuring the acoustic output quality of the sound production component 11, the ratio of the distance $h_3$ between the centroid O of the first projection and the highest point of the projection of the connection region between the auricle and the head on the sagittal plane in the vertical axis direction to the height $h_2$ between the highest point and the lowest point of the projection of the connection region between the auricle and the head on the sagittal plane in the vertical axis direction may be within a range of 0.45-0.6, and the ratio of the distance $w_1$ between the centroid O of the first projection and the end point of the second projection in the sagittal axis direction to the width w of the second projection in the sagittal axis direction may be within a range of 0.45-0.68. In some embodiments, the ratio of the distance $h_3$ between the centroid O of the first projection and the highest projected point of the connection region between the auricle and the head on the sagittal plane in the vertical axis direction to the height $h_2$ between the highest point and the lowest point of the projection between the connection region of the auricle and the head on the sagittal plane in the vertical axis direction may be within a range of 0.5-0.6, and the ratio of the distance $w_1$ between the centroid O of the first projection and the end point of the second projection in the sagittal axis direction to the width w of the second projection in the sagittal axis direction may be within a range of 0.48-0.6.

Figure 13:
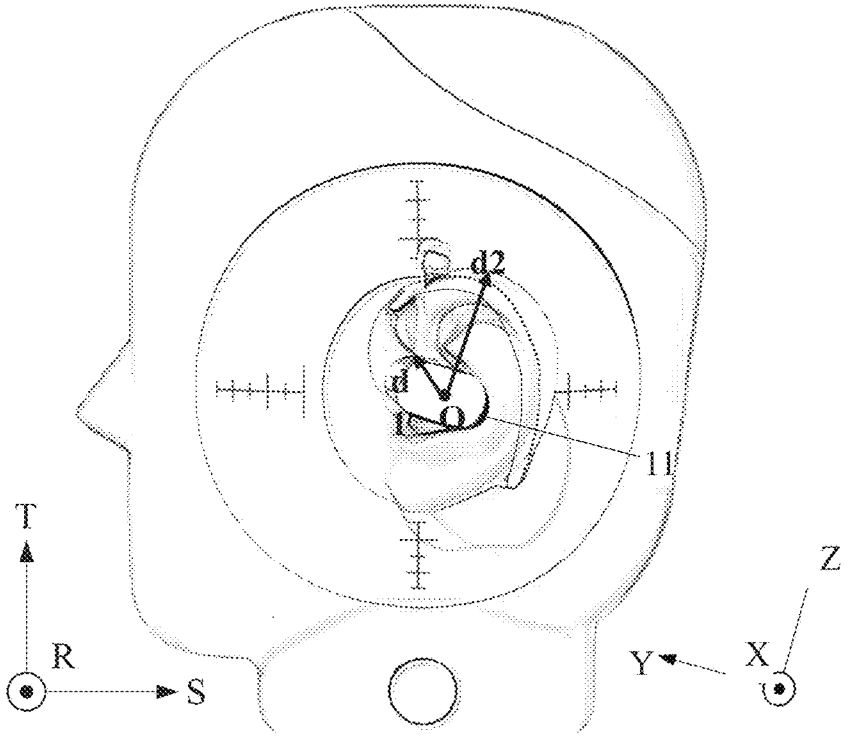
FIG. 13 is a schematic diagram illustrating an exemplary wearing state of an earphone according to other embodiments of the present disclosure.

FIG. 13 is a schematic diagram illustrating an exemplary wearing state of an earphone according to other embodiments of the present disclosure.

Referring to FIG. 4 and FIG. 13, when the user wears the earphone 10 and the sound production component 11 extends into the concha cavity, the centroid O of the first projection may be located in a region enclosed by a contour of the second projection, wherein the contour of the second projection may be understood as a projection of an outer contour of the helix of the user, an earlobe contour, a tragus contour, an intertragic notch, an antitragus tip, a notch between the antitragus and the anthelix, etc. on the sagittal plane. In some embodiments, the listening volume of the sound production component, the sound leakage reduction effect, and the wearing comfort and stability may be improved by adjusting a distance between the centroid O of the first projection and the contour of the second projection. For example, when the sound production component 11 is located at the top of the auricle, the earlobe, the facial region on the front side of the auricle, or between an inner contour 1014 of the auricle and the outer edge of the concha cavity, a distance between the centroid O of the first projection and a point of a certain region of the contour of the second projection may be too small, a distance between the centroid O of the first projection and a point of another region of the contour of the second projection is too large, and the sound production component 11 may not form a like-cavity structure (acoustic model shown in FIG. 8) with the concha cavity, which may affect the acoustic output effect of the earphone 10. To improve the acoustic output quality of the earphone 10, in some embodiments, the distance between the centroid O of the first projection and the contour of the second projection may be within a range of 10 mm-52 mm, i.e., the distance between the centroid O of the first projection and any point of the contour of the second projection may be within a range of 10 mm-52 mm. In some embodiments, to further improve the wearing comfort of the earphone 10 and optimize the like-cavity structure formed by the sound production component 11 and the concha cavity, the distance between the centroid O of the first projection and the contour of the second projection may be within a range of 12 mm-50.5 mm. In some embodiments, the distance between the centroid O of the first projection and the contour of the second projection may be within a range of 13.5 mm-50.5 mm. In some embodiments, by controlling the distance between the centroid O of the first projection and the outline of the second projection to be within a range of 10 mm-52 mm, most of the sound production component 11 may be located near the ear canal of the user, and at least a portion of the sound production component 11 may extend into the concha cavity to form the acoustic model shown in FIG. 8 such that the sound output by the sound production component 11 may be better transmitted to the user. For example, in some embodiments, a minimum distance d1 between the centroid O of the first projection and the contour of the second projection may be 20 mm, and a maximum distance d2 between the centroid O of the first projection and the contour of the second projection may be 48.5 mm.

Figure 14:
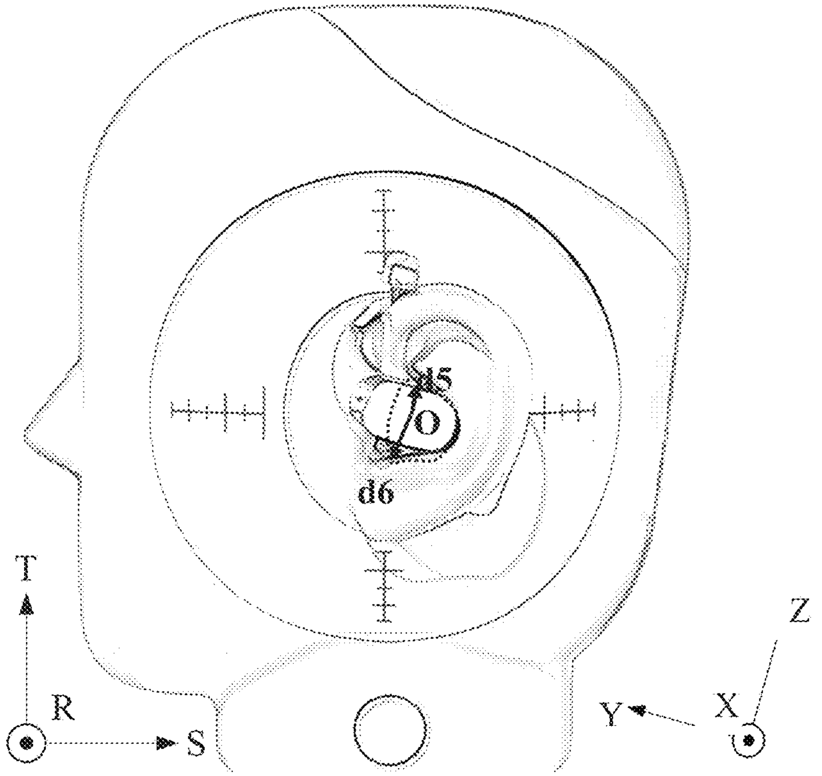
FIG. 14 is a schematic diagram illustrating an exemplary wearing state of an earphone according to other embodiments of the present disclosure.

FIG. 14 is a schematic diagram illustrating an exemplary wearing state of an earphone according to other embodiments of the present disclosure.

Referring to FIG. 14, in some embodiments, a projection of the sound production component 11 on a sagittal plane may overlap with a projection of the concha cavity (e.g., the dotted line in FIG. 14) of the user on the sagittal plane. The overlap region may affect a size of an opening area of the leaking structure 42 of the like-cavity structure 41 in the acoustic model shown in FIG. 8. For example, when the overlap region between the sound production component 11 and the concha cavity is relatively large, the sound production component 11 may cover a relatively large portion of the concha cavity. In such cases, a size of a gap between the sound production component 11 and the concha cavity may be relatively small, i.e., the opening area of the leaking structure 42 of the like-cavity structure 41 may be relatively small. In some embodiments, to improve the listening volume at an ear canal when the user wears the earphone 10, an overlap ratio between an area of the first projection of the sound production component 11 on the sagittal plane and an area of the projection of the concha cavity on the sagittal plane may be within a specific range to control the size of the opening. It should be noted that, in the embodiment of the present disclosure, the overlap ratio may be understood as a ratio of an area of the first projection overlapping with the area of the projection of the concha cavity on the sagittal plane to the area of the projection of the concha cavity on the sagittal plane.

Figure 15:
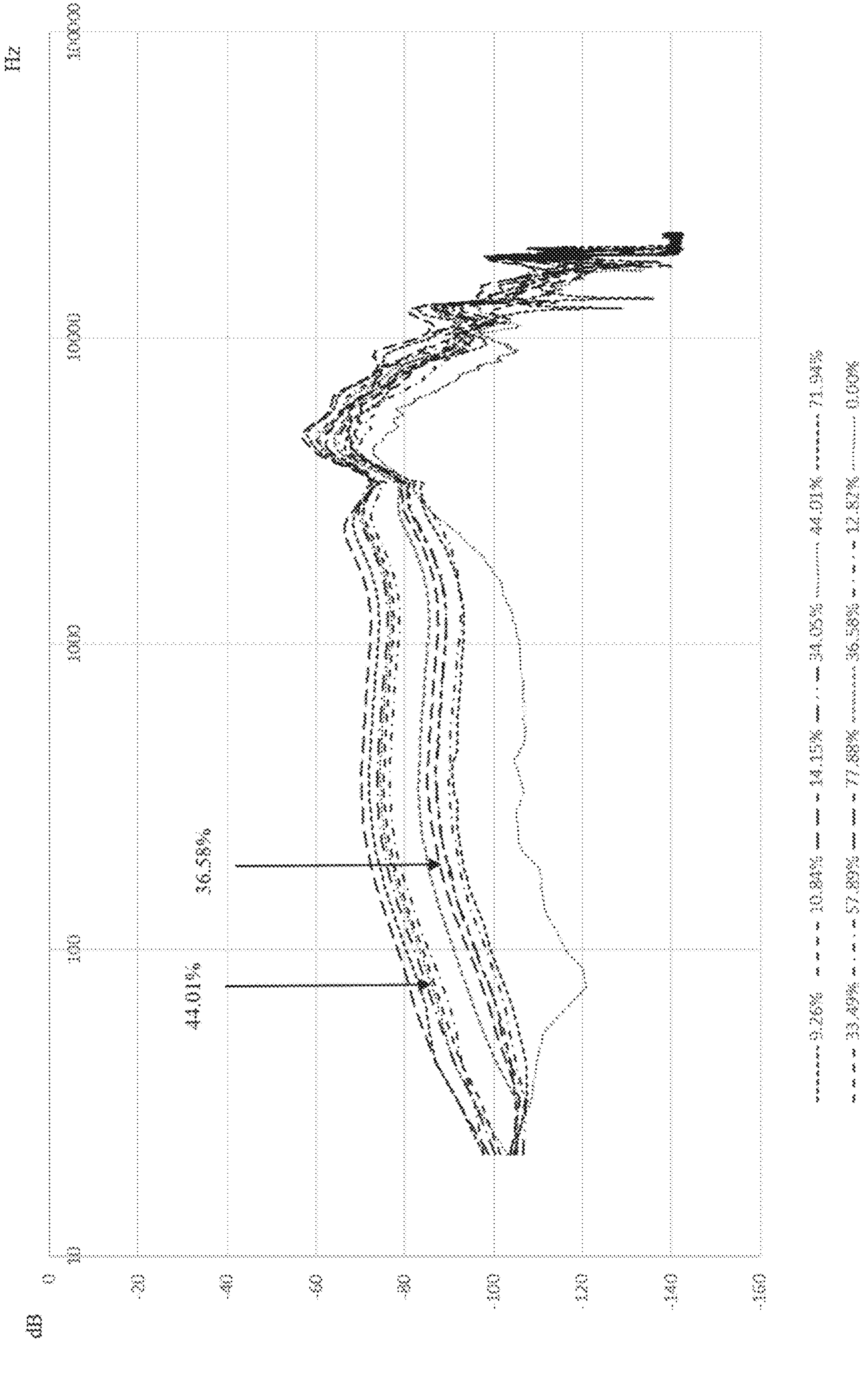
FIG. 15 is a graph illustrating frequency response curves corresponding to different overlap ratios each of which is between an area of a first projection of a sound production component on a sagittal plane and an area of a projection of a concha cavity of a user on the sagittal plane according to some embodiments of the present disclosure.

FIG. 15 is a graph illustrating frequency response curves corresponding to different overlap ratios each of which is between an area of a first projection of a sound production component on a sagittal plane and an area of a projection of a concha cavity of a user on the sagittal plane according to some embodiments of the present disclosure. As shown in FIG. 15, an abscissa represents a frequency (Hz), and an ordinate represents a frequency response (dB) at an opening of an ear canal corresponding to different overlapping ratios. According to FIG. 15, when the user wears the earphone 10 and at least a portion of the sound production component 11 covers the concha cavity, i.e., when the first projection of the sound production component 11 on the sagittal plane and the projection of the concha cavity on the sagittal plane have an overlap region, the listening volume at the opening of the ear canal of the user may be significantly increased compared with a case that the first projection and the projection of the concha cavity on the sagittal plane does not have an overlap region (the overlap ratio is 0%), especially in the medium and low-frequency range. In some embodiments, to improve the listening effect when the user wears the earphone 10, the overlap ratio between the area of the first projection of the sound production component 11 on the sagittal plane and the area of the projection of the concha cavity of the user on the sagittal plane may be greater than or equal to 9.26%. In some embodiments, to improve the listening effect when the user wears the earphone 10, the overlap ratio between the area of the first projection of the sound production component 11 on the sagittal plane and the area of the projection of the concha cavity of the user on the sagittal plane may be greater than or equal to ⅓. As shown in FIG. 15, with the increasing of the overlap ratio between the area of the first projection of the sound production component 11 on the sagittal plane and the area of the projection of the concha cavity of the user on the sagittal plane, an improvement of the listening volume at the opening of the ear canal of the user becomes stronger, especially when the overlap ratio between the area of the first projection and the area of the projection of the concha cavity of the user on the sagittal plane is increased from 36.58% to 44.01%, the listening effect is significantly improved. Accordingly, to further improve the listening effect of the user, the overlap ratio between the area of the first projection and the area of the projection of the concha cavity of the user on the sagittal plane may be greater than or equal to 44.01%. For example, the overlap ratio between the area of the first projection and the area of the projection of the concha cavity of the user on the sagittal plane may be greater than or equal to 57.89%. It should be noted that the frequency response curve in the embodiments of the present disclosure corresponding to the overlap ratio between the area of the first projection and the area of the projection of the concha cavity of the user on the sagittal plane may be obtained by changing a wearing position (e.g., translating along the sagittal axis direction or the vertical axis direction) of the sound production component 11 when a wearing angle (e.g., an angle between an upper sidewall or a lower sidewall and the horizontal direction) of the sound production component and a size of the sound production component is determined.

For the earphone provided in the embodiments of the present disclosure, the at least a portion of the sound production component 11 may extend into the concha cavity, and the overlap ratio between the area of the first projection on the sagittal plane and the area of the projection of the concha cavity of the user on the sagittal plane may be greater than or equal to 44.01% such that the sound production component 11 may better cooperate with the concha cavity of the user to form the acoustic model shown in FIG. 8, thereby improving the listening volume of the earphone at the listening position (e.g., at the opening of the ear canal), especially the listening volume at the medium and low frequency.

It should also be noted that to ensure that the opening of the ear canal is not blocked when the user wears the earphone 10 and keep an open state of the opening of the ear canal such that the user may obtain the sound from an external environment while obtaining the sound output by the earphone 10, the overlap ratio between the area of the first projection of the sound production component 11 on the sagittal plane and the area of the projection of the concha cavity on the sagittal plane may not be too large. In the wearing state, when the overlap ratio between the area of the first projection of the sound production component 11 on the sagittal plane and the area of the projection of the concha cavity of the user on the sagittal plane is too small, a size of a portion of the sound production component 11 extending into the concha cavity may be too small, and an attachment area between the sound production component 11 and the concha cavity of the user may be relatively small. In such cases, sufficient supporting and limiting effect of the concha cavity on the sound production component 11 may be not achieved, which may cause a problem that the earphone may fall off easily. On the one hand, when the size of the gap formed by the sound production component 11 and the concha cavity is too large, the listening volume at the opening of the ear canal of the user may be affected. To improve the stability, the comfort, and the listening effect of the earphone 10 when the user wears the earphone 10 without blocking the opening of the ear canal of the user, in some embodiments, the overlap ratio between the area of the first projection of the sound production component 11 on the sagittal plane and the area of the projection of the concha cavity of the user on the sagittal plane may be within a range of 44.01%-77.88% such that when the portion or the whole of the structure of the sound production component 11 extends into the concha cavity, the sound production component 11 may be supported and limited through the force exerted by the concha cavity on the sound production component 11, thereby improving the wearing stability and comfort. At the same time, the sound production component 11 may also form the acoustic model shown in FIG. 8 with the concha cavity to ensure the listening volume of the user at the listening position (e.g., the opening of the ear canal) and reduce the volume of the sound leakage in the far field. In some embodiments, the overlap ratio between the area of the first projection of the sound production component 11 on the sagittal plane and the area of the projection of the concha cavity of the user on the sagittal plane may be within a range of 46%-71.94%. In some embodiments, the overlap ratio between the area of the first projection of the sound production component 11 on the sagittal plane and the area of the projection of the concha cavity of the user on the sagittal plane may be within a range of 48%-65. In some embodiments, the overlap ratio between the area of the first projection of the sound production component 11 on the sagittal plane and the area of the projection of the concha cavity of the user on the sagittal plane may be within a range of 57.89%-62%.

Sizes and contour shapes of the concha cavities of different users (e.g., different ages, different genders, and different heights and weights) may be different, and the areas of projections of the concha cavities on the sagittal plane of the different users may be within a certain range (e.g., 320 $mm^2$-410 $mm^2$). As illustrated above, the overlap ratio between the area of the projection of the sound production component 11 on the sagittal plane and the area of the projection of the concha cavity on the sagittal plane may not be too large or too small. Correspondingly, an overall size (especially a size along the long-axis direction and the short-axis direction) of the sound production component 11 may not be too large or too small. For example, when the area of the projection of the sound production component 11 on the sagittal plane is too small, the sound production component 11 may not cover the concha cavity completely, and the size of the gap formed between the sound production component 11 and the concha cavity may be relatively large such that the listening volume at the opening of the ear canal of the user may be relatively low. When the area of the projection of the sound production component 11 on the sagittal plane is too large, the sound production component 11 may cover the opening of the ear canal of the user such that the opening of the ear canal may not be in an open state, thereby affecting the user to receive the sound from the external environment. To ensure the listening effect when the user wears the earphone and obtain the sound from the external environment by keeping the opening of the ear canal in the open state, in some embodiments, the area of the first projection of the sound production component 11 on the sagittal plane may be within a range of 202 $mm^2$-560 $mm^2$.

In some embodiments, the area of the first projection of the sound production component 11 on the sagittal plane may be within a range of 220 $mm^2$-500 $mm^2$. In some embodiments, the area of the first projection of the sound production component 11 on the sagittal plane may be within a range of 300 $mm^2$-470 $mm^2$. In some embodiments, the area of the first projection of the sound production component 11 on the sagittal plane may be within a range of 330 $mm^2$-440 $mm^2$.

As illustrated in FIG. 14, when the user wears the earphone 10, the portion or the whole of the sound part covers the concha cavity, and when the earphone 10 is in the wearing state, the centroid of the first projection (e.g., point O in FIG. 14) may be located in a projection region of an edge of the concha cavity of the user on the sagittal plane. A position of the centroid O of the first projection may be related to a size of the sound production component 11. For example, when the size of the sound production component 11 in the long-axis direction Y or the short-axis direction Z is too small, a volume of the sound production component 11 may be relatively small such that an area of the diaphragm disposed therein may be relatively small, which may result in low efficiency of the diaphragm pushing the air inside the housing of the sound production component 11 to produce sound, thereby affecting the acoustic output effect of the earphone 10. When the size of the sound production component 11 in the long-axis direction Y or the short-axis direction Z is too large, the sound production component 11 may exceed the range of the concha cavity and cannot extend into the concha cavity to form the like-cavity structure, or a total size of the gap formed between the sound production component 11 and the concha cavity may be very large, which may affect the listening volume of the earphone 10 at the opening of the ear canal and the sound leakage reduction effect in the far field. In some embodiments, to make the earphone 10 have a better acoustic output quality, a distance between a projection of the centroid O of the first projection on the sagittal plane of the user and a projection of an edge of the concha cavity of the user on the sagittal plane may be within a range of 4 mm-25 mm. In some embodiments, the distance between the projection of the centroid of the first projection on the sagittal plane of the user and the projection of the edge of the concha cavity of the user on the sagittal plane may be within a range of 6 mm-20 mm. In some embodiments, the distance between the projection of the centroid of the first projection on the sagittal plane of the user and the projection of the edge of the concha cavity of the user on the sagittal plane may be within a range of 10 mm-18 mm. For example, in some embodiments, a minimum distance d5 between the centroid of the first projection and the projection of the edge of the concha cavity of the user on the sagittal plane may be 5 mm, and a maximum distance d6 between the centroid of the first projection and the projection of the edge of the concha cavity of the user on the sagittal plane may be 24.5 mm. In some embodiments, by controlling the distance between the centroid of the first projection and the projection of the edge of the concha cavity of the user on the sagittal plane to be within the range of 4 mm-25 mm, at least portion of the structure of the sound production component 11 may cover the concha cavity to form a like-cavity acoustic model with the concha cavity. In such cases, the sound output by the sound production component may be better transmitted to the user, and the wearing stability of the earphone 100 may be improved by the force exerted by the concha cavity on the sound production component 11.

It should be noted that the position relationship between the sound production component 11 and the auricle or concha cavity in the embodiments of the present disclosure may be determined in the following exemplary manner. First, at a specific position, a picture of a human head model with ears may be taken in the direction facing the sagittal plane, the edges of the concha cavity and the contour of the auricle (e.g., inner and outer contours) may be marked, which may be regarded as the projection of contours of various structures of the ear on the sagittal pane; then at the specific position, a picture of the earphone worn on the human head model may be taken at a same angle, and the contour of the sound production component may be marked, which may be regarded as the projection of the sound production component on the sagittal plane, and the position relationship between the sound production component (e.g., centroid, end, etc.) and the edge of the concha cavity and the auricle may be determined through comparative analysis.

Figure 16:
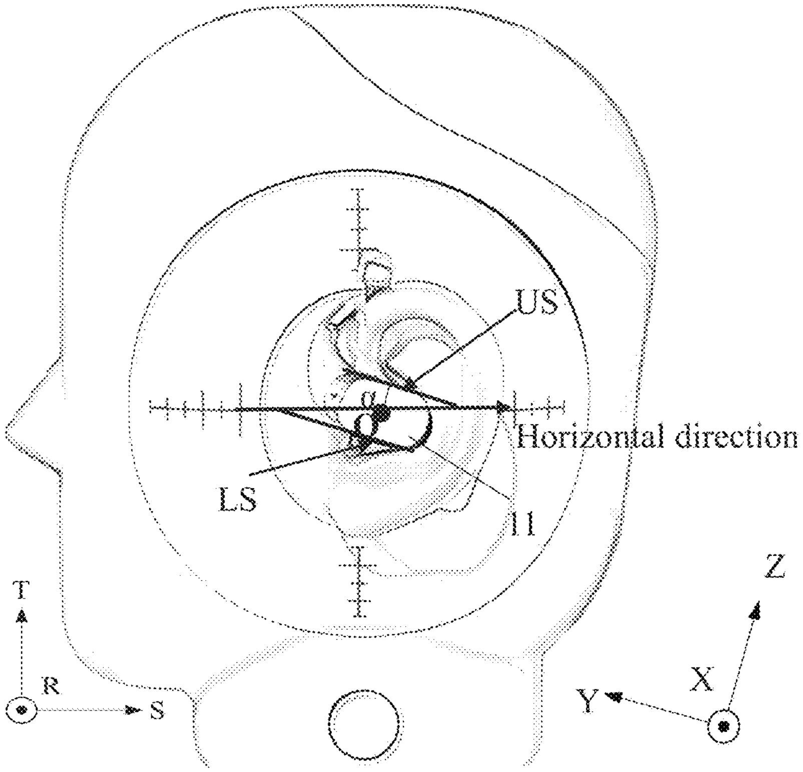
FIG. 16 is a schematic diagram illustrating an exemplary wearing state of an earphone according to other embodiments of the present disclosure.

FIG. 16 is a schematic diagram illustrating an exemplary wearing state of an earphone according to other embodiments of the present disclosure. In some embodiments, in combination with FIG. 12 and the descriptions thereof, the larger the relative opening $S/S_0$, the smaller the listening index. Therefore, in some embodiments, while ensuring that the ear canal is not blocked, the size of the gap formed between the sound production component 11 and the concha cavity may be as small as possible, and the overall volume of the sound production component 11 may not be too large or too small. Therefore, when the overall volume or shape of the sound production component 11 is determined, a wearing angle of the sound production component 11 relative to the auricle and the concha cavity may be considered. For example, when the sound production component 11 is a quasi-cuboid structure, and when the user wears the earphone 10 and an upper side surface US or an lower side surface LS of the sound production component 11 is parallel or approximately parallel to or perpendicular to or approximately perpendicular to the horizontal plane (also be understood as that a projection of an upper sidewall or a lower sidewall of the sound production component 11 on the sagittal plane is parallel or approximately parallel or perpendicular or approximately perpendicular to the sagittal axis), a large gap may be formed when the sound production component 11 fits or covers a portion of the concha cavity, which may affect the listening volume of the user. To make the whole or a portion of the sound production component 11 extend into the concha cavity, increase an area of the region of the concha cavity covered by the sound production component 11, reduce the size of the gap formed between the sound production component 11 and the edge of the concha cavity, and improve the listening volume at the opening of the ear canal, in some embodiments, an inclination angle $\alpha$ of a projection of the upper side surface US or the lower side surface LS of the sound production component 11 on the sagittal plane relatively to a horizontal direction may be within a range of 10°-28° when the earphone 10 is in the wearing state. In some embodiments, the inclination angle $\alpha$ of the projection of the upper side surface US or the lower side surface LS of the sound production component 11 on the sagittal plane relative to the horizontal direction may be within a range of 13°-21° when the earphone 10 is in the wearing state. In some embodiments, the inclination angle $\alpha$ of the projection of the upper side surface US or the lower side surface LS of the sound production component 11 on the sagittal plane relative to the horizontal direction may be within a range of 15°-19° when the earphone 10 is in the wearing state. It should be noted that the inclination angle of the projection of the upper side surface US of the sound production component 11 on the sagittal plane relative to the horizontal direction may be the same as or different from the inclination angle of the projection of the lower side surface LS of the sound production component 11 on the sagittal plane relative to the horizontal direction. For example, when the upper side surface US and the lower side surface LS of the sound production component 11 are parallel, the inclination angle of the projection of the upper side surface US on the sagittal plane relative to the horizontal direction may be the same as the inclination angle of the projection of the lower side surface LS on the sagittal plane relative to the horizontal direction. As another example, when the upper side surface US and the lower side surface LS of the sound production component 11 are not parallel, or one of the upper side surface US or the lower side surface LS is a planar wall, and the other of the upper side surface US is a non-planar wall (e.g., a curved wall), the inclination angle of the projection of the upper side surface US on the sagittal plane relative to the horizontal direction may be different from the inclination angle of the projection of the lower side surface LS on the sagittal plane relative to the horizontal direction. In addition, when the upper side surface US or the lower side surface LS is a curved surface, the projection of the upper side surface US or the lower side surface LS on the sagittal plane may be a curve or a broken line. At this time, the inclination angle of the projection of the upper side surface US on the sagittal plane relative to the horizontal direction may be an included angle of a tangent line to a point at which the curved line or the broken line has a largest distance from a ground plane relative to the horizontal direction, and the inclination angle of the projection of the lower side surface LS on the sagittal plane relative to the horizontal direction may be an included angle of a tangent line to a point at which the curved line or the broken line has a smallest distance from the ground plane relative to the horizontal direction. In some embodiments, when the upper side surface US or the lower side surface LS is a curved surface, a tangent line parallel to the long-axis direction Y on the projection may also be used, and an included angle between the tangent line and the horizontal direction may be used to represent the inclination angle of the projection of the upper side surface US or the lower side surface LS on the sagittal plane relative to the horizontal direction.

Figure 17:
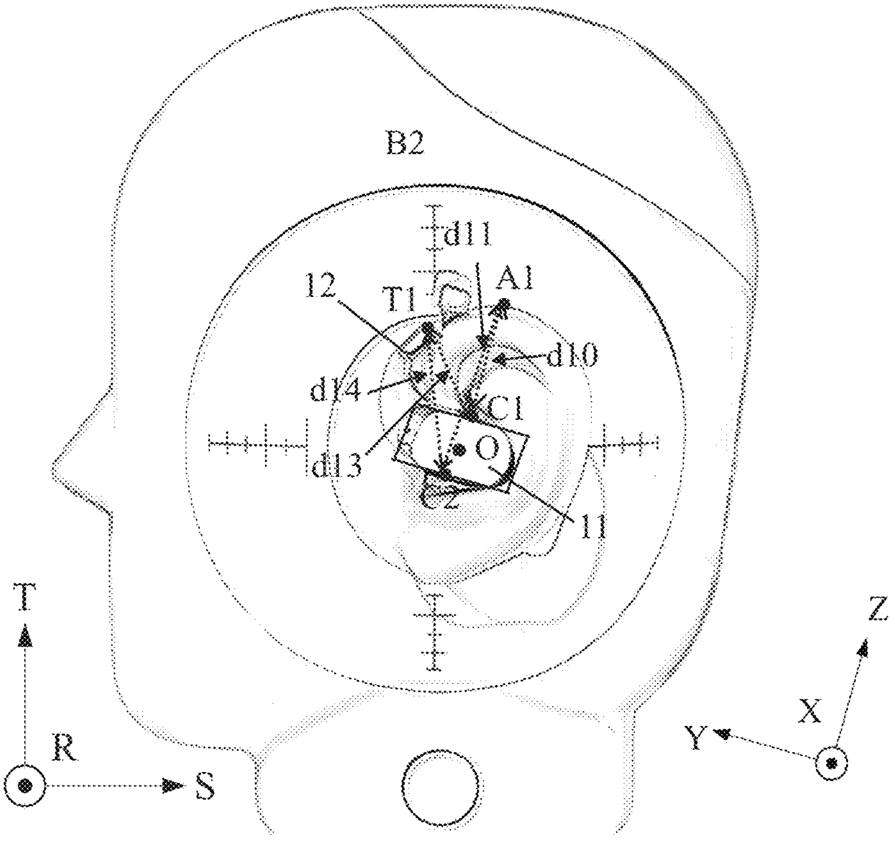
FIG. 17 is a schematic diagram illustrating an exemplary wearing state of an earphone according to other embodiments of the present disclosure.

FIG. 17 is a schematic diagram illustrating an exemplary wearing state of an earphone according to other embodiments of the present disclosure. A whole or portion of a sound production component 11 may extend into a concha cavity to form a like-cavity structure as shown in FIG. 8. A listening volume when a user wears the earphone 10 may be related to a size of a gap formed between the sound production component 11 and an edge of the concha cavity. The smaller the size of the gap, the greater the listening volume at the opening of the ear canal of the user. The size of the gap formed between the sound production component 11 and the edge of the concha cavity may not only be related to the inclination angle of the projection of the upper side surface US or the lower side surface LS of the sound production component 11 on the sagittal plane relative to the horizontal plane, but also be related to the size of the sound production component 11. For example, when the size of the sound production component 11 (especially the size along the short-axis direction Z shown in FIG. 17) is too small, the gap formed between the sound production component 11 and the edge of the concha cavity may be too large, which may affect the listening volume at the opening of the ear canal of the user. However, when the size of the sound production component 11 (especially the size along the short-axis direction Z shown in FIG. 17) is too large, the sound production component 11 may have few portions extending into the concha cavity, or the sound production component 11 may completely cover the concha cavity. The opening of the ear canal may be equivalent to being blocked, and the communication between the opening of the ear canal and the external environment may not be realized. In addition, the large size of the sound production component 11 may affect the wearing comfort of the user and the convenience of carrying around. As shown in FIG. 17, in some embodiments, distances from a midpoint of the projection of the upper side surface US and a midpoint of the lower side surface LS of the sound production component 11 on the sagittal plane to the highest point of the second projection may reflect the size of the sound production component 11 along the short-axis direction Z and the position of the sound production component 11 relative to the concha cavity. To improve the listening effect of the earphone 10 while ensuring that the earphone 10 does not block the opening of the ear canal of the user, in some embodiments, a distance d10 between the midpoint C1 of the projection of the upper side surface US of the sound production component 11 on the sagittal plane and the highest point A1 of the second projection may be within a range of 20 mm-38 mm, and a distance d11 between the midpoint C2 of the projection of the lower side surface LS of the sound production component 11 on the sagittal plane and the highest point A1 of the second projection may be within a range of 32 mm-57 mm. In some embodiments, the distance d10 between the midpoint C1 of the projection of the upper side surface US of the sound production component 11 on the sagittal plane and the highest point A1 of the second projection may be within a range of 24 mm-36 mm, and the distance d11 between the midpoint C2 of the projection of the lower side surface LS of the sound production component 11 on the sagittal plane and the highest point A1 of the second projection may be within a range of 36 mm-54 mm. In some embodiments, the distance between the midpoint C1 of the projection of the upper side surface US of the sound production component 11 on the sagittal plane and the highest point A1 of the second projection may be within a range of 27 mm-34 mm, and the distance between the midpoint C2 of the projection of the lower side surface LS of the sound production component 11 on the sagittal plane and the highest point A1 of the second projection may be within a range of 38 mm-50 mm. It should be noted that when the projection of the upper side surface US of the sound production component 11 on the sagittal plane is a curved line or a broken line, the midpoint C1 of the projection of the upper side surface US of the sound production component 11 on the sagittal plane may be determined according to the following example. A line segment may be drawn by selecting two farthest points on the projection of the upper side surface US on the sagittal plane along the long-axis direction, a mid-perpendicular line may be drawn by selecting a midpoint on the line segment, and an interaction point of the mid-perpendicular line and the projection may be the midpoint of projection of the upper side surface US of the sound production component 11 on the sagittal plane. In some alternative embodiments, a point of the projection of the upper side surface US on the sagittal plane with a smallest distance from the highest point of the second projection may be determined as the midpoint C1 of the projection of the upper side surface US of the sound production component 11 on the sagittal plane. The midpoint of the projection of the lower side surface LS of the sound production component 11 on the sagittal plane may be determined in the same manner as above. For example, a point of the projection of the lower side surface LS on the sagittal plane with a largest distance from the highest point of the second projection may be determined as the midpoint C2 of the projection of the lower side surface LS of the sound production component 11 on the sagittal plane.

In some embodiments, distances between the midpoint of the projection of the upper side surface US and the midpoint of the lower side surface LS of the sound production component 11 on the sagittal plane and a projection of an upper vertex of the suspension structure 12 on the sagittal plane may reflect the size of the sound production component 11 along the short-axis direction Z. The upper vertex of the suspension structure 12 may be a position of the suspension structure 12 that has the largest distance relative to a certain point on the neck of the user in the vertical axis direction when the user wears the open earphone, e.g., the upper vertex T1 shown in FIG. 17. To improve the listening effect of the earphone 10 while ensuring that the earphone 10 does not block the opening of the ear canal of the user, in some embodiments, a distance d13 between the midpoint C1 of the projection of the upper side surface US of the sound production component 11 on the sagittal plane and the projection of the upper vertex T1 of the suspension structure 12 on the sagittal plane may be within a range of 17 mm-36 mm, and a distance d14 between the midpoint C2 of the projection of the lower side surface LS of the sound production component 11 on the sagittal plane and the projection of the upper vertex T1 of the suspension structure 12 on the sagittal plane may be within a range of 28 mm-52 mm. In some embodiments, the distance d13 between the midpoint C1 of the projection of the upper side surface US of the sound production component 11 on the sagittal plane and the projection of the upper vertex T1 of the suspension structure 12 on the sagittal plane may be within a range of 21 mm-32 mm, and the distance d14 between the midpoint C2 of the projection of the lower side surface LS of the sound production component 11 on the sagittal plane and the projection of the upper vertex T1 of the suspension structure 12 on the sagittal plane may be within a range of 32 mm-48 mm. In some embodiments, the distance d13 between the midpoint C1 of the projection of the upper side surface US of the sound production component 11 on the sagittal plane and the projection of the upper vertex T1 of the suspension structure 12 on the sagittal plane may be within a range of 24 mm-30 mm, and the distance d14 between the midpoint C2 of the projection of the lower side surface LS of the sound production component 11 on the sagittal plane and the projection of the upper vertex T1 of the suspension structure 12 on the sagittal plane may be within a range of 35 mm-45 mm.

Figure 18A:
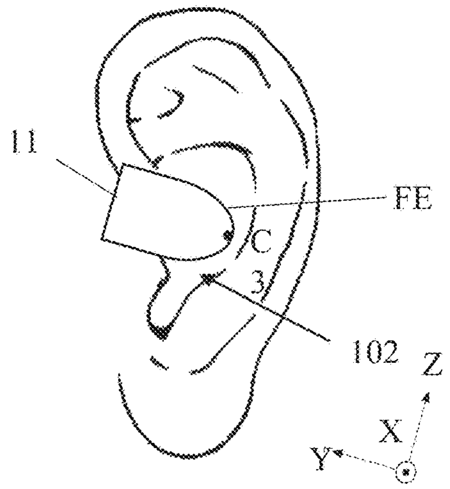
FIGS. 18A-18C are schematic diagrams illustrating different exemplary matching positions between an earphone and an ear canal of a user according to the present disclosure.
Figure 18B:
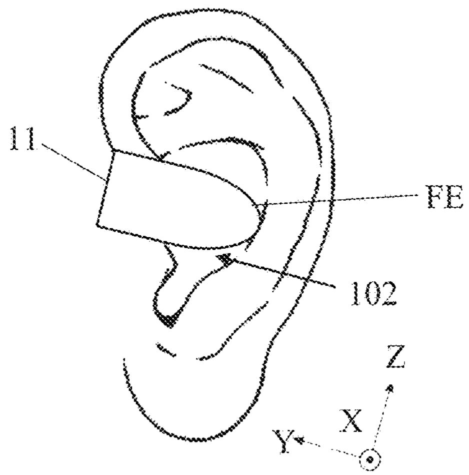
Figure 18C:
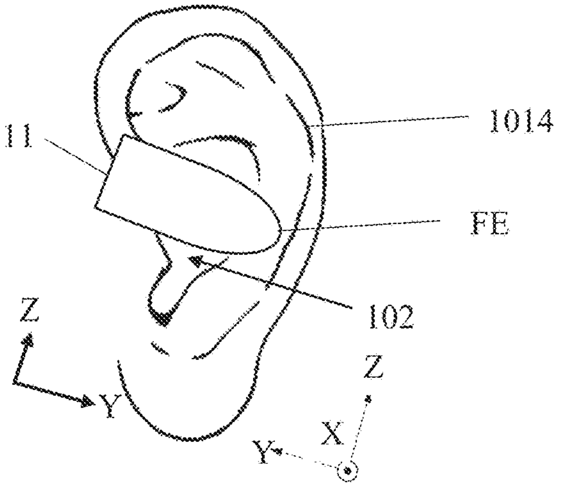

FIGS. 18A-18C are schematic diagrams illustrating different exemplary matching positions between an earphone and an ear canal of a user according to the present disclosure.

A size of a gap formed between the sound production component 11 and an edge of a concha cavity may be related to an inclination angle of the projection of the upper side surface US or the lower side surface LS of the sound production component 11 on the sagittal plane relative to a horizontal plane, and a size of the sound production component 11 (e.g., the size in the short-axis direction Z), and may be related to the distance between the free end FE of the sound production component 11 and the edge of the concha cavity. It should be noted that the free end FE of the sound production component 11 refers to an end of the sound production component 11 opposite to a fixed end connected to the suspension structure 12. The sound production component 11 may be a regular or irregular structure. To further illustrate the free end FE of the sound production component 11, for example, when the sound production component 11 is a cuboid structure, an end wall of the sound production component 11 may be a plane, and the free end FE of the sound production component 11 may be an end sidewall opposite to the fixed end connected to the suspension structure 12 of the sound production component 11, as another example, when the sound production component 11 is a sphere, an ellipsoid or an irregular structure, the free end FE of the sound production component 11 refers to a specific region away from the fixed end obtained by cutting the sound production component 11 along a Y-Z plane. A ratio of a size of the specific region along the long-axis direction Y to a size of the sound production component along the long-axis direction Y may be within a range of 0.05-0.2.

Specifically, one end (i.e., the fixed end CE) of the sound production component 11 may be connected to the suspension structure 12. When the user wears the earphone, the fixed end CE may be relatively forward, and a distance between the free end FE of the sound production component 11 and the fixed end CE may reflect the size of the sound production component 11 in the long-axis direction Y. In such cases, the position of the free end FE of the sound production component 11 relative to the concha cavity may affect an area of the concha cavity covered by the sound production component 11, and the size of the gap formed between the sound production component 11 and the contour of the concha cavity may be affected, thereby affecting the listening volume at the opening of the ear canal of the user. A distance between a midpoint of the projection of the free end FE of the sound production component 11 on the sagittal plane and the projection of the edge of the concha cavity on the sagittal plane may reflect the position of the free end FE of the sound production component 11 relative to the concha cavity and an extent to which the sound production component 11 covers the concha cavity of the user. The concha cavity refers to a concave region below the crus of the helix, i.e., the edge of the concha cavity may be at least defined by a sidewall below the crus of helix, the contour of the tragus, the intertragic notch, the antitragus apex, the notch between the antitragus and the anthelix, and the contour of the antihelix corresponding to the concha cavity. It should be noted that, when the projection of the free end FE of the sound production component 11 on the sagittal plane is a curved line or a broken line, the midpoint of the projection of the free end FE of the sound production component 11 on the sagittal plane may be determined by the following exemplary manner. A line segment may be drawn by selecting two farthest points on the projection of the free end FE on the sagittal plane in the short-axis direction Z, a mid-perpendicular line may be drawn by selecting a midpoint on the line segment, and an intersection point of the mid-perpendicular line and the projection may be the midpoint of the projection of the free end FE of the sound production component 11 on the sagittal plane. In some embodiments, when the free end FE of the sound production component 11 is a curved surface, a tangent point where a tangent line parallel to the short-axis direction Z on the projection may also be determined as the midpoint of the projection of the free end FE of the sound production component 11 on the sagittal plane.

As shown in FIG. 18A, when the sound production component 11 does not abut against the edge of the concha cavity 102, the free end FE of the sound production component 11 may be located in the concha cavity 102, i.e., the midpoint of the projection of the free end FE of the sound production component 11 on the sagittal plane may not overlap with the projection of the edge of the concha cavity 102 on the sagittal plane. As shown in FIG. 18B, the sound production component 11 of the earphone 10 may extend into the concha cavity 102, and the free end FE of the sound production component 11 may abut against the edge of the concha cavity 102. It should be noted that, in some embodiments, when the free end FE of the sound production component 11 abuts against the edge of the concha cavity 102, the midpoint of the projection of the free end FE of the sound production component 11 on the sagittal plane may overlap with the projection of the edge of and the concha cavity 102 on the sagittal plane. In some embodiments, when the free end FE of the sound production component 11 abuts against the edge of the concha cavity 102, the midpoint of the projection of the free end FE of the sound production component 11 on the sagittal plane may not overlap with the projection of the edge of the concha cavity 102 on the sagittal plane. For example, the concha cavity 102 may have a concave structure, a sidewall corresponding to the concha cavity 102 may be not a flat wall surface, and the projection of the edge of the concha cavity on the sagittal plane may be an irregular two-dimensional shape. The projection of the sidewall corresponding to the concha cavity 102 on the sagittal plane may be on or outside a contour of the shape. Therefore, the midpoint of the projection of the free end FE of the sound production component 11 on the sagittal plane may not overlap with the projection of the edge of the concha cavity 102 on the sagittal plane. For example, the midpoint of the projection of the free end FE of the sound production component 11 on the sagittal plane may be located on an inner side or an outer side of the projection of the edge of the concha cavity 102 on the sagittal plane. In the embodiments of the present disclosure, when the free end FE of the sound production component 11 is located in the concha cavity 102, a case that the distance between the midpoint of the free end FE of the sound production component 11 on the sagittal plane and the projection of the edge of the concha cavity 102 on the sagittal plane is within a specific range (e.g., not greater than 6 mm) may be considered that the free end FE of the sound production component 11 may abut against the edge of the concha cavity 102. As shown in FIG. 18C, the sound production component 11 of the earphone 10 may cover the concha cavity, and the free end FE of the sound production component 11 may be located between the edge of the concha cavity 102 and the inner contour 1014 of the auricle.

Referring to FIGS. 18A-18C, when the free end FE of the sound production component 11 is located in the edge of the concha cavity 102, if the distance between the midpoint C3 of the projection of the free end FE of the sound production component 11 on the sagittal plane and the projection of the edge of the concha cavity 102 on the sagittal plane is too small, the area of the concha cavity 102 covered by the sound production component 11 may be too small, and the size of the gap formed between the sound production component 11 and the edge of the concha cavity may be relatively large, which may affect the listening volume at the opening of the ear canal of the user. When the midpoint C3 of the projection of the free end FE of the sound production component on the sagittal plane is located at a position between the projection of the edge of the concha cavity 102 on the sagittal plane and a projection of the inner contour 1014 of the auricle on the sagittal plane, if the distance between the midpoint C3 of the projection of the free end FE of the sound production component on the sagittal plane and the projection of the edge of the concha cavity 102 on the sagittal plane is too large, the free end FE of the sound production component 11 may interfere with the auricle, and the area of the concha cavity 102 covered the sound production component 11 may not be increased. In addition, when the user wears the earphone, if the free end FE of the sound production component 11 is not located in the concha cavity 102, the edge of the concha cavity 102 may not limit the sound production component 11, and the earphone may be liable to fall off. In addition, an increase in the size of the sound production component 11 in a certain direction may increase a weight of the sound production component 11, which may affect the wearing comfort and portability of the user. Accordingly, to ensure that the earphone 10 has a relatively good listening effect and improve the wearing comfort and stability of the user, in some embodiments, the distance between the midpoint C3 of the projection of the free end FE of the sound production component 11 on the sagittal plane and the projection of the edge of the concha cavity on the sagittal plane may be smaller than or equal to 16 mm. In some embodiments, the distance between the midpoint C3 of the projection of the free end FE of the sound production component 11 on the sagittal plane and the projection of the edge of the concha cavity on the sagittal plane may be smaller than or equal to 13 mm. In some embodiments, the distance between the midpoint C3 of the projection of the free end FE of the sound production component 11 on the sagittal plane and the projection of the edge of the concha cavity on the sagittal plane may be smaller than or equal to 8 mm. It should be noted that, in some embodiments, the distance between the midpoint C3 of the projection of the free end FE of the sound production component 11 on the sagittal plane and the projection of the edge of the concha cavity 102 on the sagittal plane refers to a minimum distance between the midpoint C3 of the projection of the free end FE of the sound production component 11 on the sagittal plane and the projection of the edge of the concha cavity 102 on the sagittal plane. In some embodiments, the distance between the midpoint C3 of the projection of the free end FE of the sound production component 11 on the sagittal plane and the projection of the edge of the concha cavity 102 on the sagittal plane also refers to a distance along the sagittal axis direction. In addition, in a specific wearing scene, points other than the midpoint C3 of the projection of the free end FE of the sound production component 11 on the sagittal plane may abut against the edge of the concha cavity. At this time, the distance between the midpoint C3 of the projection of the free end FE of the sound production component 11 on the sagittal plane and the projection of the edge of the concha cavity on the sagittal plane may be greater than 0 mm. In some embodiments, the distance between the midpoint C3 of the projection of the free end FE of the sound production component 11 on the sagittal plane and the projection of the edge of the concha cavity on the sagittal plane may be within a range of 2 mm-16 mm. In some embodiments, the distance between the midpoint C3 of the projection of the free end FE of the sound production component 11 on the sagittal plane and the projection of the edge of the concha cavity on the sagittal plane may be within a range of 4 mm-10.48 mm.

Figure 19:
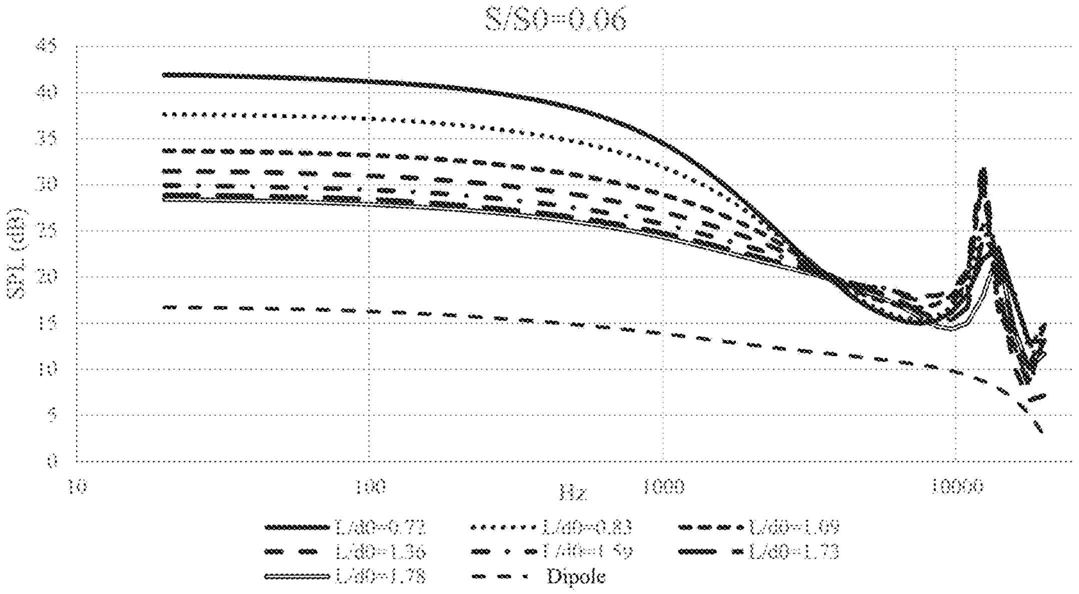
FIG. 19 is a graph illustrating listening index curves of like-cavity structures with leaking structures of different positions according to some embodiments of the present disclosure.

FIG. 19 is a graph illustrating listening index curves of like-cavity structures with leaking structures of different positions according to some embodiments of the present disclosure. As illustrated in FIG. 11 and FIG. 19, with a determined relative opening (e.g., $S/S_0=0.06$), the larger the relative distance $L/d_0$ between a centroid of an opening of the leaking structure and the other sound source (e.g., the external sound source "–" shown in FIG. 11), the smaller the listening index. This is because the larger the relative distance, the farther the distance between the secondary sound source A' generated at the opening and the sound source B, the weaker the effect of sound cancellation between the secondary sound source A' and the sound source B in an external sound field, and the greater the sound leakage, which may lead to a decrease in the listening index.

Figure 20A:
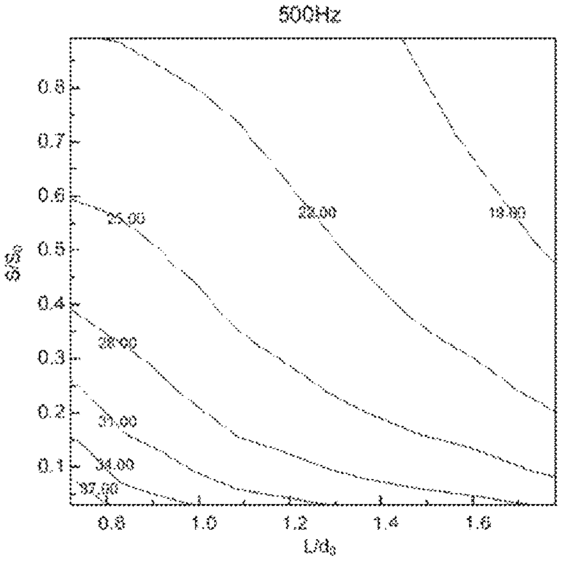
FIG. 20A is a graph illustrating listening index curves at a frequency of 500 Hz of like-cavity structures with leaking structures of different positions and sizes according to some embodiments of the present disclosure.
Figure 20B:
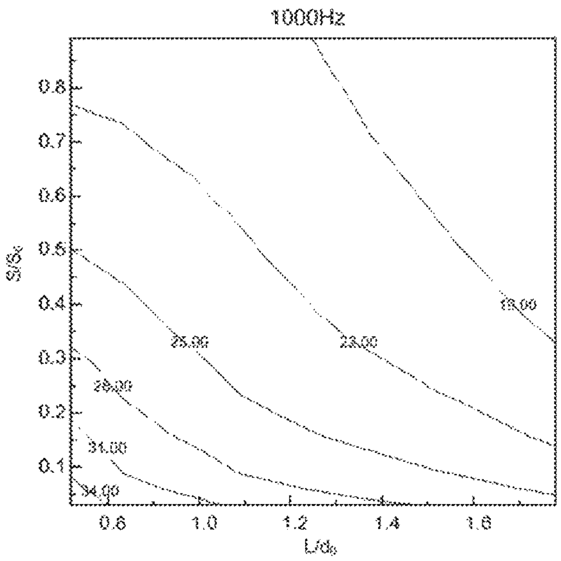
FIG. 20B is a graph illustrating listening index curves at a frequency of 1000 Hz of like-cavity structures with leaking structures of different positions and sizes according to some embodiments of the present disclosure.
Figure 20C:
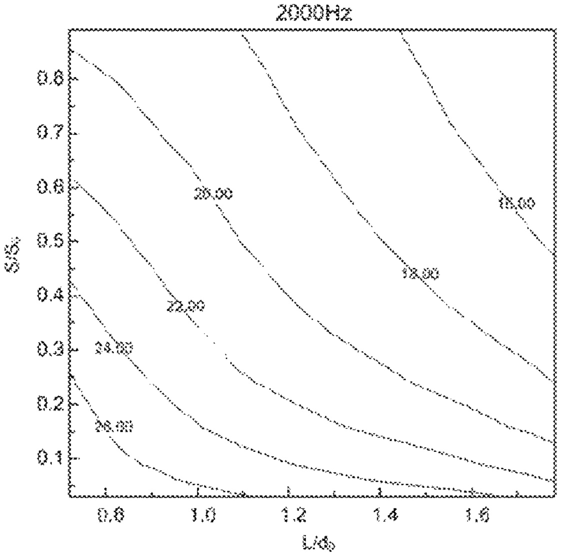
FIG. 20C is a graph illustrating listening index curves at a frequency of 2000 Hz of like-cavity structures with leaking structures of different positions and sizes according to some embodiments of the present disclosure.
Figure 20D:
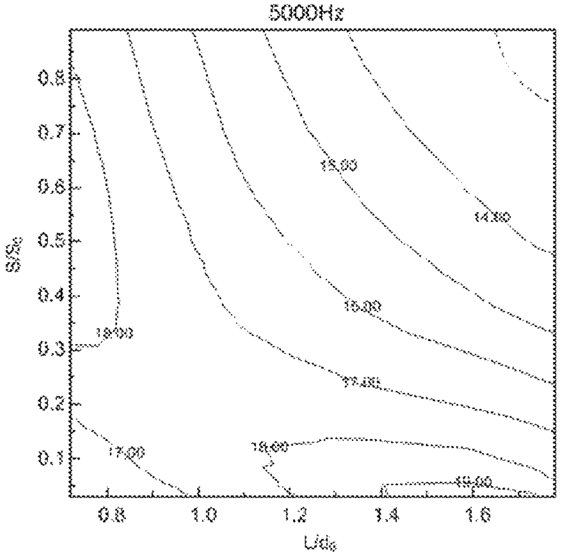
FIG. 20D is a graph illustrating listening index curves at a frequency of 5000 Hz of like-cavity structures with leaking structures of different positions and sizes according to some embodiments of the present disclosure.

FIG. 20A is a graph illustrating listening index curves at a frequency of 500 Hz of like-cavity structures with leaking structures of different positions and sizes according to some embodiments of the present disclosure. FIG. 20B is a graph illustrating listening index curves at a frequency of 1000 Hz of like-cavity structures with leaking structures of different positions and sizes according to some embodiments of the present disclosure. FIG. 20C is a graph illustrating listening index curves at a frequency of 2000 Hz of like-cavity structures with leaking structures of different positions and sizes according to some embodiments of the present disclosure. FIG. 20D is a graph illustrating listening indexes at a frequency of 5000 Hz of like-cavity structures with leaking structures of different positions and sizes according to some embodiments of the present disclosure. Considering a relative area $S/S_0$ of an opening of the leaking structure and a relative distance L/do between a centroid of the opening and an external sound source, in some embodiments, to ensure that there is a listening index higher than that of dual sound sources in a main frequency band (e.g., a frequency band smaller than or equal to 5000 Hz or 10 kHz), the relative area $S/S_0$ of the opening of the leaking structure may be smaller than or equal to 0.8, and the relative distance L/do between the centroid of the opening and the external sound source may be smaller than or equal to 1.7.

In some embodiments, according to FIG. 20A-FIG. 20D and the related descriptions thereof, to improve the listening index, the listening index at each frequency may be greater than that of dual point sound sources without a like-cavity structure, the relative distance L/do between the centroid of the opening of the like-cavity structure and the sound source located outside the like-cavity structure may be smaller than or equal to 1.78. When the user wears the earphone 10 as shown in FIG. 4, the relative distance L/do between the centroid of the opening of the like-cavity structure and the sound source outside the like-cavity structure may be expressed as a ratio of a distance between a gap between the housing 111 and the opening of the ear canal and the second sound guiding hole 1112 to a distance between two sound guiding holes. The distance between the gap between the housing 111 and the opening of the ear canal and the second sound guiding hole 1112 refers to a distance between a center point of a gap region LC formed between the lower side surface LS of the housing 111 and the concha cavity and the second sound guiding hole 1112. In some embodiments, the ratio of the distance between the gap between the housing 111 and the opening of the ear canal and the second sound guiding hole 1112 to the distance between the two sound guiding holes may be smaller than 1.78. For example, the ratio of the distance between the gap between the housing 111 and the opening of the ear canal and the second sound guiding hole 1112 to the distance between the two sound guiding holes may be smaller than 1.78, 1.68, 1.58, 1.48, 1.38, 1.28, 1.18, 1.08, etc.

Figure 21:
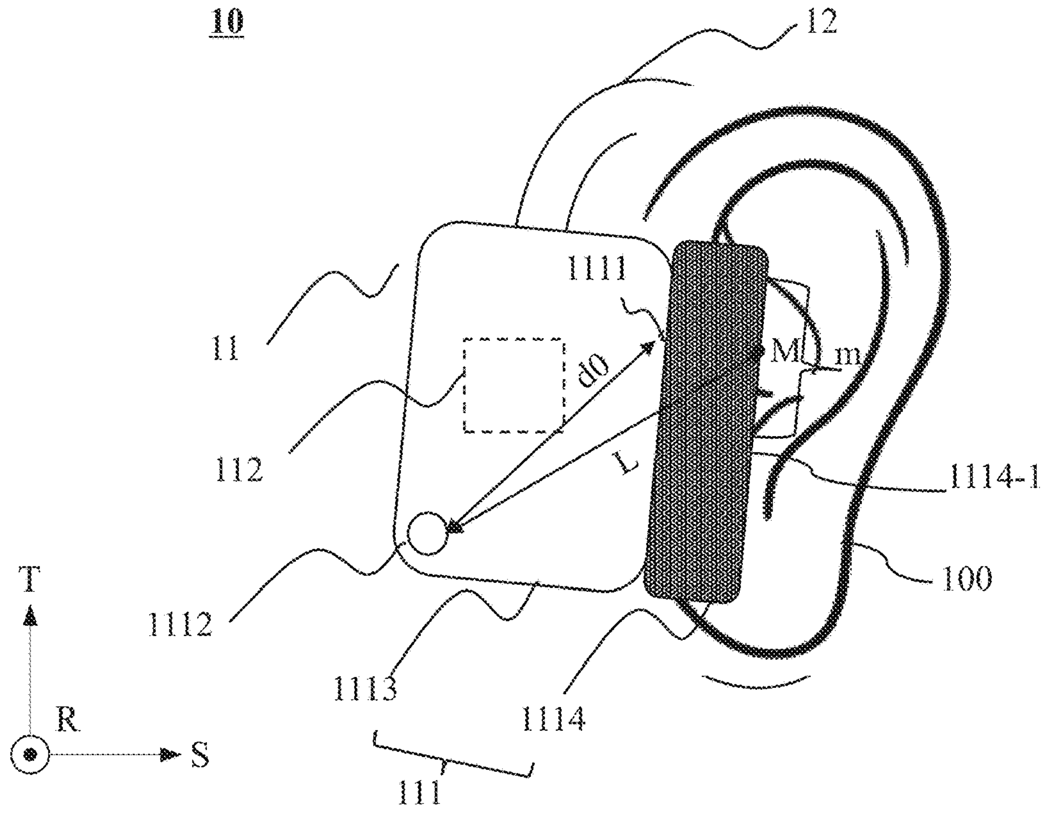
FIG. 21 is a schematic diagram illustrating an exemplary structure of an earphone according to some embodiments of the present disclosure.

FIG. 21 is a schematic diagram illustrating an exemplary structure of an earphone according to some embodiments of the present disclosure. As shown in FIG. 21, the earphone 10 may include the sound production component 11 and the suspension structure 12. The sound production component 11 may include the housing 111 and the transducer 112 (e.g., a diaphragm). The suspension structure 12 may be connected to the housing 111 and place the sound production component 11 at a position near the ear 100 of the user without blocking an ear canal of a user. For example, the sound production component 11 may be fixed to the front of a tragus of the user and attached to the face. As another example, one end (e.g., an end away from the suspension structure 12, or referred to as a free end) of the sound production component 11 may abut against an inside of an auricle (e.g., inside a concha cavity, on an antihelix) of the user. In some embodiments, the housing 111 may include a body 1113. The body 1113 may form a cavity (or referred to as a first cavity) for accommodating the transducer 112. In some embodiments, the body 1113 may have a regular shape such as a rectangle, a square, a cylinder, an elliptical cylinder, a sphere, or any irregular shape. In some embodiments, the first sound guiding hole 1111 and the second sound guiding hole 1112 in acoustic communication with a first cavity may be disposed on the housing 111 respectively configured to guide a sound in the first cavity out. For example, the transducer 112 may include the diaphragm, and the diaphragm may divide the first cavity into a front cavity and a rear cavity respectively corresponding to a front side and a rear side of the diaphragm. The first sound guiding hole 1111 may guide a first sound generated by the front cavity of the diaphragm, and the second sound guiding hole 1112 may guide a second sound generated by the rear side of the diaphragm. In some embodiments, in a wearing state, the first sound guiding hole 1111 may be located closer to an inside of the ear canal than the second sound guiding hole 1112 such that the first sound transmitted from the first sound guiding hole 1111 may be transmitted to the inside of the ear canal of the user. In some embodiments, the second sound guiding hole 1112 may be configured such that a pressure in the rear cavity may be balanced, and the diaphragm may fully vibrate at low frequency and large amplitude, thereby increasing a sound pressure of the sound (or first sound) generated by the front side of the diaphragm at a portion of low frequencies and improving the low-frequency output performance of the sound production component 11. For example, within a range of 100 Hz-1000 Hz, the second sound guiding hole 1112 may increase the sound pressure of the first sound. The second sound guiding hole 1112 may increase the sound pressure of the first sound at a portion of low frequencies by 0 dB-60 dB.

In some embodiments, the second sound transmitted from the second sound guiding hole 1112 may be transmitted to a spatial position away from the ear canal of the user, thereby forming a sound leakage. Therefore, a structure and/or wearing position of the earphone 10 may be configured such that the first sound guided from the first sound guiding hole 1111 and the second sound guided from the second sound guiding hole 1112 may cancel in a spatial position and the interference cancellation between the second sound and the first sound in the near field may be reduced, thereby improving the listening effect of the earphone 10. For example, the housing 111 may further include a baffle 1114. In the wearing state, the baffle 1114 may form a like-cavity structure with an ear of the user as shown in FIG. 8, thereby increasing a listening volume at a listening position while maintaining a sound leakage reduction effect, especially the listening volume at the medium and low frequency.

Figure 22:
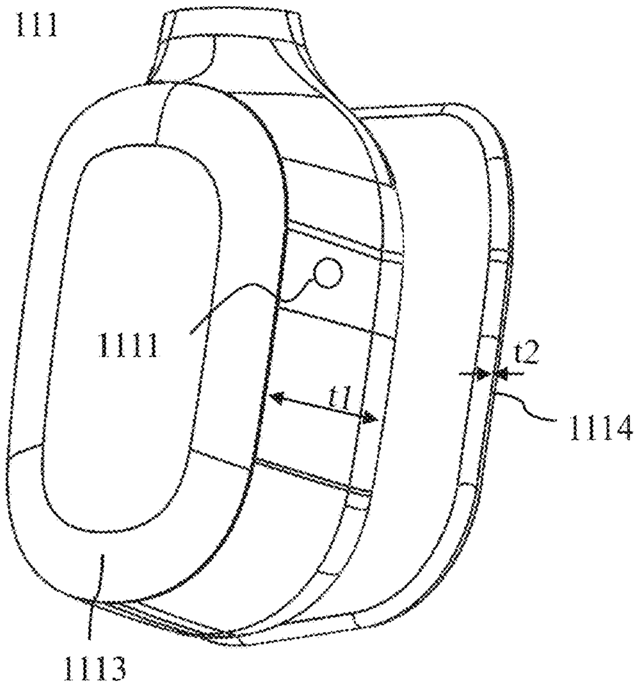
FIG. 22 is a schematic diagram illustrating an exemplary structure of a housing according to some embodiments of the present disclosure.

In some embodiments, as shown in FIG. 21, the baffle 1114 may be connected to a side of the body 1113 facing away from the face of the user. For example, the baffle 1114 may be connected to a surface opposite a face-facing surface of the body 1113 that fits the face of the body 1113, so as to prevent the baffle 1114 from hitting the tragus. Further, the baffle 1114 may extend toward an opening of the ear canal of the user, thereby enclosing a cavity (or referred to as a second cavity) with the ear (e.g., the concha cavity). The second cavity may separate the two sound guiding holes such that the first sound guiding hole 1111 may be located inside the second cavity and the second sound guiding hole 1112 may be located outside the second cavity. For example, the first sound guiding hole 1111 may be located on a side where the body 1113 and the baffle 1114 (e.g., as shown in FIG. 22) intersect, and the second sound guiding hole 1112 may be located on any surface (e.g., a side facing away from the human face as shown in FIG. 21, or a surface of the body 1113 parallel to a side where the first sound guiding hole 1111 is located) of the body 1113 outside the second cavity. It should be understood that the first sound guiding hole 1111 cannot be seen from the viewpoint shown in FIG. 21, and a serial number 1111 is only used to show a position of a plane where the first sound guiding hole is located relative to the body 1113 and the baffle 1114. In some embodiments, the sound guiding hole inside the second cavity (i.e., the first sound guiding hole 1111) may be located between the ear canal of the user and the sound guiding hole outside the second cavity (i.e., the second sound guiding hole 1112). In some embodiments, the first sound guiding hole 1111 may be disposed close to the baffle 1114. When the baffle 1114 is a portion of the body 1113, the first sound guiding hole 1111 may also be disposed on the baffle 1114. In some embodiments, the first sound guiding hole 1111 and the second sound guiding hole 1112 may be distributed diagonally on a side of the body 1113 opposite to the face. It should be noted that the first sound guiding hole 1111 and the second sound guiding hole 1112 are not limited to the diagonal distribution as shown in FIG. 21, and may also be distributed along a side edge on the side of the body 1113 opposite to the face, or in any other distribution manner. In some embodiments, in the wearing state, an opening in acoustic communication with the spatial position may be provided between the baffle 1114 and the opening of the ear canal (or the second cavity) of the user. The second cavity may correspond to the like-cavity structure 41 in FIG. 8 and the opening may correspond to the leaking structure 42 in the like-cavity structure such that the sound production component 11 may increase the listening volume at the listening position while maintaining the sound leakage reduction effect.

FIG. 22 is a schematic diagram illustrating an exemplary structure of a housing according to some embodiments of the present disclosure. In some embodiments, the body 1113 may be located in front of the tragus or inside an auricle (e.g., a projection of the body 1113 on the sagittal plane may overlap with a projection of the auricle on the sagittal plane), the baffle 1114 may be connected to a side of the body 1113 away from the face of the user, and the baffle 1114 may extend toward the opening of the ear canal relative to the body 1113. In some embodiments, the baffle 1114 may be a plate structure, and a thickness of the baffle 1114 may be smaller than a thickness of the body 1113 since the body 1113 defines the first cavity for accommodating the transducer 112. As shown in FIG. 22, the thickness t2 of the baffle 1114 may be smaller than the thickness t1 of the body 1113. In some embodiments, when the body 1113 is located in front of the tragus, the thickness t1 of the body 1113 may be a distance between a side of the body 1113 close to the face and a side of the body 1113 away from the face, and the thickness t2 of the baffle 1114 may be a distance between two sides of the baffle 1114 parallel to the two sides of the body 1113. In some embodiments, when the body 1113 is located inside the auricle (or the projection of the body 1113 on the sagittal plane overlaps with the projection of the auricle on the sagittal plane), the thickness t1 of the body 1113 may be a distance between the side of the body 1113 close to the auricle and the side of the body 1113 away from the auricle, and the thickness t2 of the baffle 1114 may be a distance between the two sides of the baffle 1114 parallel to the two sides of the body 1113. In some embodiments, the thickness t1 of the body 1113 refers to a length of the body 1113 along a direction perpendicular to a two-dimensional projection plane (e.g., consistent with a direction of a coronal axis, both pointing to a left-right direction of the body).

Figure 23:
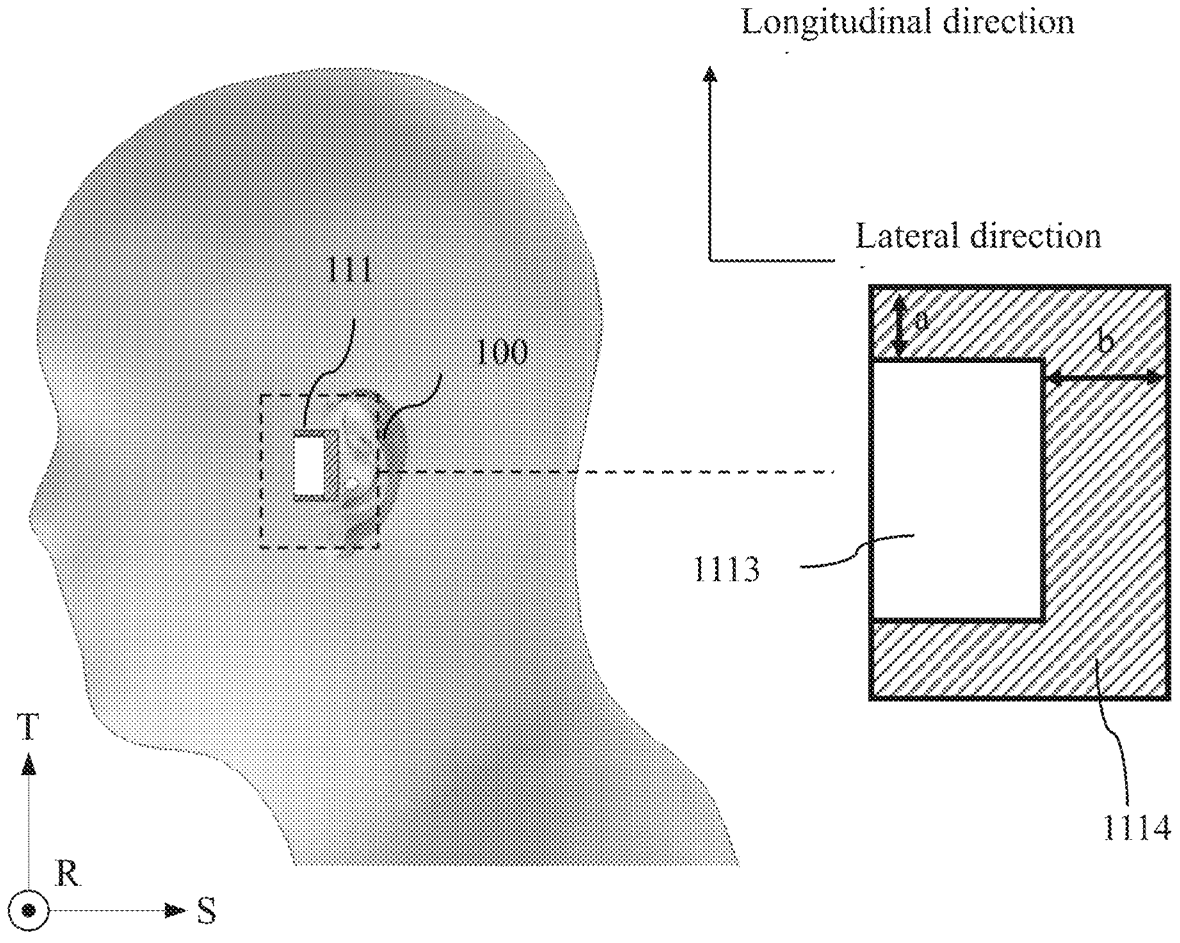
FIG. 23 is a schematic diagram illustrating an exemplary structure of a housing according to some embodiments of the present disclosure.

FIG. 23 is a schematic diagram illustrating an exemplary structure of a housing 111 according to some embodiments of the present disclosure. As shown in FIG. 23, the body 1113 may be located in front of the tragus of the user, and the baffle 1114 may not only protrude from the body 1113 in a lateral direction, but also protrude from the body 1113 in a longitudinal direction. The "lateral" refers to a direction along a sagittal axis (S-axis) of the human body, and the "longitudinal" refers to a direction along a vertical axis (T-axis) of the human body. A portion of the baffle plate 1114 protruding from the body 1113 in the longitudinal direction may have a longitudinal extension size (the size a shown in FIG. 23) and a portion of the baffle 1114 protruding from the body 1113 in the lateral direction may have a lateral extension size (the size b shown in FIG. 23).

Figure 24A:
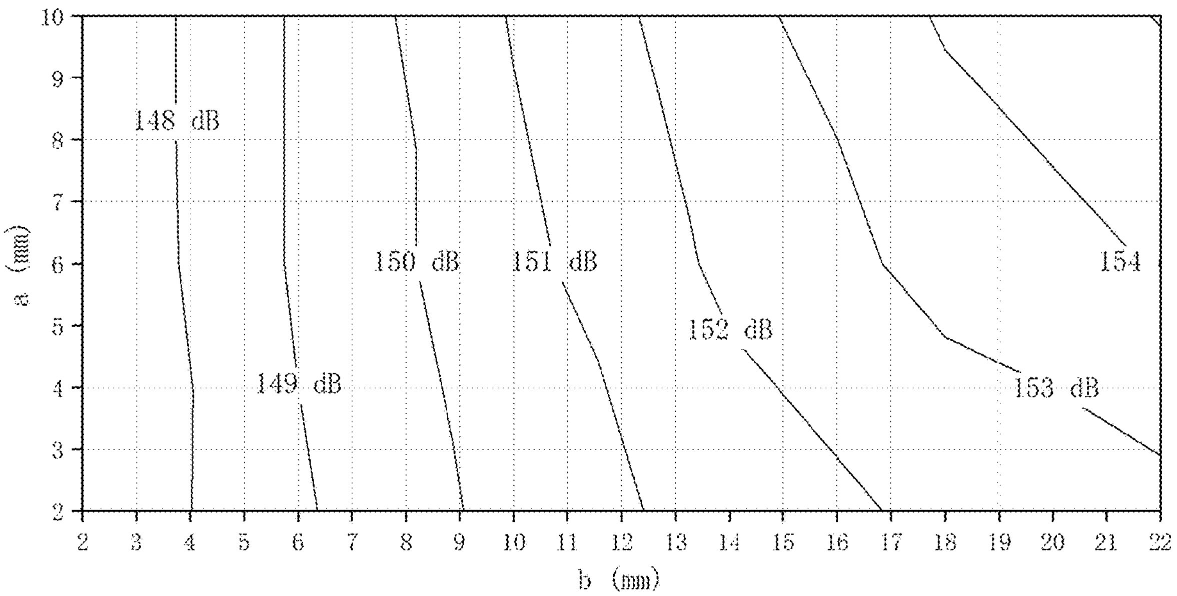
FIG. 24A is a graph illustrating listening volumes corresponding to a baffle shown in FIG. 23 with different lateral extension sizes and longitudinal extension sizes at a frequency of 500 Hz.
Figure 24B:
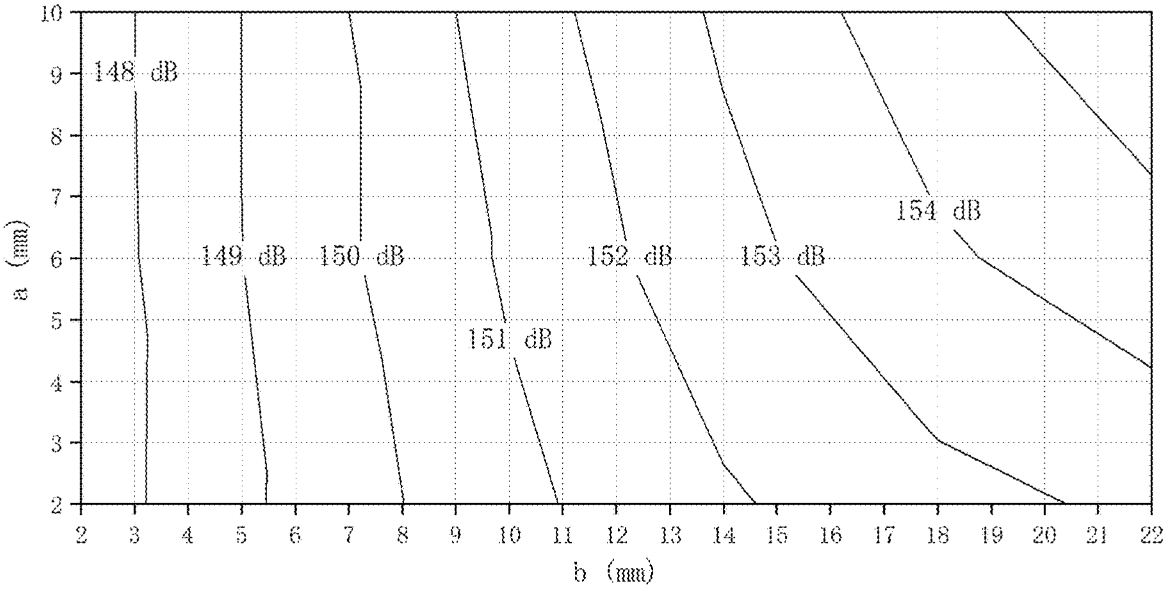
FIG. 24B is a graph illustrating listening volumes corresponding to a baffle shown in FIG. 23 with different lateral extension sizes and longitudinal extension sizes at a frequency of 1000 Hz.
Figure 24C:
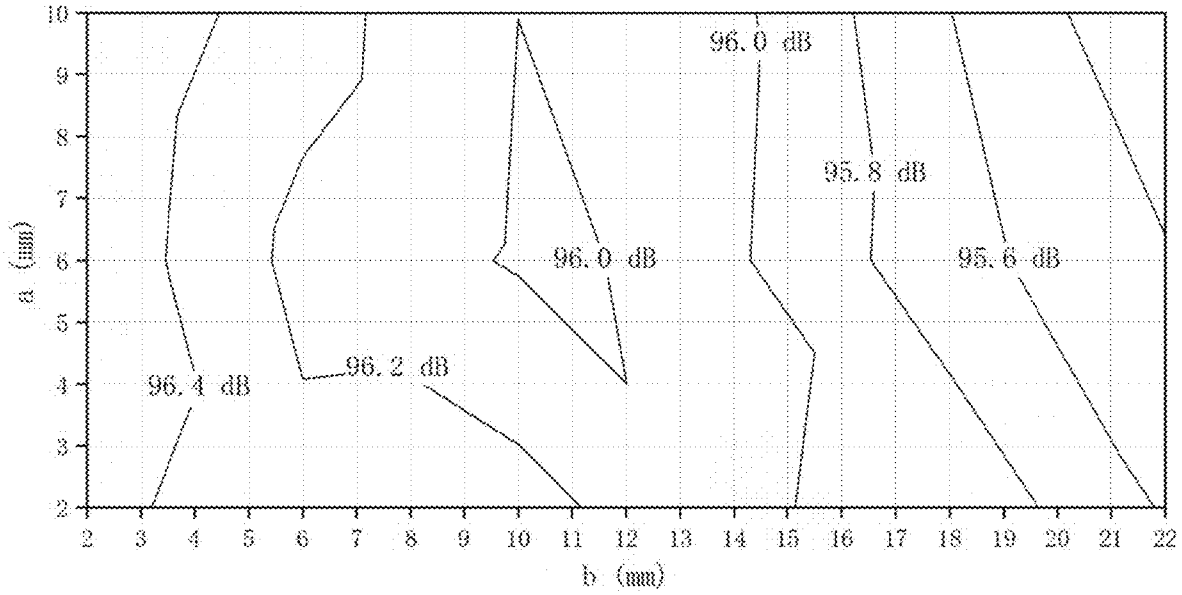
FIG. 24C is a graph illustrating sound leakage volume changes corresponding to a baffle shown in FIG. 23 with different lateral extension and longitudinal extension sizes at a frequency of 500 Hz.
Figure 24D:
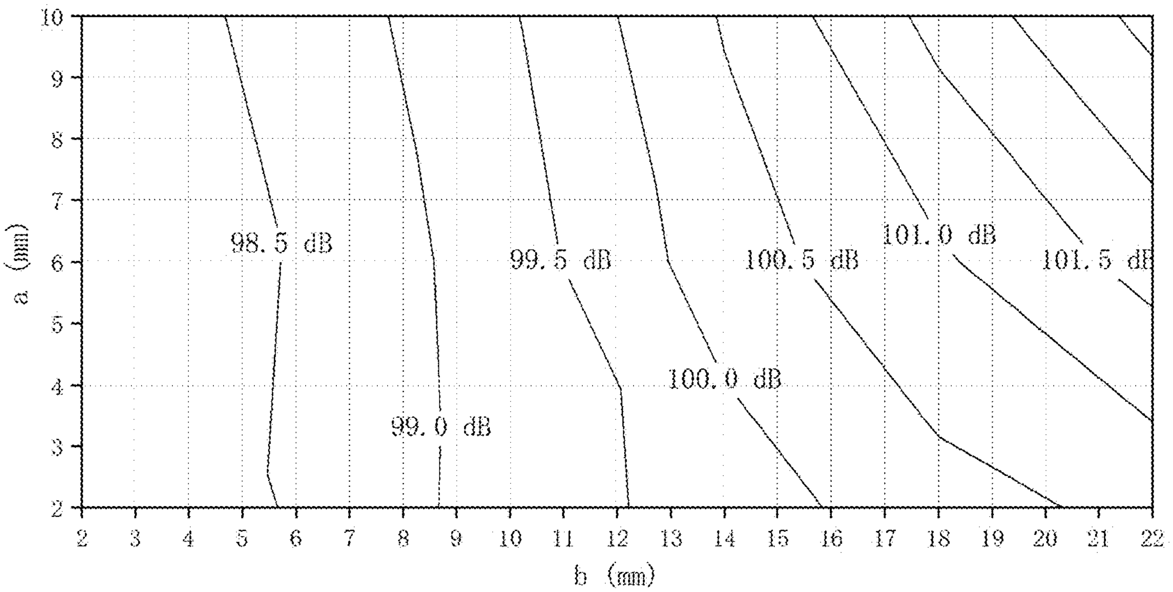
FIG. 24D is a graph illustrating sound leakage volume changes corresponding to a baffle shown in FIG. 23 with different lateral extension sizes and longitudinal extension sizes at a frequency of 1000 Hz.

In some embodiments, since a size (e.g., the longitudinal extension size and the lateral extension size of the baffle 1114 shown in FIG. 23) of the baffle 1114 may affect a size of a relative opening, the listening volume and the volume of the sound leakage of the earphone 10 may be related to the longitudinal extension size and the lateral extension size of the baffle 1114. FIG. 24A is a graph illustrating listening volumes corresponding to the baffle 1114 shown in FIG. 23 with different lateral extension sizes and longitudinal extension sizes at a frequency of 500 Hz. FIG. 24B is a graph illustrating listening volumes corresponding to the baffle 1114 shown in FIG. 23 with different lateral extension sizes and longitudinal extension sizes at a frequency of 1000 Hz. FIG. 24C is a graph illustrating volumes of the sound leakage corresponding to the baffle 1114 shown in FIG. 23 with different lateral extension sizes and longitudinal extension sizes at a frequency of 500 Hz. FIG. 24D is a graph illustrating volumes of the sound leakage corresponding to the baffle 1114 shown in FIG. 23 with different lateral extension sizes and longitudinal extension sizes at a frequency of 1000 Hz. As shown in FIG. 24A-FIG. 24D, when the lateral extension size b of the baffle 1114 changes within a range of 2 mm-22 mm, and the longitudinal extension size a changes within a range of 2 mm-10 mm, the listening volume of the earphone 10 may be increased by up to about 8 dB, and the sound leakage volume may be increased by up to about 3 dB, indicating that when the lateral extension size of the baffle 1114 is within the range of 2 mm-22 mm and the longitudinal extension size is within the range of 2 mm-10 mm, the listening index of the earphone 10 may always be improved. Therefore, in some embodiments, the longitudinal extension size of the baffle 1114 may be within the range of 2 mm-10 mm. For example, the longitudinal extension size of the baffle 1114 may be within a range of 3 mm-9 mm. As another example, the longitudinal extension size of the baffle 1114 may be within a range of 4 mm-8 mm. In some embodiments, the lateral extension size of the baffle 1114 may be within the range of 2 mm-22 mm. For example, the lateral extension size of the baffle 1114 may be within a range of 4 mm-20 mm. For another example, the lateral extension size of the baffle 1114 may be within a range of 6 mm-18 mm.

The longitudinal extension size and the lateral extension size of the baffle 1114 may form an effective area of the baffle 1114. The "effective area" here refers to an area (e.g., the area of the shaded part shown in FIG. 23) of a portion of the baffle 1114 used to form the second cavity with the ear. In some embodiments, the effective area of the baffle 1114 may be within a range of 70 $mm^2$-1110 $mm^2$. For example, the effective area of the baffle 1114 may be within a range of 84 $mm^2$-1060 $mm^2$. As another example, the effective area of the baffle 1114 may be within a range of 100 mm 2-900 $mm^2$.

In some embodiments, according to FIG. 20A-FIG. 20D and the related descriptions thereof, to improve the listening index such that the listening index at each frequency is greater than that of dual point sound sources without the like-cavity structure, the relative distance L/do between a centroid of the opening of the like-cavity structure and the sound source located outside the like-cavity structure may be smaller than or equal to 1.78. When the user wears the earphone 10, as shown in FIG. 21, the relative distance L/do between the centroid of the opening of the like-cavity structure and the sound source outside the like-cavity structure may be expressed as a ratio of the distance L between a boundary 1114-1 of the baffle 1114 close to the ear canal of the user and the second sound guiding hole 1112 to the distance do between the two sound guiding holes. The distance between the boundary 1114-1 to the second sound guiding hole 1112 refers to a distance between a midpoint (e.g., a midpoint M of a line segment m shown in FIG. 21) of a line (e.g., the line segment m shown in FIG. 21) connecting two end points of a boundary line or a boundary plane of the baffle 1114 close to the ear canal at which the baffle 1114 abuts against the auricle and the second sound guiding hole 1112. In some embodiments, the ratio of the distance between the boundary 1114-1 of the baffle 1114 close to the ear canal of the user and the second sound guiding hole 1112 to the distance between the two sound guiding holes may be smaller than 1.78. Merely by way of example, the ratio of the distance between the boundary 1114-1 of the baffle 1114 close to the ear canal of the user and the second sound guiding hole 1112 to the distance between the two sound guiding holes may be smaller than 1.78, 1.68, 1.58, 1.48, 1.38, 1.28, 1.18, 1.08, etc.

In some embodiments, the body 1113 and the baffle 1114 may be an integrated structure, the baffle 1114 may be a portion of the housing 111 extending toward the ear canal of the user, and the baffle 1114 may be disposed close to the face. In some embodiments, the body 1113 and the baffle 1114 may be separate structures and assembled. In some embodiments, the baffle 1114 may be a side of the body 1113. For example, as shown in FIG. 4, at least a portion of the inner side surface IS of the housing 111 (or body) of the sound production component 11 may be used as the baffle, so as to cooperate with the ear (e.g., the concha cavity) of the user to form a second cavity having an opening.

It should be noted that the earphones shown in FIG. 4-FIG. 23 are only for the purpose of illustration, and are not intended to limit the scope of the present disclosure. In some embodiments, one or more components and/or structures of the earphone 10 illustrated above may be omitted or modified. Merely by way of example, the like-cavity structure formed between the sound production component 11 and the ear may be omitted. The first sound guided from the first sound guiding hole 1111 may be transmitted to the inside of the ear canal of the user, or may be directly transmitted to the spatial position (e.g., the far field) without passing through the leaking structure of the like-cavity structure. The first sound transmitted to the spatial position and the second sound transmitted to the spatial position through the second sound guiding hole 1112 may cancel each other, thereby reducing the second sound (i.e., the sound leakage). For example, in the earphone 10 shown in FIG. 3, the first sound guiding hole 1111 and the second sound guiding hole 1112 may be disposed on different sides of the housing (e.g., the first sound guiding hole 1111 may be disposed on the lower side surface LS, and the second sound guiding hole 1112 may be disposed on the upper side surface US or other sides).

In some embodiments, referring to FIG. 8-FIG. 9B and the descriptions thereof, the like-cavity structure may be configured such that the sound wave emitted by the first sound guiding hole 1111 (e.g., through the leaking structure 42) and the sound leakage generated by the second sound guiding hole 1112 may cancel in a far field, which may reduce the sound leakage in the far field, and the sound wave emitted by the second sound guiding hole 1112 may have relatively small influence on the listening sound in the near field. In some embodiments, to improve the sound leakage reduction effect in the far field, a sound pressure at the second sound guiding hole 1112 may be close to a sound pressure at the first sound guiding hole 1111. In such cases, due to the effect of the like-cavity structure, the sound pressure transmitted to the near field by the second sound guiding hole 1112 through the leaking structure 42 may be suppressed, which may have a relatively small influence on the listening sound in the near field. In some embodiments, to effectively reduce the sound leakage in the far field, within a specific frequency range (e.g., any one of 3.5 kHz-4.5 kHz, 2.5 kHz-3.5 kHz, 1.5 kHz-2.5 kHz), a ratio of the sound pressure at the first sound guiding hole 1111 to the sound pressure at the second sound guiding hole 1112 may be within a range of 0.7-1.5. In some embodiments, the ratio of the sound pressure at the first sound guiding hole 1111 to the sound pressure at the second sound guiding hole 1112 may be within a range of 0.8-1.2. In some embodiments, the ratio of the sound pressure at the first sound guiding hole 1111 to the sound pressure at the second sound guiding hole 1112 may be within a range of 0.9-1.1. In some embodiments, the ratio of the sound pressure at the first sound guiding hole 1111 to the sound pressure at the second sound guiding hole 1112 may be within a range of 0.95-1.05. It should be noted that a test manner of the sound pressures at the first sound guiding hole 1111 and the second sound guiding hole 1112 may include: separating a space where the first sound guiding hole 1111 and the second sound guiding hole 1111 are located using a partition, and under a same input signal, measuring the sound pressures at a distance of 2 mm directly in front of the first sound guiding hole 1111 and the second sound guiding hole 1111 using a same microphone.

In some embodiments, the sound pressures of the sound respectively guided from the first sound guiding hole 1111 and the second sound guiding hole 1112 may be adjusted by adjusting acoustic resistances corresponding to the first sound guiding hole 1111 and the second sound guiding hole 1112. For example, the acoustic resistances corresponding to the first sound guiding hole 1111 and the second sound guiding hole 1112 may be the same or close to each other such that the sound pressure at the second sound guiding hole 1112 may be close to the sound pressure at the first sound guiding hole 1111, which may improve the sound leakage reduction effect in the far field. In some embodiments, to make the sound pressure at the second sound guiding hole 1112 close to the sound pressure at the first sound guiding hole 1111 to improve the sound leakage reduction effect in the far field, a difference between the acoustic resistance at the first sound guiding hole 1111 and the acoustic resistance at the second sound guiding hole 1112 may be smaller than 2 MKS rayls. In some embodiments, the difference between the acoustic resistance at the first sound guiding hole 1111 and the acoustic resistance at the second sound guiding hole 1112 may be smaller than 1 MKS rayls. In some embodiments, the difference between the acoustic resistance at the first sound guiding hole 1111 and the acoustic resistance at the second sound guiding hole 1112 may be smaller than 0.5 MKS rayls. In some embodiments, the difference between the acoustic resistance at the first sound guiding hole 1111 and the acoustic resistance at the second sound guiding hole 1112 may be smaller than 0.1 MKS rayls.

In some embodiments, an acoustic resistance mesh may be disposed at the first sound guiding hole 1111 and/or the second sound guiding hole 1112. In some embodiments, the acoustic resistance mesh at the first sound guiding hole 1111 and/or the second sound guiding hole 1112 may be configured such that the acoustic resistances corresponding to the first sound guiding hole 1111 and the second sound guiding hole 1112 may be the same or close. In some embodiments, the acoustic resistance mesh at the first sound guiding hole 1111 and/or the second sound guiding hole 1112 may be used to adjust an amplitude of a resonance peak of the front cavity 113 and/or the rear cavity 114. In some embodiments, the acoustic resistance mesh at the first sound guiding hole 1111 and/or the second sound guiding hole 1112 may be waterproof and dustproof. In some embodiments, the acoustic resistance mesh may include a gauze mesh, a steel mesh, or a combination thereof.

Figure 25A:
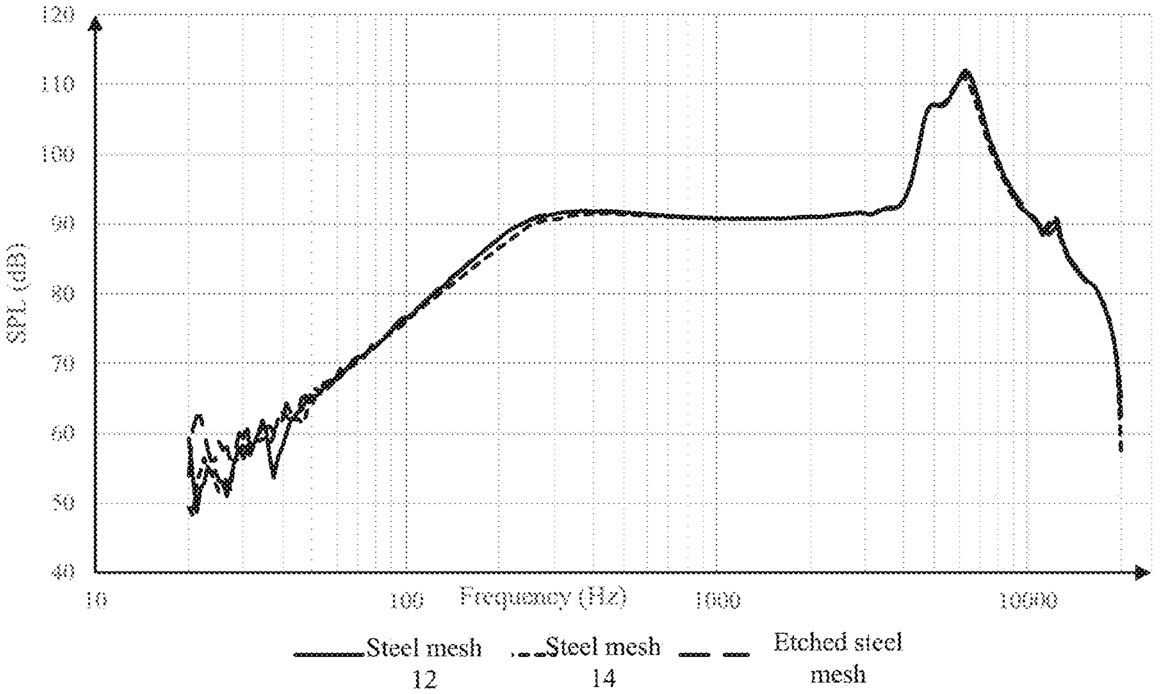
FIGS. 25A-25F are graphs illustrating frequency response curves when different acoustic resistance meshes are respectively disposed at a first sound guiding hole and a second sound guiding hole according to some embodiments of the present disclosure.
Figure 25B:
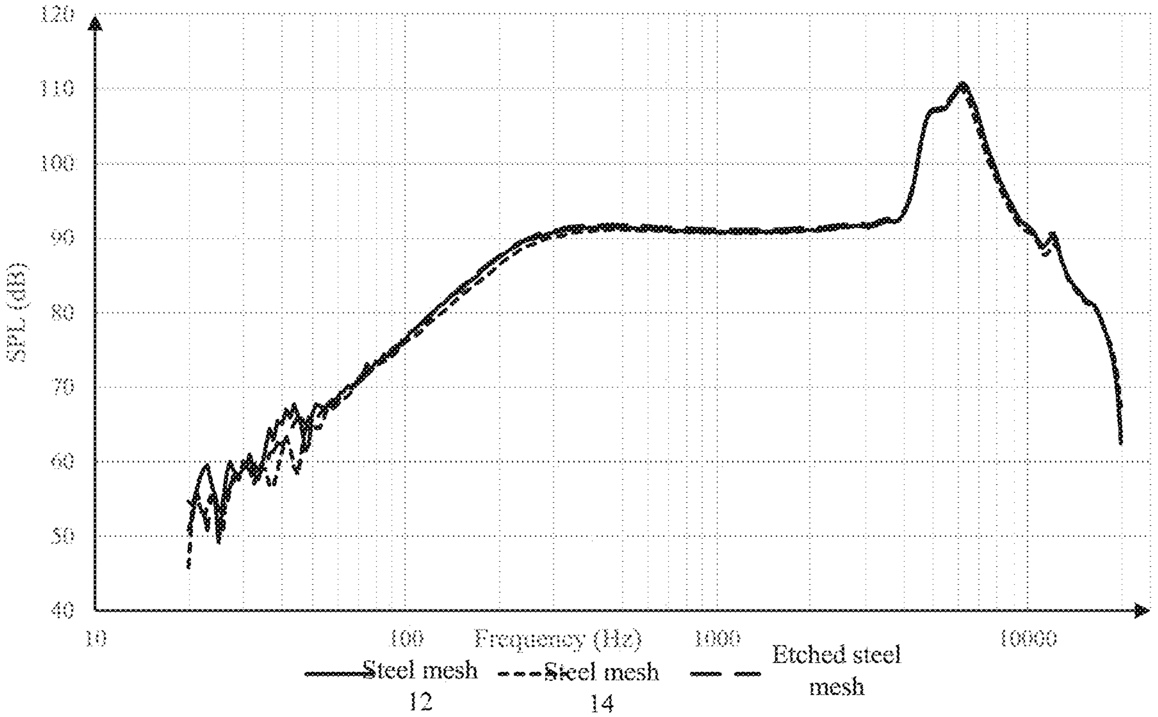
Figure 25C:
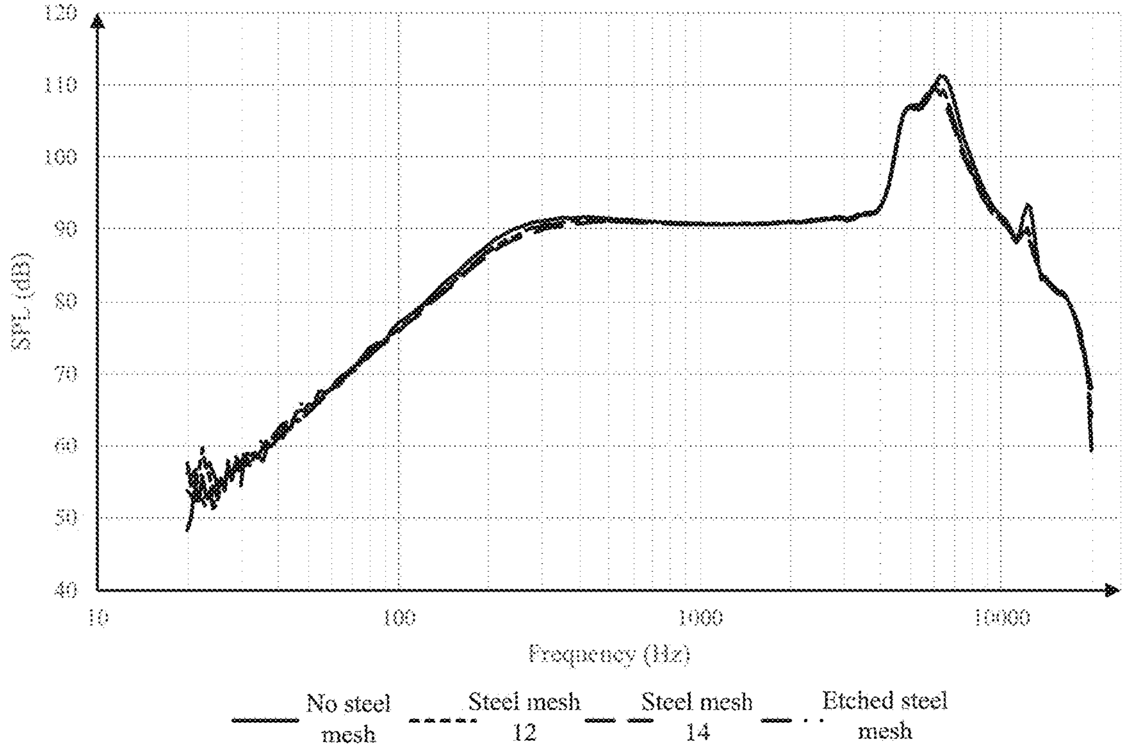
Figure 25D:
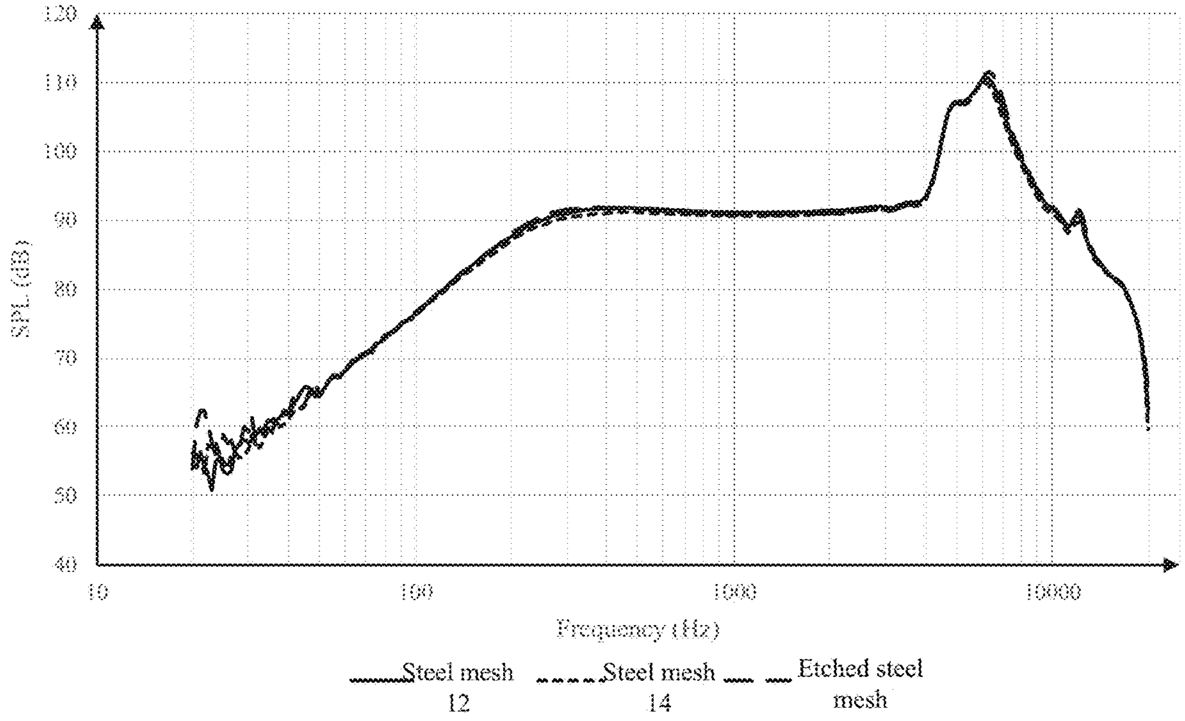
Figure 25E:
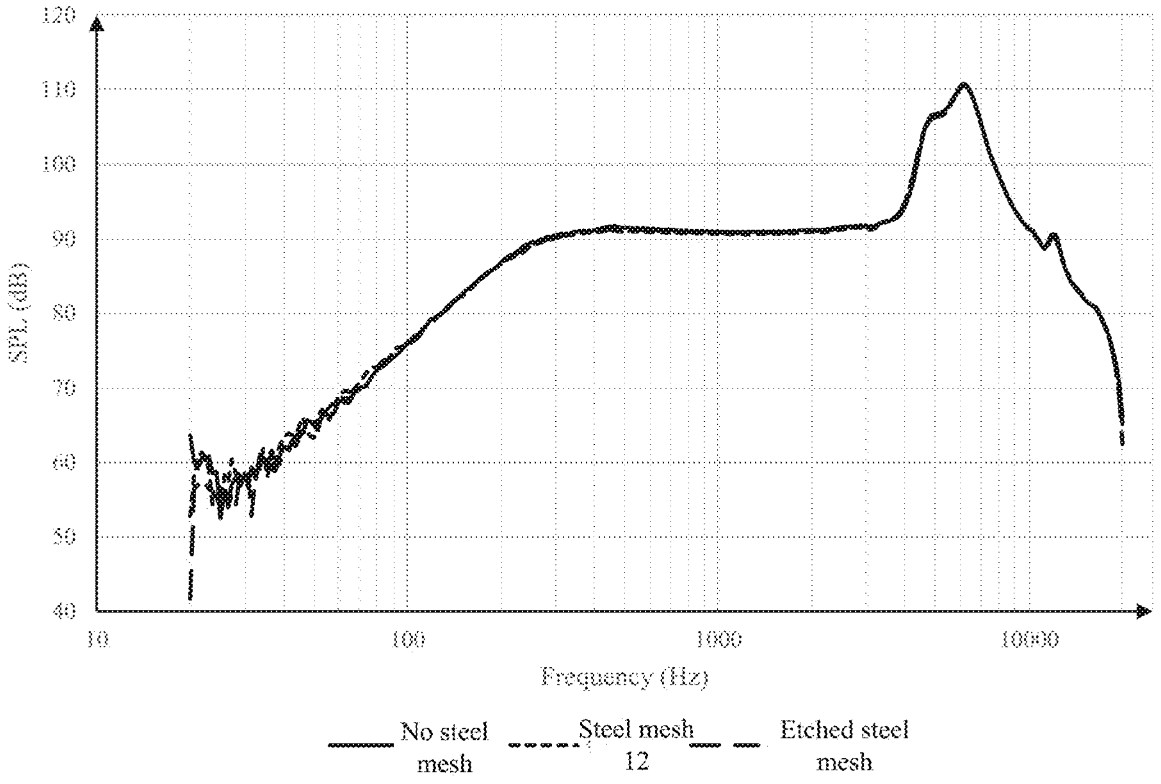
Figure 25F:
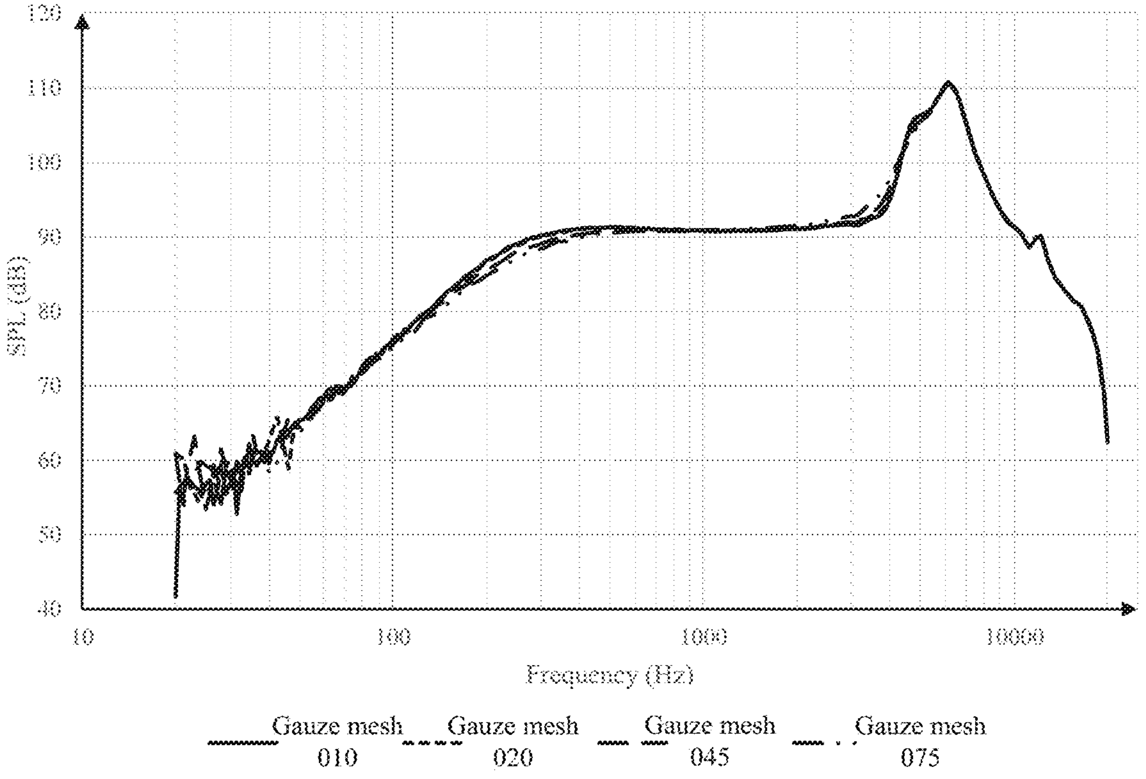

In some embodiments, to improve structural stability while being waterproof and dustproof, the steel mesh may be disposed at the first sound guiding hole 1111 and/or the second sound guiding hole 1112, and a combination of the gauze mesh and the steel mesh may also be used. FIGS. 25A-25F are graphs illustrating frequency response curves when different acoustic resistance meshes are respectively disposed at a first sound guiding hole and a second sound guiding hole according to some embodiments of the present disclosure. FIG. 25A shows the frequency response curves when different steel meshes are disposed at the first sound guiding hole, FIG. 25B shows the frequency response curves when a gauze mesh 006 and different steel meshes are disposed at the first sound guiding hole, FIG. 25C shows the frequency response curves when a gauze mesh 010 and different steel meshes are disposed at the first sound guiding hole, FIG. 25D shows the frequency response curves when an etched steel mesh and different gauze meshes are disposed at the first sound guiding hole, FIG. 25E shows the frequency response curves when the gauze mesh 006 and the etched steel mesh are disposed at the first sound guiding hole, and the gauze mesh 010 and different steel meshes are disposed at the second sound guiding hole, and FIG. 25F shows the frequency response curves when the gauze mesh 006 and the etched steel mesh are disposed at the first sound guiding hole, and the etched steel mesh and different gauze meshes are disposed at the second sound guiding hole. For the different gauze meshes, the corresponding nominal acoustic impedance rates in descending order are: the gauze mesh 006, the gauze mesh 010. For the steel meshes with a same mesh count and different types, the corresponding nominal acoustic impedance rates in descending order are: the etched steel mesh, a steel mesh 12, and a steel mesh 14. 006 and 010 are acoustic resistance parameters, for example, 006 may indicate that the specific acoustic impedance is around 6 MKS rayls. The mesh count refers to a count of holes on the acoustic resistance mesh per unit area. For a same type of acoustic resistance mesh, the larger the mesh count, the greater the corresponding specific acoustic impedance.

As shown in FIGS. 25A-25E, as the overall specific acoustic impedance of the acoustic resistance mesh increases, the frequency response curve may gradually move downward, i.e., the corresponding output sound pressure may decrease, but an amplitude of the decrease may be not obvious. When the etched steel mesh is disposed at the first sound guiding hole 1111, the frequency response curve corresponding to a low-frequency range may have relatively small fluctuations and relatively few peaks and valleys, and the curve may be relatively smooth. In addition, as shown in FIG. 25C or 25D, when the etched steel mesh is used and the gauze mesh 010 or the gauze mesh 006 is disposed at the first sound guiding hole 1111, the frequency response curve corresponding to the low-frequency range may have relatively small fluctuation and relatively few peaks and valleys, and the curve may be relatively smooth. In some embodiments, to improve the smoothness of the frequency response curve of the sound production component 11 and make the sound production component 11 have a relatively large output sound pressure, the acoustic resistance mesh disposed at the first sound guiding hole 1111 may include a steel mesh (e.g., the etched steel mesh), and the mesh count of the steel mesh may be within a range of 60-100. In some embodiments, the acoustic resistance mesh disposed at the first sound guiding hole 1111 may include the steel mesh, and the mesh count of the steel mesh may be within a range of 70-90. In some embodiments, to improve the smoothness of the frequency response curve of the sound production component 11 and a make the sound production component 11 have a relatively large output sound pressure, the acoustic resistance mesh disposed at the first sound guiding hole 1111 may include a gauze mesh and a steel mesh (e.g., the etched steel mesh), the specific acoustic impedance of the gauze mesh may be within a range of 2 MKS rayls-50 MKS rayls, and the mesh count of the steel mesh may be within a range of 60-100. In some embodiments, to improve the smoothness of the frequency response curve of the sound production component 11 and make the sound production component 11 have a relatively large output sound pressure, the acoustic resistance mesh disposed at the first sound guiding hole 1111 may include the gauze mesh and a steel mesh, the specific acoustic impedance of the gauze mesh may be within a range of 5 MKS rayls-20 MKS rayls, and the mesh count of the steel mesh may be within a range of 70-90. In some embodiments, to improve the smoothness of the frequency response curve of the sound production component 11 and make the sound production component 11 have a relatively large output sound pressure, the acoustic resistance mesh disposed at the first sound guiding hole 1111 may include the gauze mesh and the steel mesh, the specific acoustic impedance of the gauze mesh may be within a range of 6 MKS rayls-10 MKS rayls, and the mesh count of the steel mesh may be within a range of 75-85. In some embodiments, when the acoustic resistance mesh disposed at the first sound guiding hole 1111 includes a steel mesh (e.g., the etched steel mesh) or a combination of the gauze mesh and the steel mesh, the specific acoustic impedance of the steel mesh may be within a range of 0.1 MKS rayls-10 MKS rayls. In some embodiments, the specific acoustic impedance of the steel mesh may be within a range of 0.1 MKS rayls-5 MKS rayls. In some embodiments, the specific acoustic impedance of the steel mesh may be within a range of 0.1 MKS rayls-3 MKS rayls.

In some embodiments, the first sound transmitted from the first sound guiding hole 1111 and the second sound transmitted from the second sound guiding hole 1112 may have a certain phase difference such that the first sound and the second sound may cancel at a spatial position (e.g., the far field), which may reduce the second sound (i.e., the sound leakage) at the spatial position. Furthermore, when the phase difference satisfies a certain condition, the sound production component 11 may output a relatively large volume in a certain direction (e.g., a direction where the ear canal of the user is located) and the sound leakage output by the sound production component 11 in an opposite direction may be suppressed. For example, by adjusting the phase difference between the first sound and the second sound, the sound radiated by the sound production component 11 to the far field may present directivity (the directivity may be expressed as two sounds having a sound pressure difference greater than or equal to 6 dB in at least one pair of opposite directions) in the low-frequency range such that the volume in the direction of the ear canal of the user may be relatively large, and the sound leakage in the opposite direction of the ear canal direction and the sound leakage in other directions may be relatively small, which may better balance the openness of the ear canal and the listening privacy.

In some embodiments, an acoustic structure of the cavity (the front cavity 113 and/or the rear cavity 114) may change the phase of the sound radiating from the sound guiding hole of the cavity. In some embodiments, the acoustic structure of the front cavity 113 and/or the rear cavity 114 may be configured such that the phase of the first sound guided from the first sound guiding hole 1111 and/or the phase of the second sound guided from the second sound guiding hole 1112 at the sound production component 11 may be adjusted, thereby adjusting the phase difference between the first sound and the second sound and reducing the sound leakage of the earphone 10. For example, in a case where a front side and a rear side of the diaphragm of the sound production component 11 respectively generate sounds of opposite phases, a baffle may be disposed in the front cavity 113 and/or the rear cavity 114 such that sound paths of the sound transmitted in the two cavities may be different and phase changes of the first sound and the second sound may be different when the first sound and the second sound are transmitted in the cavities, which may adjust the phase difference (i.e., a difference between the phase of the first sound at the first sound guiding hole 1111 and the phase of the second sound at the second sound guiding hole 1112) between the first sound and the second sound. As another example, a specific acoustic structure may be disposed in the front cavity 113 and/or the rear cavity 114 to change transmission speeds of the first sound and the second sound in the cavities, thereby adjusting the phase difference between the first sound and the second sound. An exemplary specific acoustic structure may include a slow acoustic structure that slows down sound transmission, e.g., an acoustic gauze mesh or an acoustic porous material. As another example, an expansion acoustic structure (e.g., an expansion cavity) may be disposed in the front cavity 113 and/or the rear cavity 114 to change equivalent transmission speeds of the first sound and the second sound in the cavities, thereby adjusting the phase difference between the first sound and the second sound. As yet another example, a sound-absorbing structure (e.g., a resonance cavity) may be disposed in the front cavity 113 and/or the rear cavity 114, and the phase difference between the first sound and the second sound may be adjusted using the modulation of the sound-absorbing structure to sound near a resonance frequency of the sound-absorbing structure.

In some embodiments, when the phase difference between the first sound and the second sound is in a specific range (e.g., smaller than 180), in at least a portion of the low-frequency range, the sound radiated by the sound production component 11 to a spatial position (e.g., far field) may present the directivity such that a radiation field of the sound in the spatial position may have only one strong directivity direction (the sound pressure in the strong directivity direction and nearby directions thereof is large enough), and radiation intensities in other directions may be relatively small. In some embodiments, the sounds radiated from the front cavity 113 and the rear cavity 114 may have a sound pressure difference of greater than or equal to 15 dB in at least one pair of opposite directions (e.g., when the user wears the earphone 10, the direction toward the opening of the ear canal and the direction away from the opening of the ear canal). In some embodiments, the sounds radiated from the front cavity 113 and the rear cavity 114 may have a sound pressure difference of greater than or equal to 10 dB in at least one pair of opposite directions (e.g., when the user wears the earphone 10, the direction toward the opening of the ear canal and the direction away from the opening of the ear canal). In some embodiments, the sound radiated from the front cavity 113 and the rear cavity 114 may have a sound pressure difference of greater than or equal to 6 dB in at least one pair of opposite directions (e.g., when the user wears the earphone 10, the direction toward the opening of the ear canal and the direction away from the opening of the ear canal). In some embodiments, when the user wears the earphone 10, the strong directivity direction may be directed toward the opening of the ear canal of the user. In such cases, when the user wears the earphone 10, the sound transmitted to the opening of the ear canal of the user may be loud enough, and the sound leakage in other directions (e.g., a direction away from the opening of the ear canal) may be reduced, thereby improving the user's listening experience and privacy. In some embodiments, a method for testing the sound pressure difference may be as follows. An acquisition position may be disposed in each of a pair of opposite directions of the earphone 10 (or the sound production component 11) (e.g., the direction in which the first sound guiding hole 1111 is facing and the direction in which the first sound guiding hole 1111 is away from). An acquisition distance from a midpoint of a line connecting an acoustic center of the first sound guiding hole 1111 and an acoustic center of the second sound guiding hole 1112 to each acquisition position may be the same, and the acquisition distance may be smaller than 20 cm. A sound acquisition device (e.g., a microphone) may be disposed at the two acquisition positions to acquire the sound pressures of the earphone 10, and the difference between the two sound pressures may be determined, i.e., the sound pressure difference between the sounds radiated from the front cavity 113 and the rear cavity 114 in at least one pair of opposite directions. It should be noted that the acoustic center of the sound guiding hole (e.g., the first sound guiding hole or the second sound guiding hole) may refer to an equivalent sound emission position of the sound guiding hole, and the equivalent sound emission position may be determined based on a shape and a size of the sound guiding hole and a count of the sound guiding holes. When there is one sound guiding hole, the acoustic center may be a geometric center of the sound guiding hole (e.g., the sound guiding hole may have an outer opening and an inner opening in a depth direction, and the geometric center of the sound guiding hole refers to a centroid of the outer opening). When there are two sound guiding holes, the acoustic center may be a midpoint of a line connecting the geometric centers of the two sound guiding holes. For example, when there are two first sound guiding holes, the acoustic center of the first sound guiding holes may be a midpoint of a line connecting geometric centers of the two first sound guiding holes. When there are three sound guiding holes, the acoustic center may be a center of a circumcircle of geometric centers of the three sound guiding holes, or the acoustic center may be a centroid of a triangle enclosed by geometric centers of the three sound guiding holes. When there are four or more sound guiding holes, the acoustic center may be a centroid of a quadrilateral (or polygon) enclosed by lines connecting geometric centers of the four (or more) sound guiding holes.

In some embodiments, in the low-frequency range, the phase difference between the first sound and the second sound may be smaller than 180. In some embodiments, in the low-frequency range, the phase difference between the first sound and the second sound may be within a range of 120°-179°. In some embodiments, in the low-frequency range, the phase difference between the first sound and the second sound may be within a range of 125°-170°. In some embodiments, in the low-frequency range, the phase difference between the first sound and the second sound may be within a range of 130°-165°. In some embodiments, in the low-frequency range, the phase difference between the first sound and the second sound may be within a range of 135°-160°. In some embodiments, in the low-frequency range, the phase difference between the first sound and the second sound may be 140-155°. In some embodiments, in the low-frequency range, the phase difference between the first sound and the second sound may be within a range of 170°-179°. In some embodiments, in the low-frequency range, the phase difference between the first sound and the second sound may be within a range of 176°-179°.

In some embodiments, when the frequency is 1000 Hz, the phase difference between the first sound and the second sound may be within a range of 125°-178°. In some embodiments, when the frequency is 1000 Hz, the phase difference between the first sound and the second sound may be within a range of 140°-178°. In some embodiments, when the frequency is 1000 Hz, the phase difference between the first sound and the second sound may be within a range of 160°-178°. In some embodiments, when the frequency is 1000 Hz, the phase difference between the first sound and the second sound may be within a range of 165°-178°. In some embodiments, when the frequency is 1000 Hz, the phase difference between the first sound and the second sound may be within a range of 170°-178°. In some embodiments, when the frequency is 1000 Hz, the phase difference between the first sound and the second sound may be within a range of 175°-178°.

When distances between the first sound guiding holes and the second sound guiding holes are different, the phase differences between the first sounds and the second sounds may be different. In some embodiments, the distance between the acoustic center of the first sound guiding hole and the acoustic center of the second sound guiding hole may be within a range of 2 mm-4 mm, and when the frequency is 1000 Hz, the phase difference between the first sound and the second sound may be within a range of 174°-178°. In some embodiments, the distance between the acoustic center of the first sound guiding hole and the acoustic center of the second sound guiding hole may be within the range of 2 mm-4 mm, and when the frequency is 1000 Hz, the phase difference between the first sound and the second sound may be within a range of 175°-178°. In some embodiments, the distance between the acoustic center of the first sound guiding hole and the acoustic center of the second sound guiding hole may be within a range of 4 mm-8 mm, and when the frequency is 1000 Hz, the phase difference between the first sound and the second sound may be within a range of 170°-177°. In some embodiments, the distance between the acoustic center of the first sound guiding hole and the acoustic center of the second sound guiding hole may be within the range of 4 mm-8 mm, and when the frequency is 1000 Hz, the phase difference between the first sound and the second sound may be within a range of 169°-176°. In some embodiments, the distance between the acoustic center of the first sound guiding hole and the acoustic center of the second sound guiding hole may be within a range of 8 mm-16 mm, and when the frequency is 1000 Hz, the phase difference between the first sound and the second sound may be within a range of 162°-173°. In some embodiments, the distance between the acoustic center of the first sound guiding hole and the acoustic center of the second sound guiding hole may be within the range of 8 mm-16 mm, and when the frequency is 1000 Hz, the phase difference between the first sound and the second sound may be within a range of 163°-172°. In some embodiments, the distance between the acoustic center of the first sound guiding hole and the acoustic center of the second sound guiding hole may be within a range of 16 mm-20 mm, and when the frequency is 1000 Hz, the phase difference between the first sound and the second sound may be within a range of 158°-165°. In some embodiments, the distance between the acoustic center of the first sound guiding hole and the acoustic center of the second sound guiding hole may be within the range of 16 mm-20 mm, and when the frequency is 1000 Hz, the phase difference between the first sound and the second sound may be within a range of 159°-164°.

In some embodiments, when the frequency is 200 Hz, the phase difference between the first sound and the second sound may be greater than 175° and smaller than 179.8°. In some embodiments, when the frequency is 200 Hz, the phase difference between the first sound and the second sound may be greater than 177° and smaller than 179.8°. In some embodiments, when the frequency is 200 Hz, the phase difference between the first sound and the second sound may be greater than 179° and smaller than 179.8°. In some embodiments, the distance between the acoustic center of the first sound guiding hole and the acoustic center of the second sound guiding hole may be within a range of 2 mm-20 mm, and when the frequency is 200 Hz, the phase difference between the first sound and the second sound may be greater than 175° and smaller than 179.8°. In some embodiments, the distance between the acoustic center of the first sound guiding hole and the acoustic center of the second sound guiding hole may be within the range of 2 mm-20 mm, and when the frequency is 200 Hz, the phase difference between the first sound and the second sound may be greater than 174° and smaller than 179.8°. In some embodiments, the distance between the acoustic center of the first sound guiding hole and the acoustic center of the second sound guiding hole may be within a range of 2 mm-10 mm, and when the frequency is 200 Hz, the phase difference between the first sound and the second sound may be greater than 176° and smaller than 179.8°. In some embodiments, the distance between the acoustic center of the first sound guiding hole and the acoustic center of the second sound guiding hole may be within the range of 2 mm-10 mm, and when the frequency is 200 Hz, the phase difference between the first sound and the second sound may be greater than 177.8° and smaller than 179.8°. In some embodiments, the distance between the acoustic center of the first sound guiding hole and the acoustic center of the second sound guiding hole may be within a range of 2 mm-4 mm, and when the frequency is 200 Hz, the phase difference between the first sound and the second sound may be greater than 177° and smaller than 179.8°. In some embodiments, the distance between the acoustic center of the first sound guiding hole and the acoustic center of the second sound guiding hole may be within the range of 2 mm-4 mm, and when the frequency is 200 Hz, the phase difference between the first sound and the second sound may be greater than 176° and smaller than 179.8°.

In some embodiments, when the frequency is 500 Hz, the phase difference between the first sound and the second sound may be within a range of 169°-179°. In some embodiments, when the frequency is 500 Hz, the phase difference between the first sound and the second sound may be within a range of 174°-179°. In some embodiments, when the frequency is 500 Hz, the phase difference between the first sound and the second sound may be within a range of 177°-179°. In some embodiments, the distance between the acoustic center of the first sound guiding hole and the acoustic center of the second sound guiding hole may be within the range of 2 mm-20 mm, and when the frequency is 500 Hz, the phase difference between the first sound and the second sound may be within a range of 169°-179°. In some embodiments, the distance between the acoustic center of the first sound guiding hole and the acoustic center of the second sound guiding hole may be within the range of 2 mm-20 mm, and when the frequency is 500 Hz, the phase difference between the first sound and the second sound may be within a range of 168°-179°. In some embodiments, the distance between the acoustic center of the first sound guiding hole and the acoustic center of the second sound guiding hole may be within the range of 2 mm-10 mm, and when the frequency is 500 Hz, the phase difference between the first sound and the second sound may be within a range of 175°-179°. In some embodiments, the distance between the acoustic center of the first sound guiding hole and the acoustic center of the second sound guiding hole may be within the range of 2 mm-10 mm, and when the frequency is 500 Hz, the phase difference between the first sound and the second sound may be within a range of 174°-179°. In some embodiments, the distance between the acoustic center of the first sound guiding hole and the acoustic center of the second sound guiding hole may be within the range of 2 mm-4 mm, and when the frequency is 500 Hz, the phase difference between the first sound and the second sound may be within a range of 177°-179°. In some embodiments, the distance between the acoustic center of the first sound guiding hole and the acoustic center of the second sound guiding hole may be within the range of 2 mm-4 mm, and when the frequency is 500 Hz, the phase difference between the first sound and the second sound may be within a range of 176°-179°.

In some embodiments, when the frequency is 1500 Hz, the phase difference between the first sound and the second sound may be within a range of 149°-177°. In some embodiments, when the frequency is 1500 Hz, the phase difference between the first sound and the second sound may be within a range of 164°-177°. In some embodiments, when the frequency is 1500 Hz, the phase difference between the first sound and the second sound may be within a range of 173°-177°. In some embodiments, the distance between the acoustic center of the first sound guiding hole and the acoustic center of the second sound guiding hole may be within the range of 2 mm-20 mm, and when the frequency is 1500 Hz, the phase difference between the first sound and the second sound may be within a range of 149°-177°. In some embodiments, the distance between the acoustic center of the first sound guiding hole and the acoustic center of the second sound guiding hole may be within the range of 2 mm-20 mm, and when the frequency is 1500 Hz, the phase difference between the first sound and the second sound may be within a range of 148°-178°. In some embodiments, the distance between the acoustic center of the first sound guiding hole and the acoustic center of the second sound guiding hole may be within the range of 2 mm-10 mm, and when the frequency is 1500 Hz, the phase difference between the first sound and the second sound may be within a range of 164°-177°. In some embodiments, the distance between the acoustic center of the first sound guiding hole and the acoustic center of the second sound guiding hole may be within the range of 2 mm-10 mm, and when the frequency is 1500 Hz, the phase difference between the first sound and the second sound may be within a range of 163°-178°. In some embodiments, the distance between the acoustic center of the first sound guiding hole and the acoustic center of the second sound guiding hole may be within the range of 2 mm-4 mm, and when the frequency is 1500 Hz, the phase difference between the first sound and the second sound may be within a range of 173°-177°. In some embodiments, the distance between the acoustic center of the first sound guiding hole and the acoustic center of the second sound guiding hole may be within the range of 2 mm-4 mm, and when the frequency is 1500 Hz, the phase difference between the first sound and the second sound may be within a range of 172°-178°.

In some embodiments, when the frequency is 2000 Hz, the phase difference between the first sound and the second sound may be within a range of 139°-176°. In some embodiments, when the frequency is 2000 Hz, the phase difference between the first sound and the second sound may be within a range of 159°-176°. In some embodiments, when the frequency is 2000 Hz, the phase difference between the first sound and the second sound may be within a range of 171°-176°. In some embodiments, the distance between the acoustic center of the first sound guiding hole and the acoustic center of the second sound guiding hole may be within the range of 2 mm-20 mm, and when the frequency is 2000 Hz, the phase difference between the first sound and the second sound may be within a range of 139°-176°. In some embodiments, the distance between the acoustic center of the first sound guiding hole and the acoustic center of the second sound guiding hole may be within the range of 2 mm-20 mm, and when the frequency is 2000 Hz, the phase difference between the first sound and the second sound may be within a range of 138°-177°. In some embodiments, the distance between the acoustic center of the first sound guiding hole and the acoustic center of the second sound guiding hole may be within the range of 2 mm-10 mm, and when the frequency is 2000 Hz, the phase difference between the first sound and the second sound may be within a range of 159°-176°. In some embodiments, the distance between the acoustic center of the first sound guiding hole and the acoustic center of the second sound guiding hole may be within the range of 2 mm-10 mm, and when the frequency is 2000 Hz, the phase difference between the first sound and the second sound may be within a range of 158°-177°. In some embodiments, the distance between the acoustic center of the first sound guiding hole and the acoustic center of the second sound guiding hole may be within the range of 2 mm-4 mm, and when the frequency is 2000 Hz, the phase difference between the first sound and the second sound may be within a range of 169°-176°. In some embodiments, the distance between the acoustic center of the first sound guiding hole and the acoustic center of the second sound guiding hole may be within the range of 2 mm-4 mm, and when the frequency is 2000 Hz, the phase difference between the first sound and the second sound may be within a range of 170°-175°.

In some embodiments, when the frequency is 3000 Hz, the phase difference between the first sound and the second sound may be within a range of 121°-174°. In some embodiments, when the frequency is 3000 Hz, the phase difference between the first sound and the second sound may be within a range of 149°-174°. In some embodiments, when the frequency is 3000 Hz, the phase difference between the first sound and the second sound may be within a range of 167°-174°. In some embodiments, the distance between the acoustic center of the first sound guiding hole and the acoustic center of the second sound guiding hole may be within the range of 2 mm-20 mm, and when the frequency is 3000 Hz, the phase difference between the first sound and the second sound may be within a range of 121°-174°. In some embodiments, the distance between the acoustic center of the first sound guiding hole and the acoustic center of the second sound guiding hole may be within the range of 2 mm-20 mm, and when the frequency is 3000 Hz, the phase difference between the first sound and the second sound may be within a range of 120°-175°. In some embodiments, the distance between the acoustic center of the first sound guiding hole and the acoustic center of the second sound guiding hole may be within the range of 2 mm-10 mm, and when the frequency is 3000 Hz, the phase difference between the first sound and the second sound may be within a range of 149°-174°. In some embodiments, the distance between the acoustic center of the first sound guiding hole and the acoustic center of the second sound guiding hole may be within the range of 2 mm-10 mm, and when the frequency is 3000 Hz, the phase difference between the first sound and the second sound may be within a range of 148°-175°. In some embodiments, the distance between the acoustic center of the first sound guiding hole and the acoustic center of the second sound guiding hole may be within the range of 2 mm-4 mm, and when the frequency is 3000 Hz, the phase difference between the first sound and the second sound may be within a range of 167°-174°. In some embodiments, the distance between the acoustic center of the first sound guiding hole and the acoustic center of the second sound guiding hole may be within the range of 2 mm-4 mm, and when the frequency is 3000 Hz, the phase difference between the first sound and the second sound may be within a range of 166°-175°.

In some embodiments, when the distance between the first sound guiding hole and the second sound guiding hole is determined, the phase difference between the first sound and the second sound may be within a specific range at some specific frequency bands or frequency values.

In some embodiments, there may be a plurality of frequency values in a frequency range of 500 Hz-3000 Hz, and when the frequency is any one of these frequency values, the phase difference between the first sound and the second sound may be within a range of 121°-179°. In some embodiments, the frequency value at which the phase difference between the first sound and the second sound is within the range of 121°-179° may include, but is not limited to 500 Hz, 800 Hz, 1000 Hz, 1200 Hz, 1500 Hz, or any combination thereof. In some embodiments, the distance between the acoustic center of the first sound guiding hole and the acoustic center of the second sound guiding hole may be within the range of 2 mm-20 mm, and when the frequency is 500 Hz, 800 Hz, 1000 Hz, 1200 Hz, 1500 Hz, or any combination thereof, the phase difference between the first sound and the second sound may be within the range of 121°-179°. In some embodiments, the distance between the acoustic center of the first sound guiding hole and the acoustic center of the second sound guiding hole may be within the range of 2 mm-20 mm, when the frequency is 500 Hz, 800 Hz, 1000 Hz, 1200 Hz, 1500 Hz, or any combination thereof, the phase difference between the first sound and the second sound may be within a range of 120°-179°. In some embodiments, the distance between the acoustic center of the first sound guiding hole and the acoustic center of the second sound guiding hole may be within the range of 2 mm-10 mm, when the frequency is 500 Hz, 800 Hz, 1000 Hz, 1200 Hz, 1500 Hz, or any combination thereof, the phase difference between the first sound and the second sound may be within a range of 164°-179°. In some embodiments, the distance between the acoustic center of the first sound guiding hole and the acoustic center of the second sound guiding hole may be within the range of 2 mm-10 mm, when the frequency is 500 Hz, 800 Hz, 1000 Hz, 1200 Hz, 1500 Hz, or any combination thereof, the phase difference between the first sound and the second sound may be within a range of 163°-179°. In some embodiments, the distance between the acoustic center of the first sound guiding hole and the acoustic center of the second sound guiding hole may be within the range of 2 mm-4 mm, when the frequency is 500 Hz, 800 Hz, 1000 Hz, 1200 Hz, 1500 Hz, or any combination thereof, the phase difference between the first sound and the second sound may be within a range of 175°-179°. In some embodiments, the distance between the acoustic center of the first sound guiding hole and the acoustic center of the second sound guiding hole may be within the range of 2 mm-4 mm, when the frequency is 500 Hz, 800 Hz, 1000 Hz, 1200 Hz, 1500 Hz, or any combination thereof, the phase difference between the first sound and the second sound may be within a range of 174°-179°.

In some embodiments, by setting the distance between the first sound guiding hole and the second sound guiding hole, the phase difference between the first sound and the second sound may be within a range of 121° ~179° in the frequency range of 500 Hz-3000 Hz. In some embodiments, the distance between the acoustic center of the first sound guiding hole and the acoustic center of the second sound guiding hole may be within the range of 2 mm-20 mm, and the phase difference between the first sound and the second sound may be within the range of 121°-179° in the frequency range of 500 Hz-3000 Hz. In some embodiments, the distance between the acoustic center of the first sound guiding hole and the acoustic center of the second sound guiding hole may be within the range of 2 mm-20 mm, and the phase difference between the first sound and the second sound may be within a range of 120°-179° in the frequency range of 500 Hz-3000 Hz. In some embodiments, the distance between the acoustic center of the first sound guiding hole and the acoustic center of the second sound guiding hole may be within the range of 2 mm-10 mm, and the phase difference between the first sound and the second sound may be within a range of 164°-179° in the frequency range of 500 Hz-3000 Hz. In some embodiments, the distance between the acoustic center of the first sound guiding hole and the acoustic center of the second sound guiding hole may be within the range of 2 mm-10 mm, and the phase difference between the first sound and the second sound may be within a range of 163°-179° in the frequency range of 500 Hz-3000 Hz. In some embodiments, the distance between the acoustic center of the first sound guiding hole and the acoustic center of the second sound guiding hole may be within the range of 2 mm-4 mm, and the phase difference between the first sound and the second sound may be within a range of 175°-179° in the frequency range of 500 Hz-1500 Hz. In some embodiments, the distance between the acoustic center of the first sound guiding hole and the acoustic center of the second sound guiding hole may be within the range of 2 mm-4 mm, and the phase difference between the first sound and the second sound may be within the range of 174°-179° in the frequency range of 500 Hz-1500 Hz. It should be noted that the endpoints of the various distance ranges in the embodiments of the present disclosure may coincide, but the endpoints of the phase difference range corresponding to each distance range may not coincide, which is mainly due to a measurement error in actual measurement.

It should be noted that the phase of the sound radiated from the sound guiding hole illustrated in the embodiments of the present disclosure may be measured at a spatial position at a specific distance from the sound guiding hole (or the geometric center of the sound guiding hole). In some embodiments, the specific distance may be within a range of 1 mm-10 mm. In some embodiments, the phase of the sound radiating from the sound guiding hole may be measured at the geometric center of the sound guiding hole. In some embodiments, a manner for testing the phase difference may be to measure the phases of the sounds (respectively the first sound and the second sound) radiated from the two sound guiding holes, and determine the phase difference between the first sound and the second sound. When the sound of the first sound guiding hole (or the second sound guiding hole) is tested, the first sound guiding hole and the second sound guiding hole may be separated using a partition to avoid the second sound guiding hole (or the first sound guiding hole) from interfering the test. Further, the sound acquisition device may be placed less than or equal to 10 mm away from the first sound guiding hole (or the second sound guiding hole) to acquire the first sound, thereby avoiding the second sound guiding hole (or the first sound guiding hole) from interfering the test. When the sound of the first sound guiding hole (or the second sound guiding hole) is tested using a partition to separate the first sound guiding hole and the second sound guiding hole, a distance between a measurement position and the geometric center of the corresponding sound guiding hole may be within the specified distance range (1 mm-10 mm). Merely by way of example, a size of the partition with a standard size may be used. For example, a length, width, and height of the partition may be 1650 mm, 1350 mm, and 30 mm, respectively. It should be noted that when there are two or more first sound guiding holes (or second sound guiding holes), one of which may be used for testing. For example, one first sound guiding hole and one second sound guiding hole located at specific relative positions (e.g., with the smallest or largest relative distance) may be selected, the phases of the sounds guided from the first sound guiding hole and the second sound guiding hole may be tested respectively, and the phase difference may be determined. In addition, the sound measurement in a specific frequency band (e.g., 500 Hz-3000 Hz) does not have to be exhaustive, but the sound of each sampling point may be separately measured by setting a plurality of (e.g., 20-30) frequency sampling points as endpoints of the frequency band with a same step.

It should be noted that the low-frequency range illustrated in the embodiments of the present disclosure refers to a range in which the frequency is smaller than 1000 Hz. The far field refers to a spatial range in which a distance from the sound production component 11 is greater than twice the wavelength corresponding to a specified frequency (e.g., a specific frequency in the low-frequency range).

Figure 26A:
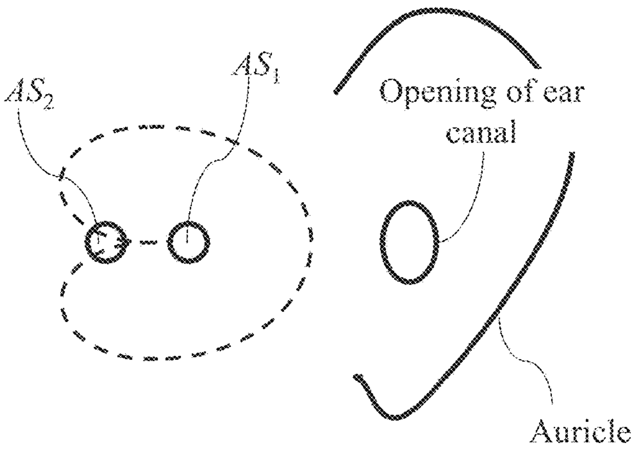
FIG. 26A and FIG. 26B are schematic diagrams illustrating directional radiation sound fields of exemplary earphones according to some embodiments of the present disclosure.
Figure 26B:
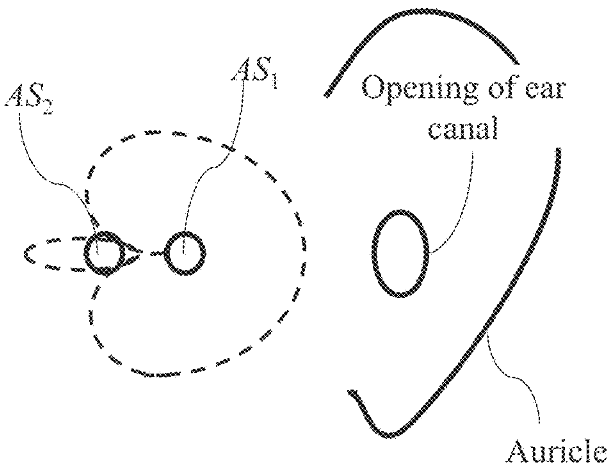

FIG. 26A and FIG. 26B are schematic diagrams illustrating directional radiation sound fields of exemplary earphones according to some embodiments of the present disclosure. As shown in FIG. 26A and FIG. 26B, $AS_1$ and $AS_2$ respectively represent a first sound source and a second sound source formed by the sound production component 11 of the earphone 10 (e.g., the first sound guiding hole 1111 and the second sound guiding hole 1112 may respectively form the first sound source and the second sound source). When a first sound produced by the first sound source and a second sound produced by the second sound source have a specific phase difference (e.g., smaller than 180° (e.g., 120°-179°)), the first source $AS_1$ and the second sound source $AS_2$ may form a strong directional radiation sound field, e.g., a cardioid directional radiation sound field as shown in FIG. 26A, or a supercardioid directional radiation sound field as shown in FIG. 26B. According to the figures, the cardioid (FIG. 26A) or supercardioid (FIG. 26B) directional radiation sound field has only one main lobe, the sound field radiation in the main lobe and around the main lobe may be extremely strong, and the sound field radiation in other directions may be relatively weak (the sound field intensity in an opposite direction of the main lobe may be relatively weak). When the user wears the earphone 10, the main lobe may point to the opening of the ear canal of the user. In such cases, only the radiation pointing to the opening of the ear canal and around the opening of the ear canal may be relatively strong, and the radiation pointing to other directions may be weak, thereby reducing the sound leaking of the earphone. It should be understood that the phase differences between the first sounds and the second sounds in FIG. 26A and FIG. 26B are different (but both are within a specific range) such that the radiation sound fields presented in FIG. 26A and FIG. 26B may be different. A principle of forming the strong directional radiation sound field (e.g., the cardioid or supercardioid directional radiation sound field) when the first sound and the second sound have the specific phase difference is illustrated as follows.

Figure 27:
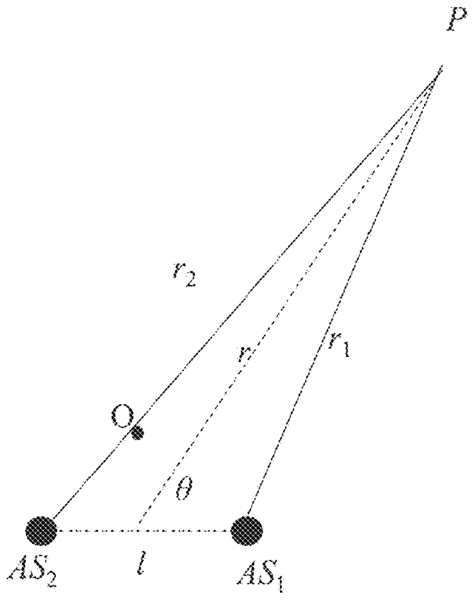
FIG. 27 is a schematic diagram illustrating an exemplary dual sound source radiation according to some embodiments of the present disclosure.

FIG. 27 is a schematic diagram illustrating an exemplary dual sound source radiation according to some embodiments of the present disclosure. As shown in FIG. 27, the first sound source $AS_1$ and the second sound source $AS_2$ may respectively represent dual sound sources formed by the sound production component 11 of the earphone 10. P is a point in a far field, $l$ denotes a distance between the first sound source $AS_1$ and the second sound source $AS_2$, $r_1$ denotes a distance between the first sound source $AS_1$ and the point P, $r_2$ denotes a distance between the second sound source $AS_2$ and the point P, r denotes a distance between a midpoint O of a line connecting the first sound source $AS_1$ and the second sound source $AS_2$ and the point P, and $\theta$ denotes an angle between the line connecting the first sound source $AS_1$ and the second sound source $AS_2$ and a line connecting the midpoint O and the point P.

The sound pressures at the first sound source $AS_1$ and the second sound source $AS_2$ may be respectively:

$$\begin{cases} S_1 = \frac{A}{r_1} e^{j(\omega t - kr_1)} \\ S_2 = \frac{A}{r_2} e^{j(\omega t - kr_2 + \phi)} \end{cases}, \quad (1)$$

where φ denotes the phase difference between the first sound source $AS_1$ and the second sound source $AS_2$, and k denotes a wave vector. Under a far-field condition (r>>1, kl<<1), the distances $r_1$, $r_2$ may be represented as:

$$\begin{cases} r_1 = r - \frac{l}{2}\cos\theta \\ r_2 = r + \frac{l}{2}\cos\theta \end{cases}. \quad (2)$$

Therefore, the sound pressure amplitude |p| of the far-field point P may be represented as a superposition of the sound fields of the first sound source $AS_1$ and the second sound source $AS_2$:

$$|p| = |S_1 + S_2| = \left|\frac{A}{r} e^{j(\omega t - kr)}\left(e^{j\frac{kl}{2}\cos\theta} + e^{-j\frac{kl}{2}\cos\theta} e^{j\varphi}\right)\right| = G\sqrt{\left(\frac{(kl)^2}{2} - \frac{(kl)^2}{2}\cos\varphi\right)\cos^2\theta + (2kl\sin\varphi)\cos\theta + (2 + 2\cos\varphi)}. \quad (3)$$

To form the cardioid directivity radiation sound field, i.e., when θ=180°, the sound pressure amplitude |p| of the point P in the far field may have a minimum value. |p| is derived as follows:

$$|p|'_{\theta=180^\circ} = 2\cos\theta\left[\frac{(kl)^2}{2} - \frac{(kl)^2}{2}\cos\phi\right] + [2kl\sin\phi] = 0. \quad (4)$$

A relationship that needs to be satisfied with respect to the phase difference φ between the first sound source $AS_1$ and the second sound source $AS_2$ may be obtained by solving the Equation (4):

$$\cos\varphi = \frac{(kl)^2 - 4}{(kl)^2 + 4}. \quad (5)$$

According to the Equation (5), to make the first sound source $AS_1$ and the second sound source $AS_2$ form the cardioid directional radiation sound field, the phase difference φ between the dual sound sources may satisfy a certain relationship with kl. Since the wave vector k is related to the frequency f, the phase difference φ between the dual sound sources may also be related to the frequency.

Figure 28:
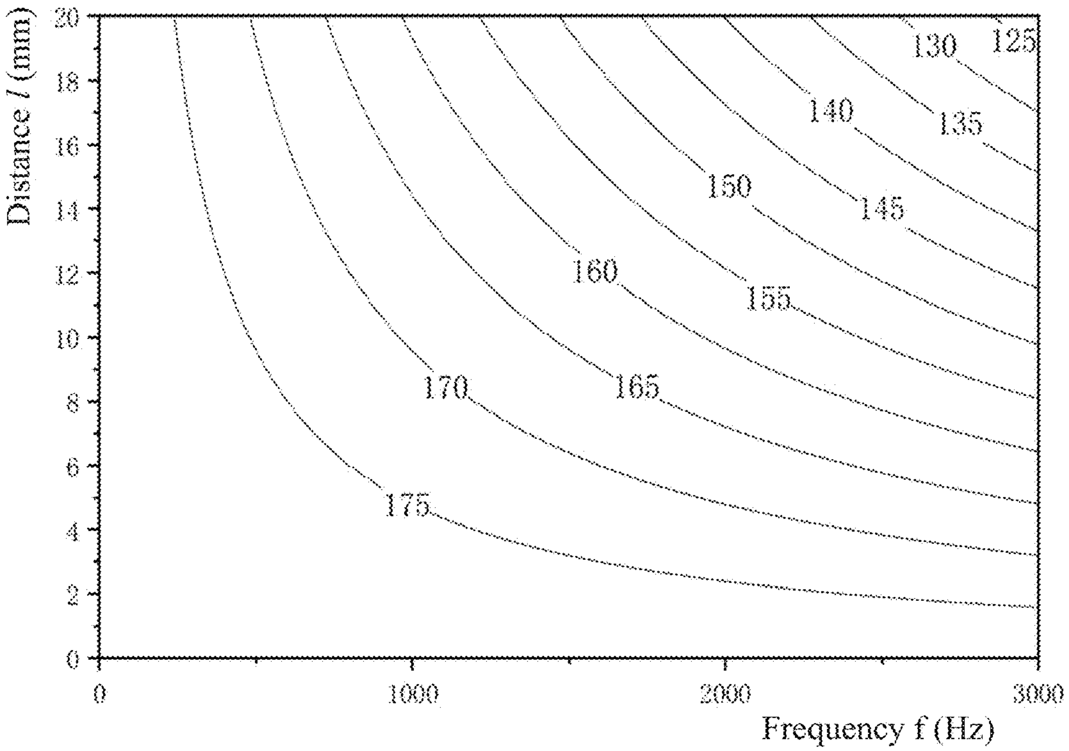
FIG. 28 is a schematic diagram illustrating a relationship between a phase difference between a first sound source $AS_1$ and a second sound source $AS_2$ corresponding to an equation (5), a frequency, and a distance.

FIG. 28 is a schematic diagram illustrating a relationship between the phase difference φ between the first sound source $AS_1$ and the second sound source $AS_2$ corresponding to the equation (5), the frequency f, and the distance l. As shown in FIG. 28, the horizontal axis represents the frequency f, and the unit is Hz; the vertical axis represents the distance/between dual sound sources, and the unit is mm; and each curve represents the required phase difference φ under different conditions (i.e., different frequencies f and different distances l). According to the curves in FIG. 28, to obtain the cardioid directivity radiation sound field, when the distance/is determined, within a preset frequency range (e.g., 200 Hz-2000 Hz, 1000 Hz-2000 Hz, etc.), the phase difference between the first sound source $AS_1$ and the second sound source $AS_2$ is negatively correlated with a value of the frequency. For example, within the range of 200 Hz-2000 Hz, the higher the frequency, the smaller the required phase difference between the first sound source $AS_1$ and the second sound source $AS_2$; or the lower the frequency, the greater the required phase difference between the first sound source $AS_1$ and the second sound source $AS_2$. Similarly, when the frequency is determined, the phase difference between the first sound source $AS_1$ and the second sound source $AS_2$ may be negatively correlated with the distance between the dual sound sources. The larger the distance, the smaller the required phase difference between the first sound source $AS_1$ and the second sound source $AS_2$; or the smaller the distance, the larger the required phase difference between the first sound source $AS_1$ and the second sound source $AS_2$. It should be noted that in actual measurement, when the phase difference is negatively correlated with the values of a plurality of consecutive frequencies within a certain frequency range and/or a plurality of consecutive distances within a certain distance range of the dual sound sources, the phase difference may be considered to be negatively correlated with the value of the frequency and/or the value of the distance between dual sound sources. Merely by way of example, a plurality of (e.g., 5, 10) frequencies and phase differences corresponding the plurality of frequencies may be obtained in equal steps (e.g., every 1 Hz, 10 Hz, 50 Hz, 100 Hz, 200 Hz), when the plurality of frequencies and the phase differences corresponding to the plurality of frequencies satisfy a negative correlation relationship, it may be considered that the phase difference is negatively correlated with the value of the frequency.

In practical applications, the distance/is usually determined, and the relationship between the phase difference φ and kl may be simplified as the relationship between the frequency and the phase difference. That is, when the distance/is determined and the phase difference between the first sound source $AS_1$ and the second sound source $AS_2$ satisfies a certain corresponding relationship with the frequency, the cardioid directional radiation sound field may be formed between the first sound source $AS_1$ and the second sound source $AS_2$. Merely by way of example, when the distance/shown in the table below is 3 mm, to make the first sound source $AS_1$ and the second sound source $AS_2$ form the cardioid directional radiation sound field, the relationship table of the required phase difference φ (which also be understood as an optimal phase difference that can achieve the cardioid directional radiation sound field) and the frequency f may be:

| Frequency f | 200 Hz | 500 Hz | 1000 Hz | 2000 Hz |
|---|---|---|---|---|
| Phase difference φ | 179° | 178° | 176° | 173° |

According to the table, at different frequencies, to make the first sound source $AS_1$ and the second sound source $AS_2$ form a cardioid directional radiation sound field, the required phase differences φ between the first sound source $AS_1$ and the second sound source $AS_2$ may be different. In addition, according to the table, even though the phase differences φ corresponding to different frequencies are different, a difference between the different phase differences φ is not significant. For example, as shown in the table, 200 Hz corresponds to a phase difference of 179°, 2000 Hz corresponds to a phase difference of 173°, and the difference between the two phase differences is only 6°. Therefore, when a fixed phase difference φ (e.g., 176°) or a phase difference range (e.g., 120°-179°) is determined, in a wide frequency range (e.g., 200 Hz-2000 Hz), even if the cardioid directional radiation sound field (as shown in FIG. 26A) is not formed at certain frequencies, a quasi-cardioid directional radiation sound field may be formed, e.g., the supercardioid directional radiation sound field shown in FIG. 26B.

Figure 29:
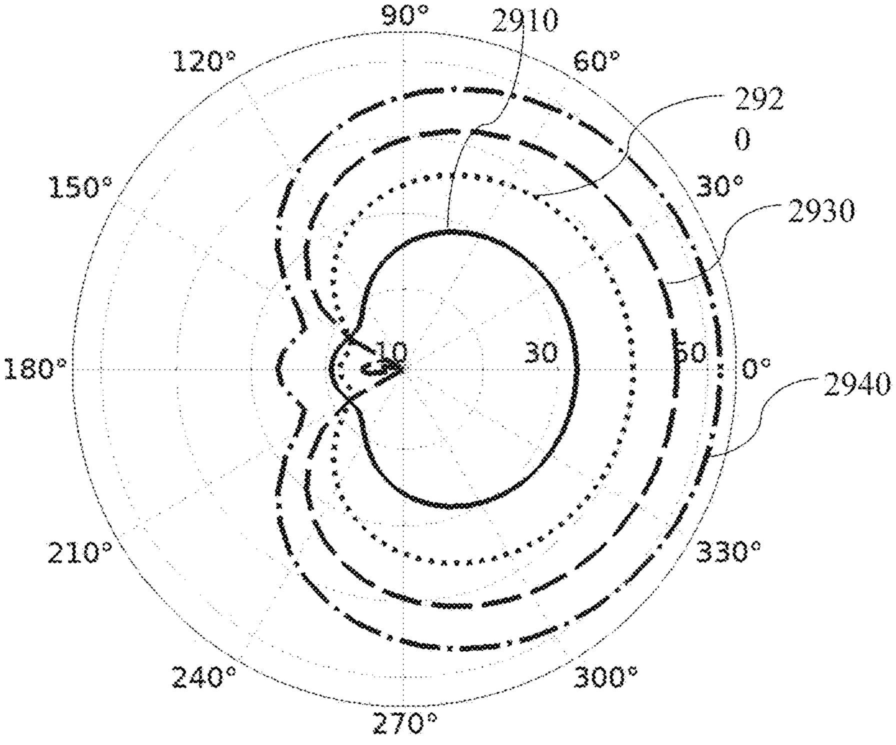
FIG. 29 is a schematic diagram illustrating directional radiation sound fields at different frequencies according to some embodiments of the present disclosure.

FIG. 29 is a schematic diagram illustrating directional radiation sound fields at different frequencies according to some embodiments of the present disclosure. It should be noted that FIG. 29 corresponds to the sound field radiations corresponding to different frequencies under the far-field condition of 0.5 m away from the sound source when the distance l=3 mm and the phase difference φ=176°. As shown in FIG. 29, a curve 2910, a curve 2920, a curve 2930, and a curve 2940 are directional radiation sound field curves corresponding to the frequencies of 200 Hz, 500 Hz, 1000 Hz, and 2000 Hz in the far field. According to FIG. 29, a sound field intensity in an opposite direction (a direction of 180°) of a main lobe (maximum sound field intensity) of the radiation sound field of the curve 2930 is smallest. Therefore, the sound field radiation directivity (cardioid directivity) of the curve 2930 may be optimal (i.e., the directional radiation sound field is optimal when the frequency is 1000 Hz and the phase difference φ=176°) Compared with the other three curves. The sound field intensities in the opposite directions of the main lobes of the radiation sound fields corresponding to the curve 2910, the curve 2920, and the curve 2940 are larger than that of curve 2930, which form quasi-cardioid directivity. In such cases, when the phase difference φ=176°, in the frequency range of 200 Hz-2000 Hz, the dual sound sources may form a strong directional radiation sound field. In addition, according to the description above (the difference between the optimal phase differences corresponding to different frequencies is not significant), when the phase difference is within a certain range (e.g., 120°-179°), within the frequency range of 200 Hz-2000 Hz, the dual sound sources may also form the strong directional radiation sound field. Merely by way of example, at about 2000 Hz, the phase difference between the first sound and the second sound may be within a range of 170-175, and the dual sound sources may form the strong directional radiation sound field.

In some embodiments, since the far-field condition may be limited to kl<<1 (and r>>l), and a size of the wave vector is negatively correlated with the wavelength, to satisfy the far-field condition, the wave vector may not be too large, i.e., the wavelength may not be too small, i.e., the frequency may not be too large. Accordingly, the frequency range in which the dual sound sources described in the embodiments of the present disclosure may form a strong directional radiation sound field may be in the low-frequency range (e.g., smaller than 1000 Hz).

Figure 30A:
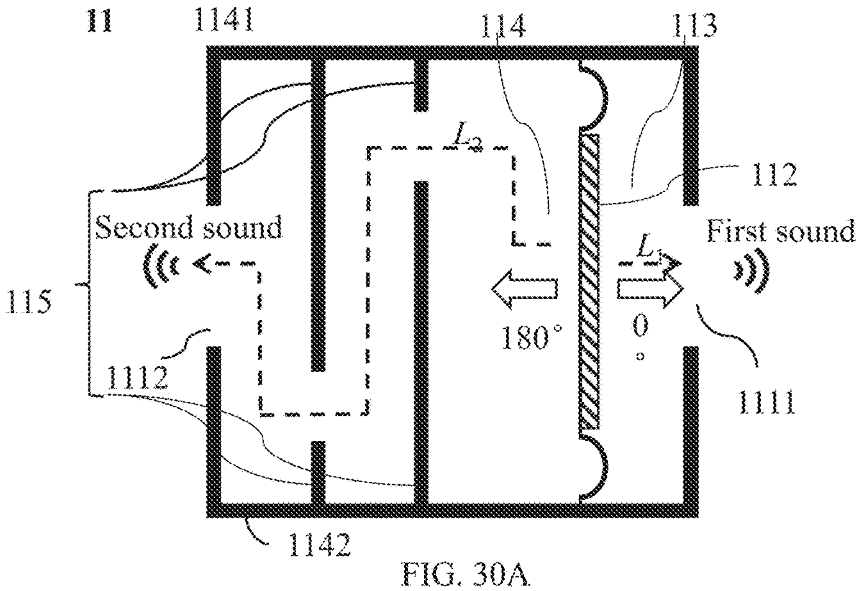
FIG. 30A is a schematic diagram illustrating an exemplary sound production component according to some embodiments of the present disclosure.
Figure 30B:
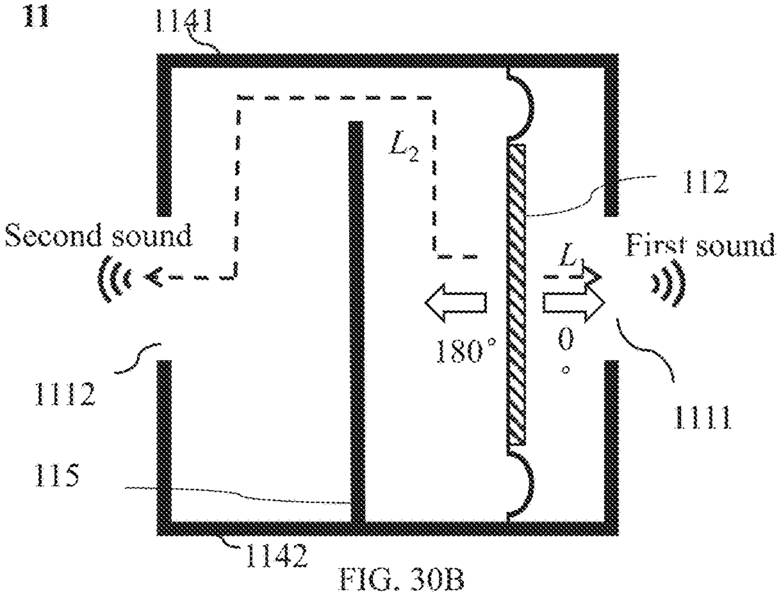
FIG. 30B is a schematic diagram illustrating another exemplary sound production component according to some embodiments of the present disclosure.
Figure 30C:
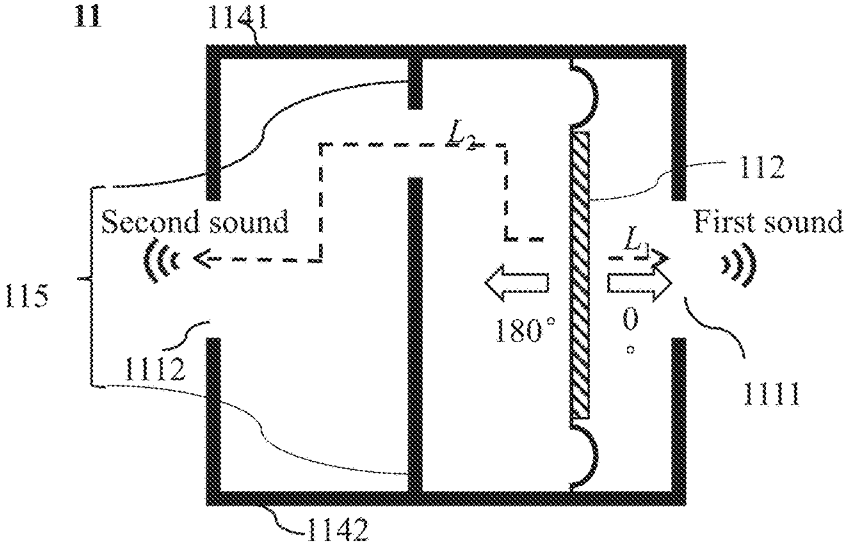
FIG. 30C is a schematic diagram illustrating another exemplary sound production component according to some embodiments of the present disclosure.

FIG. 30A is a schematic diagram illustrating an exemplary sound production component according to some embodiments of the present disclosure. As shown in FIG. 30A, the sound production component 11 may include the transducer 112 (e.g., a diaphragm), and the transducer 112 may radiate a first sound to an outside through the front cavity 113 and the first sound guiding hole 1111, and may radiate a second sound to an outside through the rear cavity 114 and the second sound guiding hole 1112. In some embodiments, to make the sound radiated from the sound production component 11 to a spatial position (e.g., far field) in a low-frequency range (e.g., smaller than 1000 Hz) present a strong directivity (e.g., cardioid or supercardioid), the phase difference between the first sound radiated from the first sound guiding hole 1111 and the second sound radiated from the second sound guiding hole 1112 may be within a specific range (e.g., smaller than 120° (e.g., 120°-179°). Since an initial value of a phase difference of two sound waves radiated by the transducer 112 to the front cavity 113 and the rear cavity 114 is 180°, an acoustic structure in the front cavity 113 and/or the rear cavity 114 may be configured such that the phase difference between the first sound and the second sound may satisfy the condition. In some embodiments, the sound production component 11 may include an acoustic structure 115 disposed in the front cavity 113 and/or the rear cavity 114. The acoustic structure 115 may be configured to adjust the actual output phase of the first sound and/or the second sound to adjust the phase difference between the first sound and the second sound. In some embodiments, the acoustic structure 115 may be configured such that the first sound path of the first sound transmitted in the front cavity 113 and the second sound path of the second sound transmitted in the rear cavity 114 may have a sound path difference, thereby adjusting the phase difference between the first sound radiated from the first sound guiding hole 1111 and the second sound radiated from the second sound guiding hole 1112. In this embodiment, the acoustic structure 115 disposed in the rear cavity 114 is taken as an example for illustration. It should be understood that in other alternative embodiments, the acoustic structure 115 may also be disposed in the front cavity 113. Different acoustic structures may be disposed in the front cavity 113 or rear cavity 114. In some embodiments, the acoustic structure 115 may include a baffle, one end of the baffle may be connected to an inner wall of the rear cavity 114, and the other end of the baffle may be a free end. In some embodiments, as shown in FIG. 30A, four baffles may be disposed in the rear cavity 114, two of baffles may be disposed on the first inner wall 1141 of the rear cavity 114, and two baffles may be disposed on a second inner wall 1142 (the second inner wall 1142 may be disposed opposite to the first inner wall 1141). The free ends of the baffles on the two inner walls may be disposed opposite to each other. There may be a gap between the free ends of the two baffles disposed opposite, and the sound may bypass the baffles and be transmitted to the second sound guiding hole 1112 through the gap. In some embodiments, a count and/or positions of the baffles in the rear cavity 114 may be in other manners. For example, as shown in FIG. 30B, a baffle may be disposed on only one inner wall (e.g., the second inner wall 1142) of the rear cavity 114, one end of the baffle may be connected to the second inner wall 1142, and the free end of the baffle may extend near the first inner wall 1141 (a gap may be formed between the free end of the baffle and the first inner wall 1141), the sound may bypass the baffle and be transmitted to the second sound guiding hole 1112 through the gap between the free end of the baffle and the first inner wall 1141. As another example, as shown in FIG. 30C, the two ends of the baffle may be respectively connected to the first inner wall 1141 and the second inner wall 1142. An opening may be disposed on the baffle, and the sound may bypass the baffle and be transmitted to the second sound guiding hole 1112 through the opening. In the process of the sound bypassing the baffle and being transmitted to the second sound guiding hole 1112, a distance traveled by the sound (i.e., the sound path) may be changed compared with the sound path in a case without the baffle. The sound wave radiated from a front side of the transducer 112 may be radiated from the first sound guiding hole 1111 to the outside through the front cavity 113, and the distance traveled by the sound wave may be a first sound path $L_1$. The sound wave radiated from a rear side of the transducer 112 may be radiated from the second sound guiding hole 1112 to the outside through the rear cavity 114 and the acoustic structure 115, and the distance traveled by the sound wave may be a second sound path $L_2$. There may be a sound path difference between the first sound path $L_1$ and the second sound path $L_2$.

A time delay between the first sound radiated from the first sound guiding hole 1111 and the second sound radiated from the second sound guiding hole 1112 may be:

$$\Delta\tau = \frac{L_2 - L_1}{c}, \tag{6}$$

where c denotes a speed of sound. The phase difference φ between the first sound and the second sound may be:

$$\phi = 180° - 2\pi f \cdot \Delta\tau. \tag{7}$$

Accordingly, an actual output phase difference between the first sound and the second sound may be adjusted by adjusting the sound path difference between the first sound path $L_1$ and the second sound path $L_2$ (e.g., the sound path difference may be within a range of 1 mm-57 mm) such that the phase difference between the first sound and the second sound may be within a range of 120°-179°, and the sound radiated from the sound production component 11 to the spatial position may present the strong directivity (e.g., cardioid or supercardioid).

It should be understood that the count, positions, sizes, and arrangements of the baffles may affect the second sound path $L_2$ that the sound wave travels in the rear cavity 114, thereby affecting the phase difference between the first sound and the second sound. In such cases, the count, positions, sizes, and arrangements of the baffles may be reasonably adjusted according to the requirement of the phase difference between the first sound and the second sound.

In addition, according to the embodiments, when other parameters (e.g., the first sound path and the second sound path) are the same, the phase difference between the first sound and the second sound may be negatively correlated with the frequency. The higher the frequency, the smaller the phase difference between the first sound and the second sound. The lower the frequency, the greater the phase difference between the first sound and the second sound.

Figure 31:
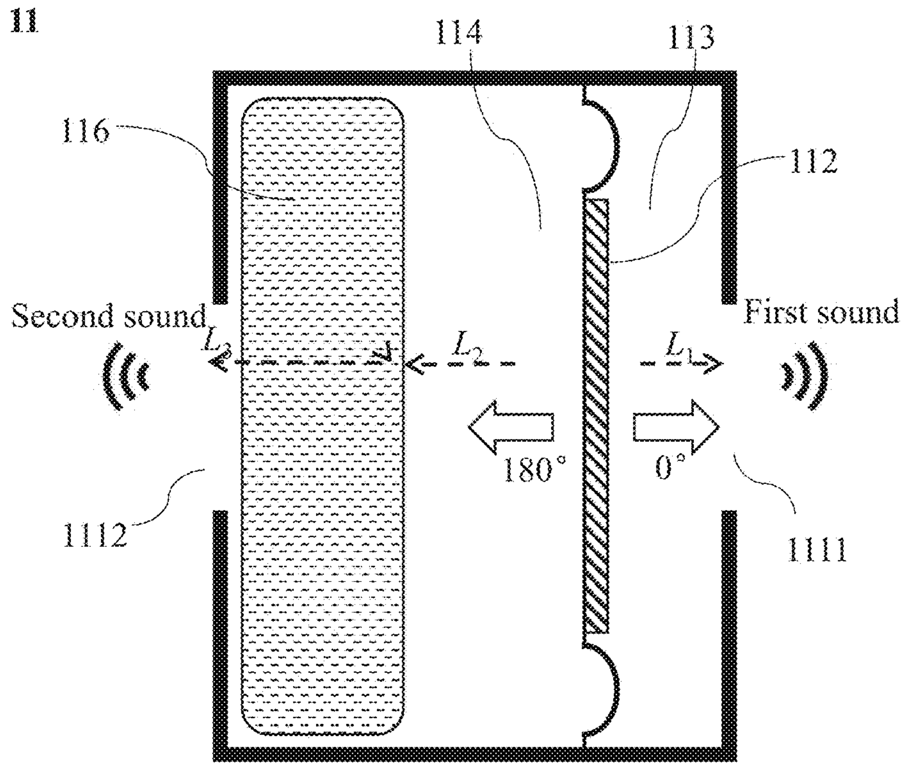
FIG. 31 is a schematic diagram illustrating another exemplary sound production component according to some embodiments of the present disclosure.

FIG. 31 is a schematic diagram illustrating another exemplary sound production component according to some embodiments of the present disclosure. A structure of the sound production component 11 shown in FIG. 31 may be similar to that of the sound production component 11 shown in FIG. 30A except for the difference in the acoustic structure. In some embodiments, the acoustic structure that changes a speed of sound transmission may be disposed in the front cavity 113 and/or the rear cavity 114 of the sound production component 11. For example, the acoustic structure may be a slow acoustic structure that may slow down the speed of sound when the sound travels within the acoustic structure. Sound waves may travel faster in the air than in the slow acoustic structure. In some embodiments, the slow acoustic structure may include an acoustic gauze mesh, an acoustic porous material, or the like, or any combination thereof. When the sound wave passes through micropores of the gauze mesh or porous material, due to a viscous effect of the micropores on the air, the speed of the sound waves may slow down when passing through the micropores, thus achieving the slow effect. Specifically, when the speed of sound (also referred to as normal speed of sound) when the sound waves are transmitted in air is c, and the speed of sound (also referred to as equivalent speed of sound) when the sound waves are transmitted in the slow acoustic structure is c', c' may be smaller than c. Therefore, the transmission speed of the sound may be changed by setting the slow acoustic structure in the cavity, which may adjust the actual output phase of the first sound and/or the second sound, thereby adjusting the phase difference between the first sound and the second sound.

In this embodiment, a slow acoustic structure 116 disposed in the rear cavity 114 is taken as an example for illustration. As shown in FIG. 31, the slow acoustic structure 116 may be disposed in the rear cavity 114, and sound waves radiated from the front side of the transducer 112 may be radiated from the first sound hole 1111 to the outside, and the distance traveled by the sound waves may be the first sound path $L_1$. Sound waves radiated from the rear side of the transducer 112 may be radiated to the outside from the second sound guiding hole 1112, and the distance traveled by the sound waves may include the second sound path $L_2$ of the sound waves transmitted through the air and a third sound path $L_3$ of the sound waves transmitted through the slow acoustic structure 116.

A time delay between the first sound radiated from the first sound guiding hole 1111 and the second sound radiated from the second sound guiding hole 1112 may be:

$$\Delta\tau = \left(\frac{L_2}{c} + \frac{L_3}{c'}\right) - \frac{L_1}{c}, \tag{8}$$

where c denotes a normal speed of sound, and c' denotes an equivalent speed of sound in the slow acoustic structure 116. The phase difference φ between the first sound and the second sound may be:

$$\phi = 180° - 2\pi f \cdot \Delta\tau, \tag{9}$$

Accordingly, an actual output phase difference between the first sound and the second sound may be adjusted by adjusting the equivalent speed of sound and/or the third sound path $L_3$ of the sound waves transmitted in the slow acoustic structure 116 (e.g., a ratio of the equivalent speed of sound in the slow acoustic structure to the normal speed of sound may be within a range of 0.02-0.5) such that the phase difference between the first sound and the second sound may be within a range of 120°-179°, and the sound radiated from the sound production component 11 to the far field may present the strong directivity (e.g., cardioid or supercardioid).

In addition, according to the embodiments, when other parameters (e.g., the equivalent speed of sound, the first sound path, the second sound path, and the third sound path) are the same, the phase difference between the first sound and the second sound may be negatively correlated with the frequency. The higher the frequency, the smaller the phase difference between the first sound and the second sound. The lower the frequency, the greater the phase difference between the first sound and the second sound.

Figure 32:
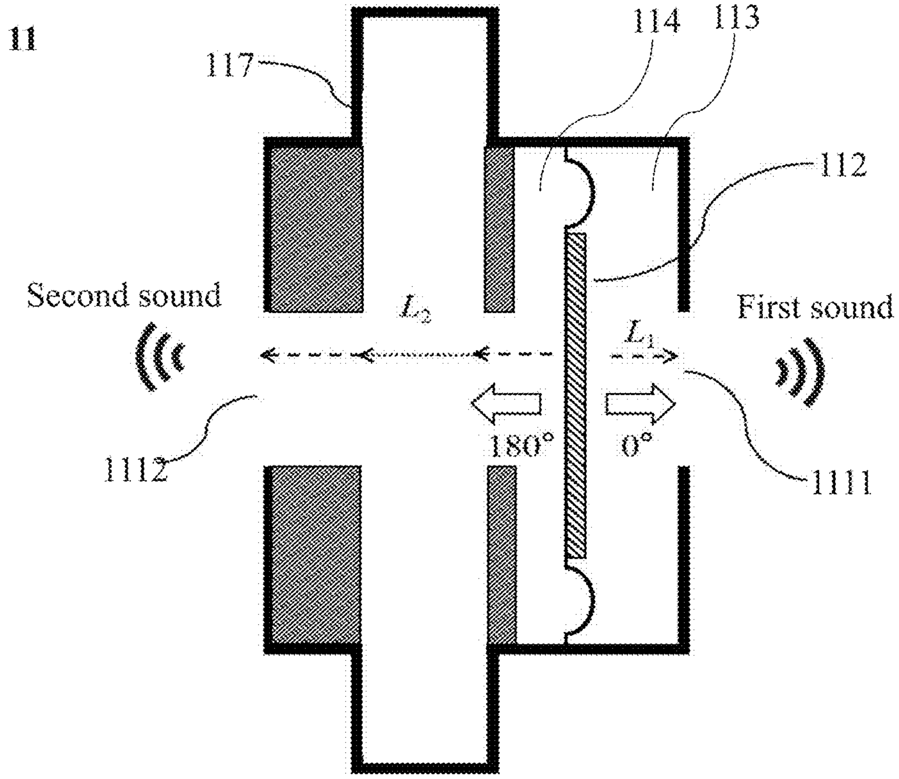
FIG. 32 is a schematic diagram illustrating another exemplary sound production component according to some embodiments of the present disclosure.

FIG. 32 is a schematic diagram illustrating another exemplary sound production component according to some embodiments of the present disclosure. A structure of the sound production component 11 shown in FIG. 32 may be similar to that of the sound production component 11 shown in FIG. 30A except for the difference in the acoustic structure. As shown in FIG. 32, an expansion acoustic structure 117 may be disposed in the front cavity 113 and/or the rear cavity 114 of the sound production component 11. The expansion acoustic structure 117 may change (e.g., enlarge) cross-sectional areas of the front cavity 113 or the rear cavity 114 at different positions on a sound transmission path. When sound waves are transmitted in a waveguide (i.e., an air waveguide formed by the front cavity 113 or the rear cavity 114), if the cross-sectional area at the different positions of the waveguide changes on the transmission path of the sound waves, the sound waves may be reflected at positions where the cross-sectional area changes suddenly, which means that equivalent impedance of a medium has changed. Correspondingly, parameters related to the equivalent impedance (e.g., an equivalent speed of sound, an equivalent density) may also change accordingly such that the phase of the sound wave may change. For example, an influence of the expansion acoustic structure 117 on the change of the equivalent speed of sound may be mainly related to a ratio of a cross-sectional area of the rear cavity 114 expanded by the expansion acoustic structure 117 to an original cross-sectional area of the rear cavity 114. In some embodiments, the actual equivalent speed of sound may be obtained by means of simulation or experimental testing.

In the embodiment, the expansion acoustic structure 117 disposed in the rear cavity 114 is taken as an example for illustration. As shown in FIG. 32, the expansion acoustic structure 117 may be disposed on opposite two sidewalls of the rear cavity 114, and the expansion acoustic structure 117 may make the cross-sectional area of the rear cavity 114 change suddenly before and after a specific position on the sound transmission path. In some embodiments, the expansion acoustic structure 117 may be an expansion cavity. A shape of the expansion cavity may be a rectangle as shown in FIG. 32. In other embodiments, a cross-sectional area of the expansion acoustic structure 117 may have other shapes (e.g., a triangle, a trapezoid). The shape of the expansion cavity may be reasonably configured according to the phase difference between the first sound and the second sound.

As shown in FIG. 32, sound waves radiated from the front side of the transducer 112 may be radiated from the first sound guiding hole 1111 to the outside, and the distance traveled by the sound waves may be the first sound path $L_1$. Sound waves radiated from the rear side of the transducer 112 may be radiated to the outside from the second sound guiding hole 1112 through the expansion acoustic structure 117 and the rear cavity 114, and the distance traveled by the sound waves may be the second sound path $L_2$. A speed of sound in the first sound path $L_1$ may be the normal speed of sound c, and a speed of sound in the second sound path $L_2$ may be the equivalent speed of sound c'. A time delay between the first sound radiated from the first sound guiding hole 1111 and the second sound radiated from the second sound guiding hole 1112 may be:

$$\Delta\tau = \frac{L_2}{c'} - \frac{L_1}{c}, \tag{10}$$

where c denotes the normal speed of sound, and c' denotes the equivalent speed of sound in the expansion acoustic structure 117. The phase difference φ between the first sound and the second sound may be:

$$\phi = 180° - 2\pi f \cdot \Delta\tau. \tag{11}$$

Accordingly, an actual output phase difference between the first sound and the second sound may be adjusted by disposing the expansion acoustic structure 117 in the cavity to adjust the equivalent speed of sound of the sound waves transmitted in the cavity such that the phase difference between the first sound and the second sound may be within a range of 120°-179°, and the sound radiated from the sound production component 11 to the far field may present the strong directivity (e.g., cardioid or supercardioid).

In addition, according to the embodiments, when other parameters (e.g., the first sound path, the second sound path, and the equivalent speed of sound) are the same, the phase difference between the first sound and the second sound may be negatively correlated with the frequency. The higher the frequency, the smaller the phase difference between the first sound and the second sound. The lower the frequency, the greater the phase difference between the first sound and the second sound.

Figure 33:
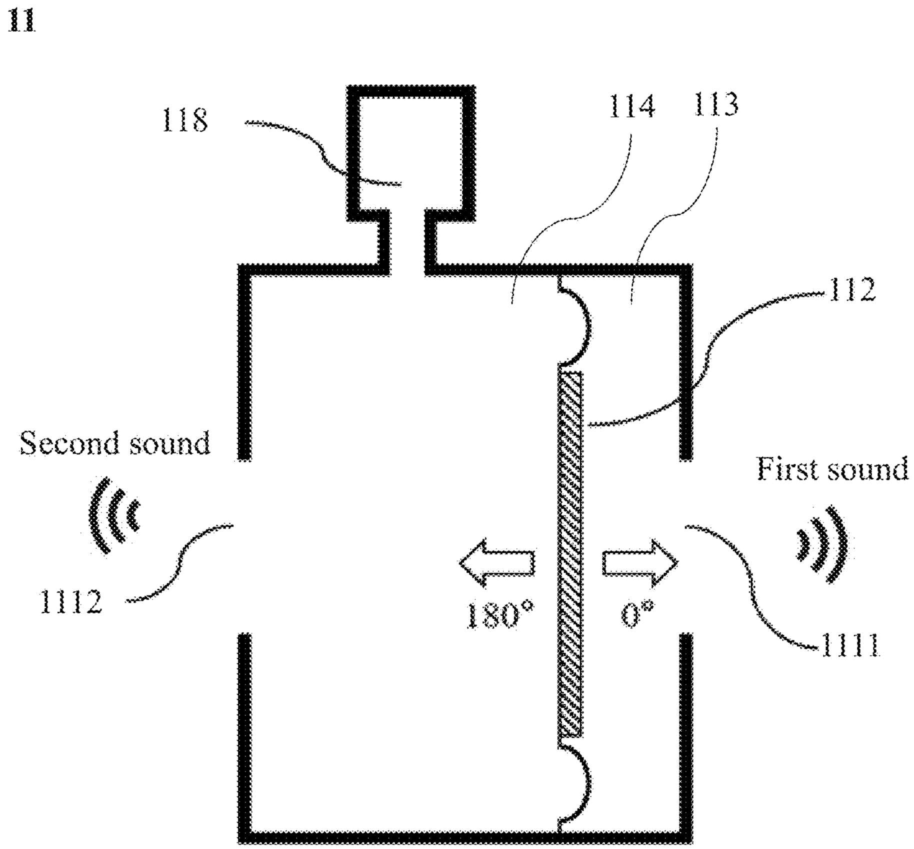
FIG. 33 is a schematic diagram illustrating another exemplary sound production component according to some embodiments of the present disclosure.

FIG. 33 is a schematic diagram illustrating another exemplary sound production component according to some embodiments of the present disclosure. A structure of the sound production component 11 shown in FIG. 33 may be similar to that of the sound production component 11 shown in FIG. 30A except for the difference in the acoustic structure. As shown in FIG. 33, a sound-absorbing structure 118 may be disposed in the front cavity 113 and/or the rear cavity 114 of the sound production component 11. In some embodiments, the sound-absorbing structure 118 may have a resonance frequency. An actual output phase difference of the two sound waves may be controlled using the modulation (e.g., phase modulation) of the sound-absorbing structure 118 to sound near the resonance frequency of the sound-absorbing structure 118. In some embodiments, the sound-absorbing structure 118 may include a Helmholtz resonance cavity. In some embodiments, the sound-absorbing structure 118 may include a micro-perforated plate resonator. In some embodiments, the sound-absorbing structure 118 may include a quarter wavelength tube resonator.

In the embodiment, the sound-absorbing structure 118 disposed in the rear cavity 114 may be taken as an example for illustration. The sound-absorbing structure 118 may be disposed on a sidewall of the rear cavity 114 and be in acoustic communication with the rear cavity 114. Taking the Helmholtz resonance cavity as an example, the resonance frequency $f_0$ may be:

$$f_0 = \frac{1}{2\pi}\sqrt{\frac{1}{MC}}, \tag{12}$$

where M denotes a sound quality (mainly related to nozzle parameters of the Helmholtz resonance cavity), and C denotes a sound volume (mainly related to cavity parameters at a rear end of the Helmholtz resonance cavity).

Figure 34:
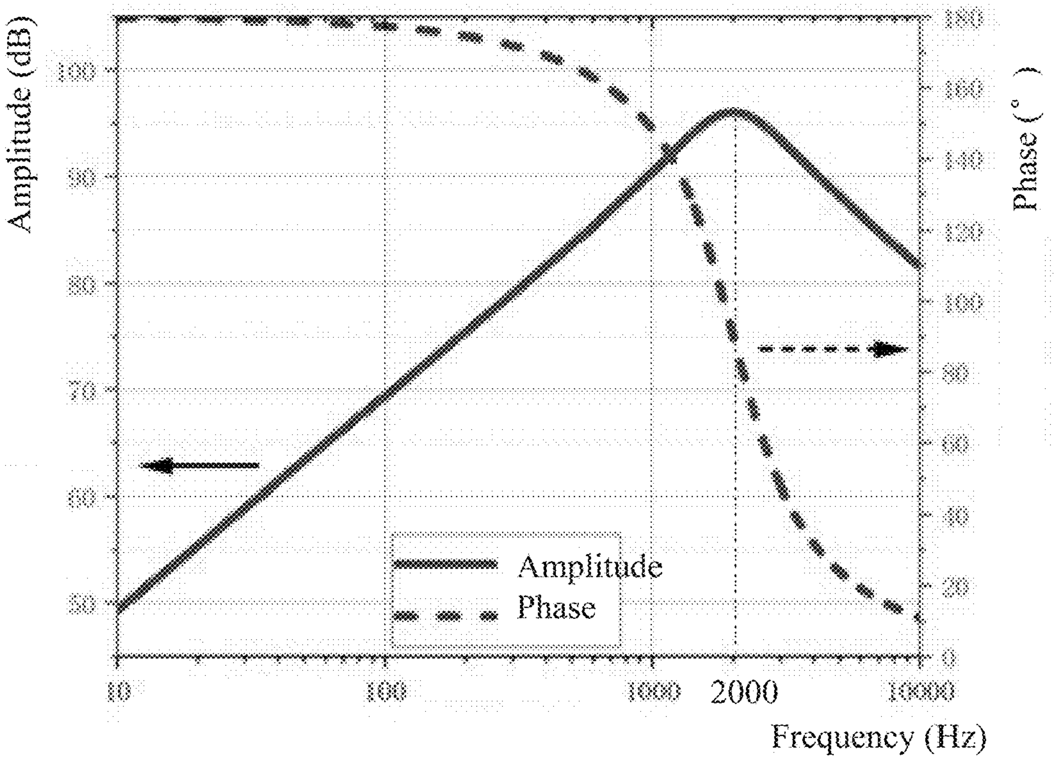
FIG. 34 is a schematic diagram illustrating frequency responses of a Helmholtz resonance cavity.

FIG. 34 is a schematic diagram illustrating frequency responses of a Helmholtz resonance cavity. The horizontal axis represents a frequency, and the unit is Hz. The vertical axis represents amplitude response in dB or phase response in ° (deg)). The solid line denotes an amplitude response of the frequency response, and the dashed line denotes a phase response of the frequency response. As shown in FIG. 34, when the resonance frequency $f_0$ of the Helmholtz resonance cavity is 2000 Hz, a resonance peak of the amplitude response occurs at 2000 Hz. Around 2000 Hz, as the frequency increases, the phase gradually changes from 180° to 0°. Accordingly, in the low-frequency range (e.g., 40 Hz-1000 Hz), the phase difference changes within the range of 179°-150°, which may basically satisfy the phase difference requirement described in the embodiments of the present disclosure to obtain the cardioid directivity or supercardioid directivity. Therefore, the actual output phase difference between the first sound and the second sound may be adjusted by disposing the sound-absorbing structure 118 in the cavity to adjust the phase of the sound radiated from the sound guiding hole corresponding to the cavity such that the sound radiated from the sound production component 11 to the far field may present the strong directivity (e.g., cardioid or supercardioid).

In some embodiments, to make the phase difference between the first sound and the second sound within a certain range (e.g., a low-frequency range smaller than 1000 Hz) before the resonance frequency of the sound-absorbing structure 118 meet the requirement, the resonance frequency of the sound-absorbing structure 118 may be within a range of 1000 Hz-3000 Hz. In some embodiments, to make the phase difference between the first sound and the second sound within a certain range before the resonance frequency of the sound-absorbing structure 118 meet the requirement, the resonance frequency of the sound-absorbing structure 118 may be within a range of 1000 Hz-2500 Hz. In some embodiments, to make the phase difference between the first sound and the second sound within a certain range before the resonance frequency of the sound-absorbing structure 118 meet the requirement, the resonance frequency of the sound-absorbing structure 118 may be within a range of 1000 Hz-2000 Hz. In some embodiments, to make the phase difference between the first sound and the second sound within a certain range before the resonance frequency of the sound-absorbing structure 118 meet the requirement, the resonance frequency of the sound-absorbing structure 118 may be within a range of 1100 Hz-1900 Hz. In some embodiments, to make the phase difference between the first sound and the second sound within a certain range before the resonance frequency of the sound-absorbing structure 118 meet the requirement, the resonance frequency of the sound-absorbing structure 118 may be within a range of 1200 Hz-1800 Hz.

The specific embodiments illustrated in the present disclosure are merely exemplary, and one or more technical features in the specific implementations are optional or additional, and do not constitute essential technical features of the inventive concept of the present disclosure. In other words, the protection scope of the present disclosure covers and is far greater than the specific embodiments.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, some features, structures, or features in the present disclosure of one or more embodiments may be appropriately combined.

In addition, those skilled in the art will understand that various aspects of the present disclosure may be illustrated and described in several patentable categories or situations, including any new and useful process, machine, product, or combination of substances, or any new and useful improvements thereto. Accordingly, all aspects of the present disclosure may be performed entirely by hardware, may be performed entirely by software (including firmware, resident software, microcode, etc.), or may be performed by a combination of hardware and software. The above hardware or software can be referred to as "data block," "module," "engine," "unit," "component," or "system." In addition, aspects of the present disclosure may be presented as a computer product located in one or more computer-readable mediums, the product including computer-readable program code.

What is claimed is:

1. An earphone, comprising:

a sound production component, a first sound guiding hole and a second sound guiding hole being disposed on the sound production component, wherein the first sound guiding hole is configured to guide a first sound transmitted to an inside of an ear canal of a user; and the second sound guiding hole is configured to communicate an inside of the sound production component with an outside of the sound production component and guide a second sound transmitted to a spatial position outside the sound production component, wherein the first sound guiding hole is located closer to the inside of the ear canal than the second sound guiding hole; and a suspension structure configured to place the sound production component on an ear of the user and provide an opening between the sound production component and an opening of the ear canal of the user for acoustic communication with the spatial position outside the sound production component, wherein when the earphone is in a wearing state, a centroid of a projection of the sound production component on a sagittal plane is located within a projection region of an edge of a concha cavity on the sagittal plane.

2. The earphone of claim 1, wherein when the earphone is in the wearing state, at least a portion of the sound production component extends into the concha cavity, and a sidewall of the sound production component on which the first sound guiding hole is disposed and the concha cavity enclose the cavity.

3. The earphone of claim 2, wherein a distance between the centroid of the projection of the sound production component on the sagittal plane and a projection of an edge of the concha cavity on the sagittal plane is within a range of 4 mm-25 mm.

4. The earphone of claim 2, wherein a ratio of a distance between the centroid of the projection of the sound production component on the sagittal plane and a highest point of a projection of an auricle of the user on the sagittal plane in a vertical axis direction to a height of the projection of the auricle on the sagittal plane in the vertical axis direction is 0.35-0.6.

5. The earphone of claim 4, wherein a ratio of a distance between the centroid of the projection of the sound production component on the sagittal plane and an end point of the projection of the auricle on the sagittal plane in a sagittal axis direction to a width of the projection of the auricle on the sagittal plane is 0.4-0.65.

6. The earphone of claim 2, wherein an overlap ratio between an area of the projection of the sound production component on the sagittal plane and an area of a projection of the concha cavity on the sagittal plane is greater than or equal to ⅓.

7. The earphone of claim 2, wherein when the earphone is in the wearing state, an inclination angle of a projection of an upper side or a lower side of the sound production component on the sagittal plane relative to a horizontal direction is within a range of 10°-28°.

8. The earphone of claim 2, wherein when the earphone is in the wearing state, a distance between a midpoint of a projection of an upper side of the sound production component on the sagittal plane and a projection of a vertex of the suspension structure on the sagittal plane is within a range of 17 mm-36 mm.

9. The earphone of claim 1, wherein when the earphone is in a wearing state, the sound production component includes a body and a baffle extending toward the opening of the ear canal of the user, and the baffle and the ear enclose a cavity having the opening between the sound production component and the opening of the ear canal of the user.

10. The earphone of claim 9, wherein the first sound guiding hole is located inside the cavity, and the second sound guiding hole is located outside the cavity.

11. The earphone of claim 1, wherein within any one of 3.5 kHz-4.5 kHz, 2.5 KHz-3.5 kHz, and 1.5 kHz-2.5 kHz, a ratio of a sound pressure at the first sound guiding hole to a sound pressure at the second sound guiding hole is within a range of 0.7-1.5.

12. The earphone of claim 1, wherein an acoustic resistance mesh is disposed at the first sound guiding hole or the second sound guiding hole, the acoustic resistance mesh including a gauze mesh or a steel mesh.

13. The earphone of claim 12, wherein a mesh count of the acoustic resistance mesh is within a range of 60-100.

14. The earphone of claim 1, wherein the sound production component comprises:

a transducer including a diaphragm configured to produce sound in response to an excitation signal; and a housing, the housing forming an accommodation cavity for accommodating the transducer, wherein the diaphragm divides the accommodation cavity into a front cavity and a rear cavity corresponding to a front side and a rear side of the diaphragm, respectively, the front cavity is in acoustic communication with the first sound guiding hole, and the rear cavity is in acoustic communication with the second sound guiding hole, wherein an acoustic structure of the front cavity or an acoustic structure of the rear cavity is configured such that a phase difference between the first sound and the second sound is smaller than 180°.

15. The earphone of claim 14, wherein at 1000 Hz, the phase difference between the first sound and the second sound is 125°-178°.

16. The earphone of claim 14, wherein at 2000 Hz, the phase difference between the first sound and the second sound is 170°-175°.

17. The earphone of claim 14, wherein a ratio of an opening area of the second sound guiding hole to an area of the diaphragm is within a range of 0.1-0.4.

18. The earphone of claim 14, wherein the sound production component further includes an acoustic structure disposed in the front cavity and/or the rear cavity, the acoustic structure is configured to adjust a phase of the first sound and/or the second sound to adjust the phase difference between the first sound and the second sound; and the acoustic structure includes at least one baffle, one end of each baffle is connected to an inner wall of the rear cavity or the front cavity, and the other end of the each baffle is a free end.

19. The earphone of claim 14, wherein the sound production component further includes an expansion acoustic structure disposed in the front cavity and/or the rear cavity, the expansion acoustic structure is configured to change cross-sectional areas of the front cavity or the rear cavity at different positions on a sound transmission path, and the expansion acoustic structure includes an expansion cavity.

20. The earphone of claim 14, wherein the sound production component further includes a sound-absorbing structure disposed in the front cavity and/or the rear cavity, the sound-absorbing structure includes a Helmholtz resonance cavity, a micro-perforated plate resonator, or a quarter wavelength tube resonator, and a resonance frequency of the sound-absorbing structure is within a range of 1000 Hz-3000 Hz.

* * * * *